US008010455B2

(12) United States Patent
Price et al.

(10) Patent No.: US 8,010,455 B2
(45) Date of Patent: Aug. 30, 2011

(54) WASTE PROCESSING SYSTEM AND METHOD

(75) Inventors: Kenneth S. Price, Zionsville, IN (US); William J. McDaniel, Zionsville, IN (US); Roger D. Bowser, Cassopolis, MI (US); Steven E. Pettit, Shelbyville, IN (US); Brian L. Walker, Greenwood, IN (US); Maria R. Swift, Edinburg, IN (US); David S. Buckner, The Woodlands, TX (US); Henry L. Phillips, Tuscaloosa, AL (US)

(73) Assignee: Heritage Interactive Services, LLC, Indianapolis, IN (US)

( * ) Notice: Subject to any disclaimer, the term of this patent is extended or adjusted under 35 U.S.C. 154(b) by 2852 days.

(21) Appl. No.: 09/900,989

(22) Filed: Jul. 9, 2001

(65) Prior Publication Data

US 2002/0147502 A1    Oct. 10, 2002

Related U.S. Application Data

(60) Provisional application No. 60/282,554, filed on Apr. 9, 2001.

(51) Int. Cl.
*G06F 21/00* (2006.01)

(52) U.S. Cl. ............. 705/50; 705/7; 705/8; 588/300; 700/266

(58) Field of Classification Search ............ 705/80, 705/50, 7, 8; 588/300; 700/266
See application file for complete search history.

(56) References Cited

U.S. PATENT DOCUMENTS

| | | | |
|---|---|---|---|
| 5,450,317 A | 9/1995 | Lu et al. | |
| 5,532,928 A | 7/1996 | Stanczyk et al. | |
| 5,592,375 A | 1/1997 | Salmon et al. | |
| 5,664,112 A | 9/1997 | Sturgeon et al. | |
| 5,699,525 A * | 12/1997 | Embutsu et al. | 705/7 |
| 5,715,398 A | 2/1998 | Lubenow et al. | |
| 5,742,931 A | 4/1998 | Spiegelhoff et al. | |
| 5,765,138 A | 6/1998 | Aycock et al. | |
| 5,960,402 A | 9/1999 | Embutsu et al. | |
| 6,052,122 A * | 4/2000 | Sutcliffe et al. | 345/751 |
| 6,097,995 A * | 8/2000 | Tipton et al. | 700/266 |
| 6,256,640 B1 | 7/2001 | Smalley et al. | |

* cited by examiner

*Primary Examiner* — Andrew J. Fischer
*Assistant Examiner* — Chrystina Zelaskiewicz
(74) *Attorney, Agent, or Firm* — Barnes & Thornburg LLP

(57) ABSTRACT

A waste processing system (10) evaluates the waste processing requirements of a waste producing entity (20, 30) and evaluates the waste processing capabilities of vendors (40, 60, 80), and manages the waste processing of waste components produced by a waste producing entity (20, 30) by selecting vendors (40, 60, 80) to service the waste producing entity (20, 30).

26 Claims, 48 Drawing Sheets

Fig. 8C

| Plant Name: | Smith Plant |
|---|---|
| Plant Number: | 166 |
| Location: | Holland, MI |
| Contact Name: | John Doe |
| Contact Phone Number: | (616) 555-1234 |

| Waste-stream Number | Wastestream Name | Total 6 Month Volume for January 2000–June 2000 | Units | Pick-Up Frequency (Number of Pulls) | Treatment/Disposal/Recycle Method | Constituents (Hazardous Waste) | Current Vendor & Location |
|---|---|---|---|---|---|---|---|
| 6 | Cardboard | 8 | T | 2x/year | R | NH | ABC Grand Rapids |
| 21 | Plant Trash | 312.74 | T | 1x/week | L | NH | ABC Grand Rapids |
| | Holland Facility | | | 1.5x/week | | | Grand Rapids |

| Current Transporter | Container Number & Type, Choose From List. Indicate O for Owned or L for Lease | Total Monthly Costs for Leased Containers/Equipment | Unit Disposal Costs/Rebate | Unit Trans Costs | Total Costs for January–June 2000 |
|---|---|---|---|---|---|
| ABC Grand Rapids | (1) Trailer – L | Included | $0.00 | $90.00/load | $180.00 |
| ABC Grand Rapids | (2) Compactors – O | NA | $25.20 | $58/load | $11,769.88 |
| | (2) Rolloff Boxes – O | NA | $25.20 | $58/load | |

WASTE PROCESSING SYSTEM AND METHOD

This application claims benefit of U.S. Provisional Application Ser. No. 60/282,554, filed Apr. 9, 2001, the disclosure of which is incorporated herein by reference.

BACKGROUND AND SUMMARY OF THE INVENTION

The invention pertains to waste processing systems and methods, and more particularly to a waste processing network.

A waste producing entity generates hazardous wastes, and/or industrial wastes along with other by-products (solid waste, refuse, recyclables and reuse products) in its ordinary course of business. Generally, a waste component will refer to any one of the above-mentioned wastes or by-products. Compliance with regulations governing the management of these waste components is a critical requirement for a waste producing entity. To assist these waste producing entities, numerous waste management vendors offer services to manage these waste components. However, most vendors do not have the capability to handle all waste components, and thus the waste producing entity must engage multiple vendors to handle all its waste components. Illustratively, one particular vendor may provide treatment and disposal of hazardous wastes, but does not provide for the recycling of plastics. Accordingly, the waste producing entity must engage another vendor for the recycling of plastics it produces.

Each separate vendor is concerned only with the waste component(s) for which it is responsible, resulting in a fragmented waste management system and increased costs for the waste producing entity. Engaging multiple vendors increases administrative costs and potential liability for the waste producing entity, and makes it difficult for the waste producing entity to obtain complete assessments and information about its waste management activities. Each vendor uses different report formats detailing waste component management, requiring the waste producing entity to cull waste management data from a variety of different reports, thus increasing costs and time associated with waste management data collection. Furthermore, each vendor is pushing the service and technology they offer to maximize the spending provided by the entity. Thus, each vendor has little or no concern for the waste components managed by other vendors, and thus there is no incentive to achieve the most economical method of managing the entirety of the waste producing entity's waste components.

In accordance with the invention, a waste management system is provided that includes waste management data from a plurality of vendors. The waste management data is associated with each respective vendor.

Also according to the invention, the waste management data includes processing technology and performance data for each of the plurality of vendors.

Also according to the invention, the system includes an entity profile for a waste producing entity. The entity profile includes data related to waste components created by the waste producing entity.

Also according to the invention, the entity profile includes the manner in which these waste components are generated and the means in which these waste components are disposed.

Also according to the invention, creation of the entity profile also includes evaluating means to minimize or change the resultant make-up of the waste components being generated.

Also according the invention, creation of the entity profile includes evaluating the alternative raw materials used by the waste producing entity to minimize overall costs to the entity by minimizing the acquisition costs of these materials and by minimizing the waste processing costs associated with resulting wastes components derived from these materials.

Also according to the invention, the system compares the vendor waste management data to the entity profile to determine a recommended set of vendors, technologies, and processes to provide an overall waste management service for the waste producing entity.

Also according to the invention, the system stores waste component processing data for each waste producing entity. The waste component processing data includes information related to waste components processed by each vendor for the waste producing entity.

Also according to the invention, the system stores and manages regulatory data. The regulatory data includes information required to satisfy reporting requirements.

Also according to the invention, the system generates reports for a waste producing entity from the waste component processing data to satisfy reporting requirements based on regulatory data.

Also according to the invention, the waste management system includes a plurality of sensors located at a plant, the sensors connected to the waste management system through a network. The sensors provide information regarding waste produced by the plants to the waste management network, and the waste management network automatically notifies recommended vendor(s) of the waste processing requirements of each respective plant.

Also according to the invention, the system generates custom reports as determined by the waste producing entity.

A waste management method for managing the waste processing of waste components produced by a waste producing entity is disclosed. The method includes the steps of evaluating waste processing requirements of a waste producing entity; evaluating waste processing capabilities of a plurality of vendors; comparing the waste processing capabilities of each of the plurality vendors to the waste processing requirements of the waste producing entity; and selecting a set of vendors from the plurality of vendors to provide waste management service for the waste producing entity, the selection based on the comparison.

A waste management system for managing the waste processing of waste components produced by a waste producing entity is also disclosed. The system comprises means for storing waste processing requirements data of the waste producing entity; means for storing waste processing capabilities data for a plurality of vendors; means for comparing the waste processing capabilities data of each of the plurality vendors to the waste processing requirements data of the waste producing entity; and means for selecting a set of vendors from the plurality of vendors to provide waste management service for the waste producing entity based on the comparison.

Another waste management system is disclosed. The system comprises a computer storage medium storing waste management data associated with a plurality of vendors having waste management capabilities and providing waste management services and entity profile data associated with a plurality of waste producing entities having waste processing requirements and producing waste components; and a first computer system configured to access the computer storage medium and stored waste management data and entity profile data, and further configured to associate a set of vendors from the plurality of vendors to provide waste management service for the waste producing entity.

Another waste management method is also disclosed. The method includes the steps of creating a service network including a plurality of waste processing vendors; evaluating the waste processing capabilities of each of the waste processing vendors in the service network; receiving a waste processing service request from a waste producing entity; comparing the waste processing service request to the capabilities of the waste processing vendors in the service network; and selecting a vendor from the service network to fulfill the waste processing service request.

BRIEF DESCRIPTION OF THE DRAWINGS

The above-mentioned and other features of the present invention and the manner of attaining them will become more apparent, and the invention itself will be better understood by reference to the following description of the invention, taken in conjunction with the accompanying drawings:

FIG. 8C shows several records in an illustrative entity baseline;

FIG. 13B is another application screen associated with the present invention, the application screen displaying a service site list;

Figure 15:
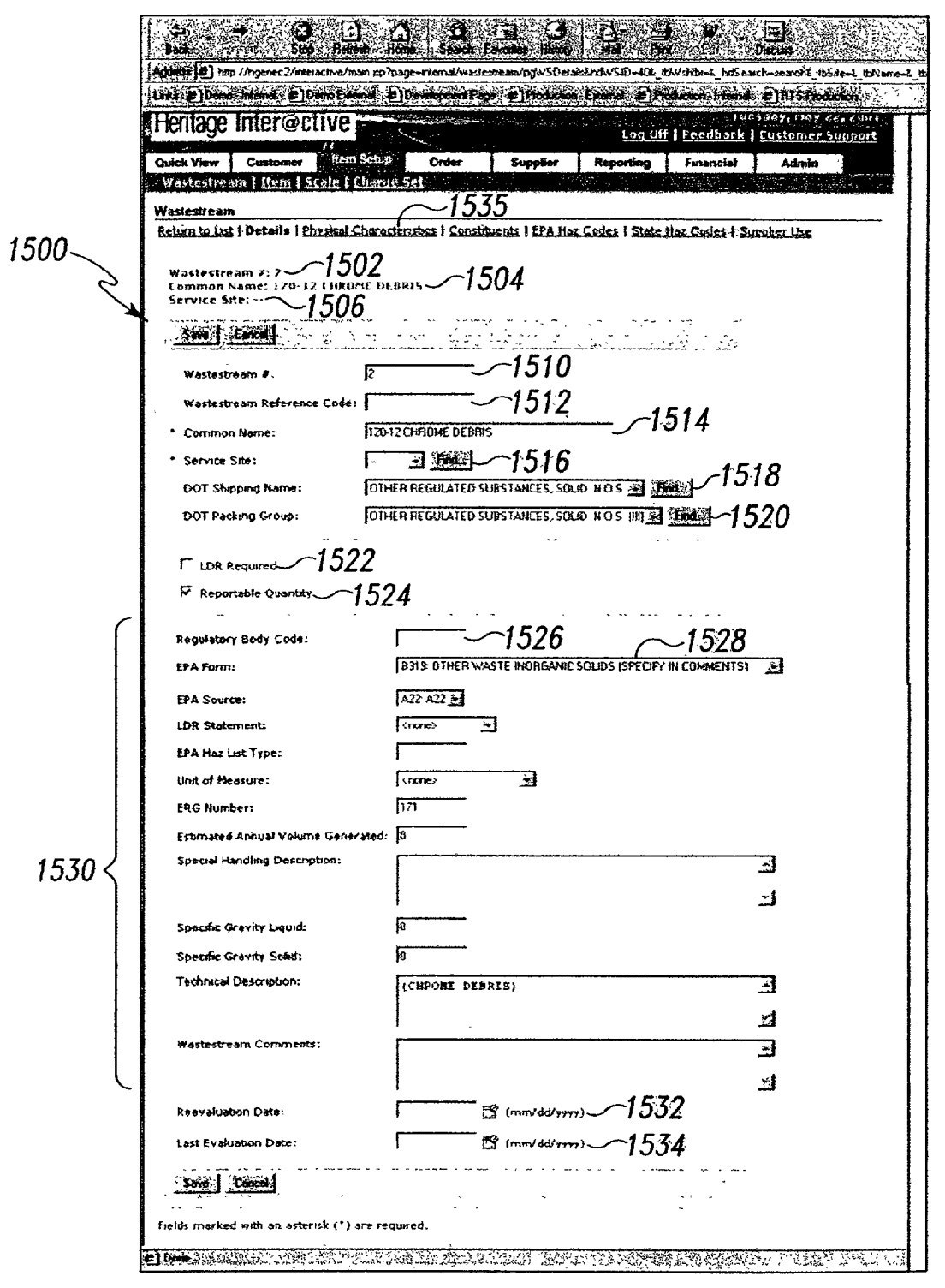

FIG. 15 is another application screen associated with the present invention, the application screen providing an interface to define the details of a particular wastestream and input associated data;

Figure 24:
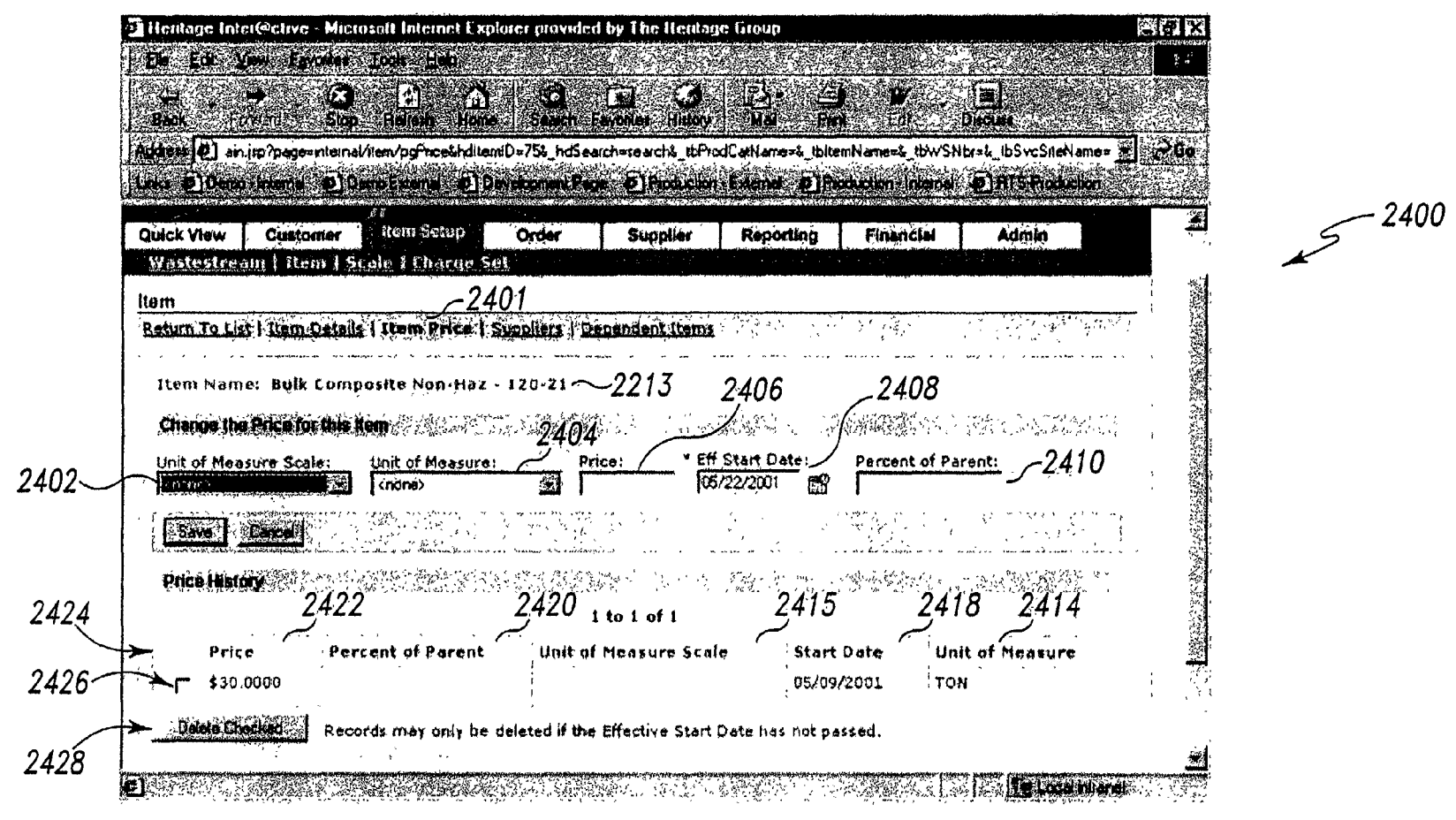

FIG. 24 is another application screen associated with the present invention, the application screen providing an interface through which the service provider sets the price of a particular item;

Figure 25:
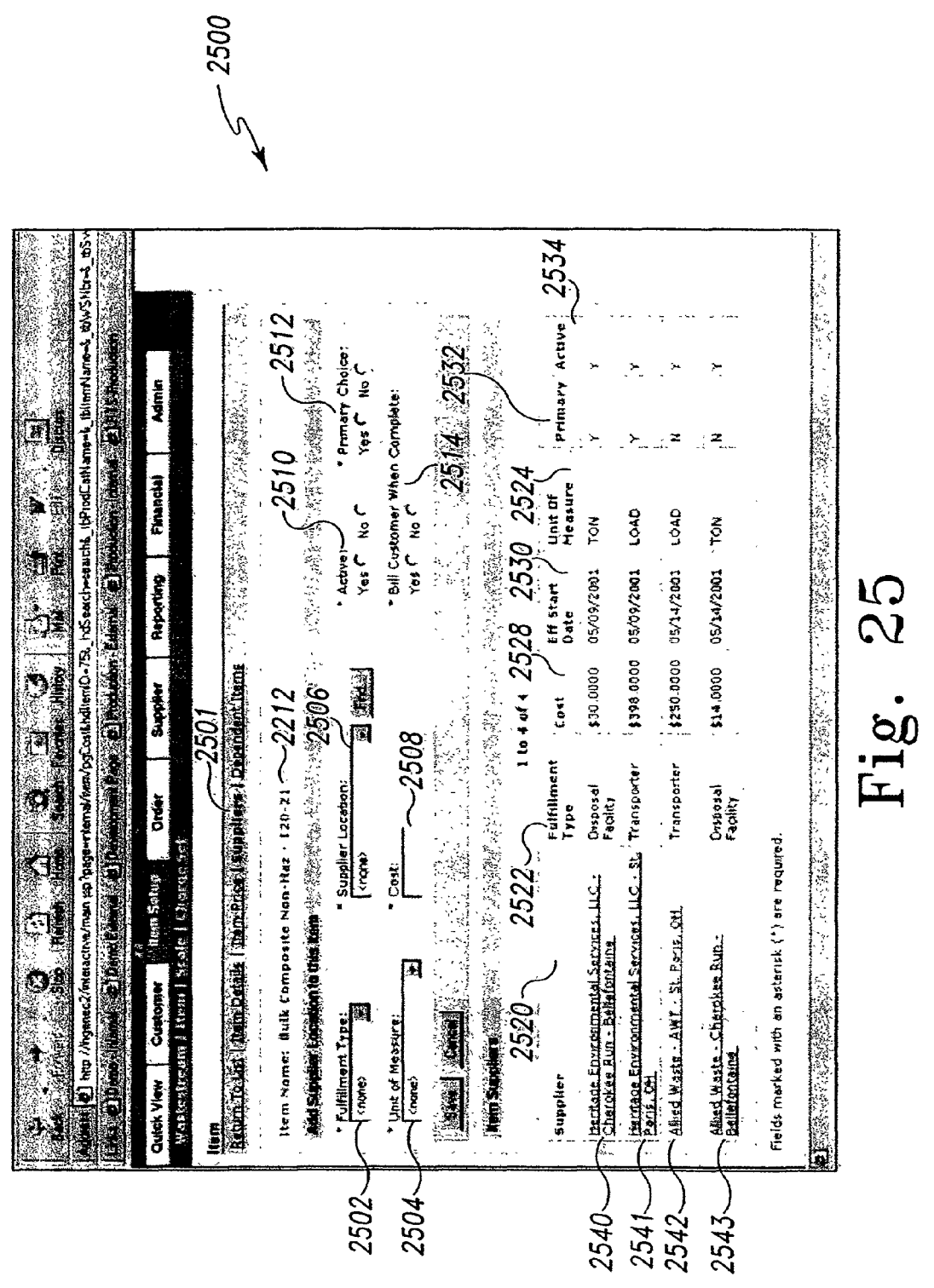

FIG. 25 is another application screen associated with the present invention, the application screen providing an interface to associate a supplier to an item listed in the customer's item list;

Figure 26:
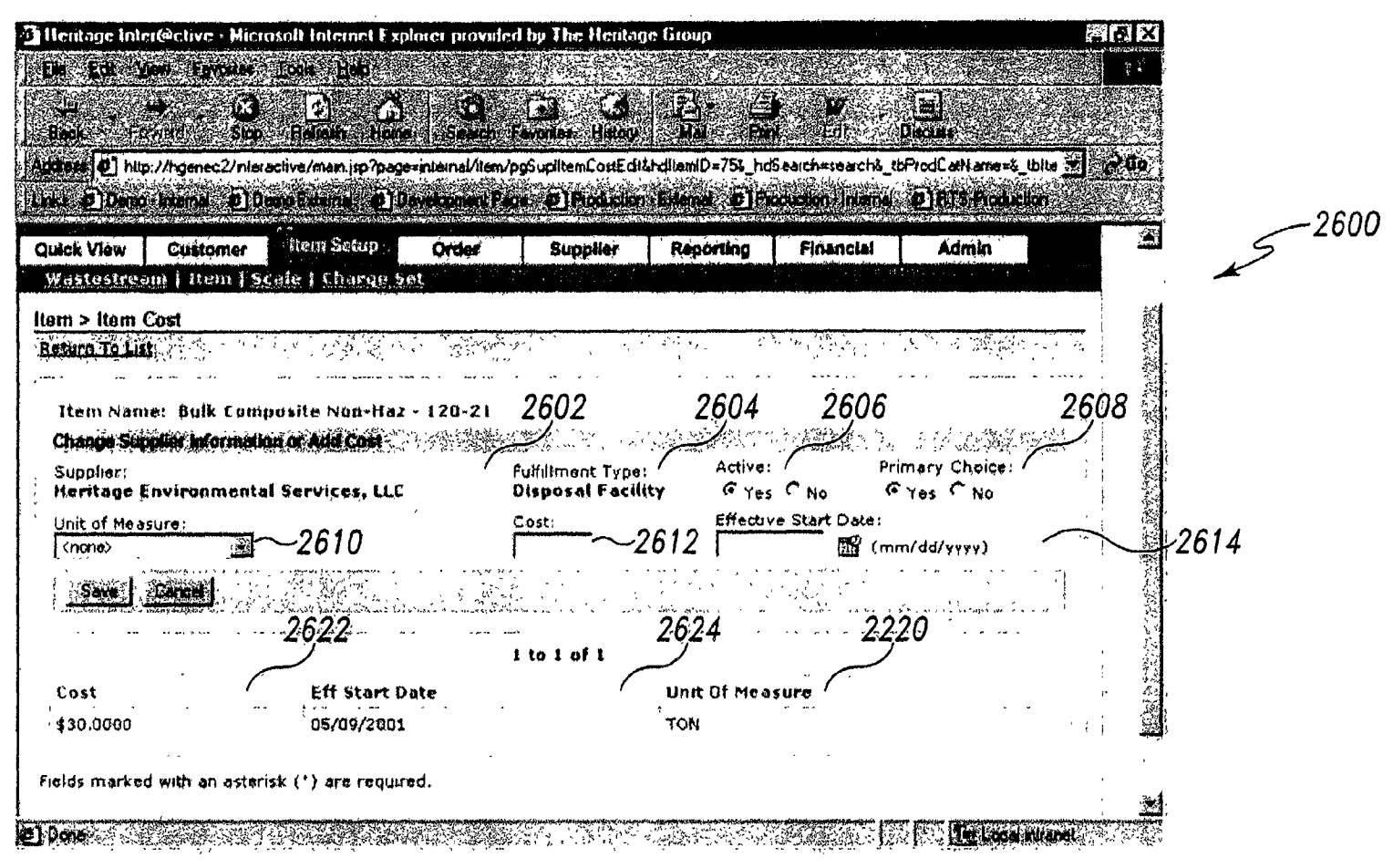

FIG. 26 is another application screen associated with the present invention, the application screen providing an interface through which the service provider associates supplier data with an item;

FIG. 28 is another application screen associated with the present invention, the application screen providing a list of transporter suppliers;

FIG. 29 is another application screen associated with the present invention, the application screen providing an interface through which the service provide adds or updates supplier transport data;

FIG. 30 is another application screen associated with the present invention, the application screen providing a list of supplier disposal facilities;

FIG. 36 is another application screen associated with the present invention, the application screen providing an interface through which the service provider sends the service order and related requirements to a supplier;

FIG. 37 is another application screen associated with the present invention, the application screen providing the supplier an invoicing interface though which the supplier invoices the service order;

FIG. 39 is another application screen associated with the present invention, the application screen providing the supplier an interface through which the supplier inputs the service occurrence charges;

FIG. 40 is another application screen associated with the present invention, the application screen providing the service provider an interface through which the service provider views and modifies the supplier invoice relating to the service order;

DETAILED DESCRIPTION OF THE DRAWINGS

Figure 1:
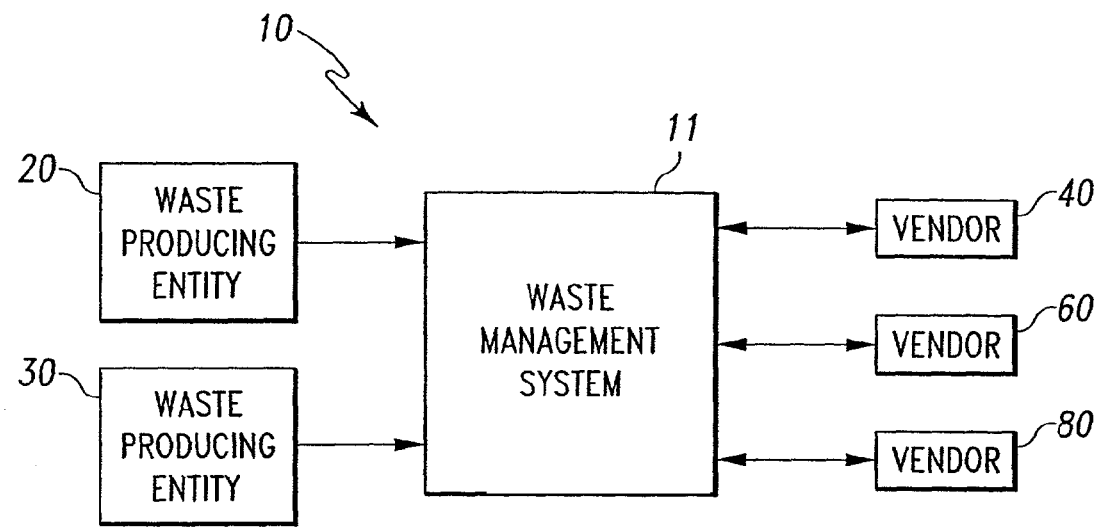
FIG. 1 is a block diagram illustration of a waste management system according to the exemplary disclosure used to provide waste management of waste produced by waste producing entities by using several vendors.

As shown in FIG. 1, a preferred embodiment of a waste management system 10 includes a service provider 11 arranging service between waste producing entities 20, 30, and vendors 40, 60, 80. Waste producing entities 20, 30 each produce one or more waste components. For example, entity 20 may produce a hazardous waste as a first waste component, and a recyclable plastic as a second waste component. Waste management vendors 40, 60, 80 are separate entities, each with the capability to manage a portion of the waste components produced by waste producing entities 20, 30. For example, vendor 40 may have the capability to manage hazardous waste produced by entity 20, and vendor 60 may have the capability to manage recyclable plastics produced by entity 20. Vendors 40, 60, 80 can have exclusive capabilities, meaning that the capability to handle any one waste component by one vendor is not shared by the remaining vendors. Alternatively, Vendors 40, 60, 80 can have nonexclusive capabilities, meaning that the capability to handle any one waste component by any one vendor is shared by one or more remaining vendors. Moreover, the capabilities of various vendors to handle the same waste component may involve different technologies and charges (i.e., costs). The set of vendors 40, 60, and 80 form a waste service network.

Figure 2:
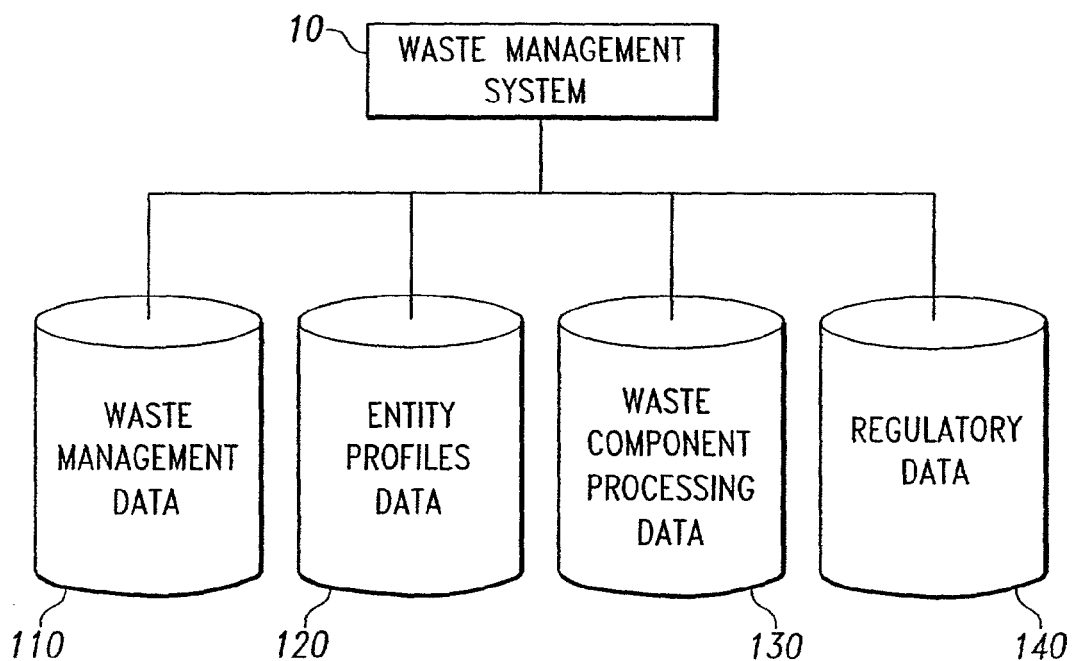
FIG. 2 depicts a database association of waste management data, entity profiles, waste component processing data, and regulatory data used in the waste management system.

As shown in FIG. 2, system 10 is configured to receive information related to the production and management of waste components. For example, system 10 is configured to collect vendor waste management data 110 for each vendor 40, 60 80. Illustratively, vendor waste management data 110 includes information regarding a vendor's capability to process various types of waste components (e.g., hazardous waste, industrial waste, refuse, recyclable plastics, recyclable cardboard, etc.), and costs associated with the processing. The system is also configured to create and store entity profile data 120 for each entity 20, 30. Entity profile data 120 illustratively include what waste components are produced by each entity, the manner in which each waste component is produced, the volume of each waste component produced, and how the waste components are stored. Entity profile data also includes processing costs associated with each waste component produced. Additionally, entity profile data 120 also include jurisdictional data. Jurisdictional data includes the jurisdiction of the waste producing entity 20, 30 (e.g. state and federal indicia).

The system 10 is further configured to collect waste component processing data 130 from each vendor 40, 60 80. Waste component processing data 130 illustratively include information related to waste components processed by each vendor 40, 60, 80 for each waste producing entity 20, 30, such as processing dates, associated costs, and volume of waste components processed.

The system 10 is also configured to collect regulatory data 140. Regulatory data includes reporting requirements based on jurisdictional regulations, e.g., United States regulatory data includes both state and federal regulatory requirements. Waste management data 110, entity profile data 120, waste component processing data 130 and regulatory data 140 are illustratively stored in a database format.

Figure 3:
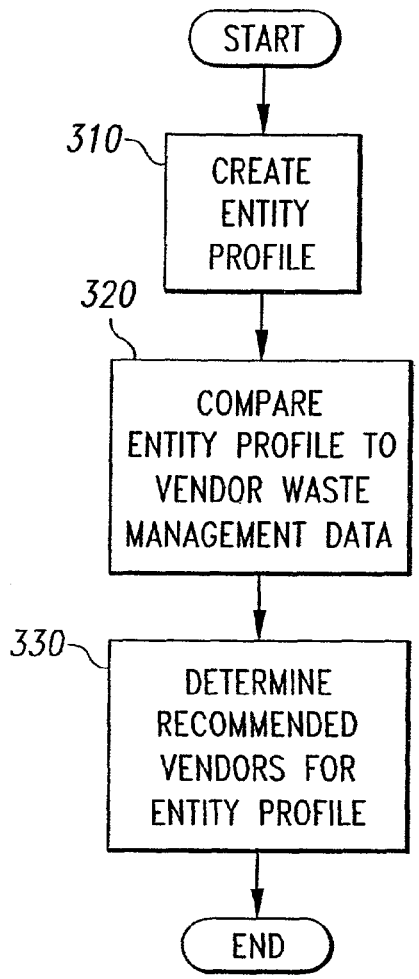
FIG. 3 is a flow diagram describing the process of determining recommended vendors based on a waste producing entity profile.

The system 10 is configured to recommend a group of waste management vendors 40, 60 80 that matches the waste management needs of a particular waste producing entity 20, 30. System 10 matches a waste management vendor 40, 60, 80 capabilities to process particular waste components with the particular waste components produced by waste producing entity 20, 30. FIG. 3 illustrates the process of determining recommended vendors for one of the waste producing entities 20, 30 based on an entity profile. In step 310, an entity profile for entity 20 is created, based on the waste producing entity 20 waste management requirements. Illustratively, an entity profile includes waste components produced by entity 20, and the volumes of each waste component produced. Additionally, the entity profile can include other requirements, such as transportation requirements, processing frequency, manners in which waste components are generated, etc.

The entity profile is stored in the entity profiles data 120, and compared to the vendor waste management data 110, as shown in step 320. Each vendor's 40, 60, 80 capability stored in the vendor waste management data 110 is compared to the entity profile data 120 of entity 20. Each vendor 40, 60, and 80 with a capability to process a waste component produced by entity 20 can be recommended to provide a portion of the overall waste management service for entity 20, as shown in step 330. However, depending on other waste management data 110, such as cost, transportation capability, historical compliance performance, quality of service, geographic location, etc., associated with each vendor 40, 60, 80, one vendor can be selected over other vendors in the event that all vendors 40, 60, 80 share the capability to process the same waste component. Alternatively, a vendor can be recommended by request of a particular waste producing entity. The recommended vendor is a primary vendor.

Accordingly, entity 20 benefits from a more efficient and economical waste service. For example, entity 20 produces a refuse waste component, a recyclable plastics waste component, and a hazardous waste component. Vendor 40 is capable of managing recyclable plastics waste components only, while vendor 60 can manage both solid waste and recyclable plastics waste components. Vendor 80 can manage hazardous waste components. The system 10 determines the most economical and efficient combination of vendors 40, 60, 80 for entity 20. Depending on the processing technologies, costs, historical compliance performance, quality of service, etc. associated with vendors 40 and 60, the system may recommend vendors 60, 80 to manage the waste produced by entity 20 if the combination of vendors 60, 80 is the most economical combination for entity 20. Alternatively, if the most economical combination of vendors is vendors 40, 60, 80, the system 10 will recommend this combination to manage the waste components produced by entity 20.

Of course, one of ordinary skill in the art will recognize that concerns other than the most economical recommendation may result in an alternative combination of vendors. For example, while the combination of vendors 40, 60, 80 may present the most economical choice for entity 20, vendors 60, 80 may nevertheless be recommended if vendor 40 has external considerations overriding lower processing costs. Illustrative external considerations include vendor 40 having a lower quality of service, or a history of noncompliance with jurisdictional regulations.

Similarly, entity profile data 120 may include data that indicates entity 20 requires frequent pick-up of a particular hazardous waste; thus, the primary factor in determining which vendor to service entity 20 is the vendor's capability to frequently pick up the particular hazardous waste, rather than the processing cost of the particular waste chemical.

Figure 4:
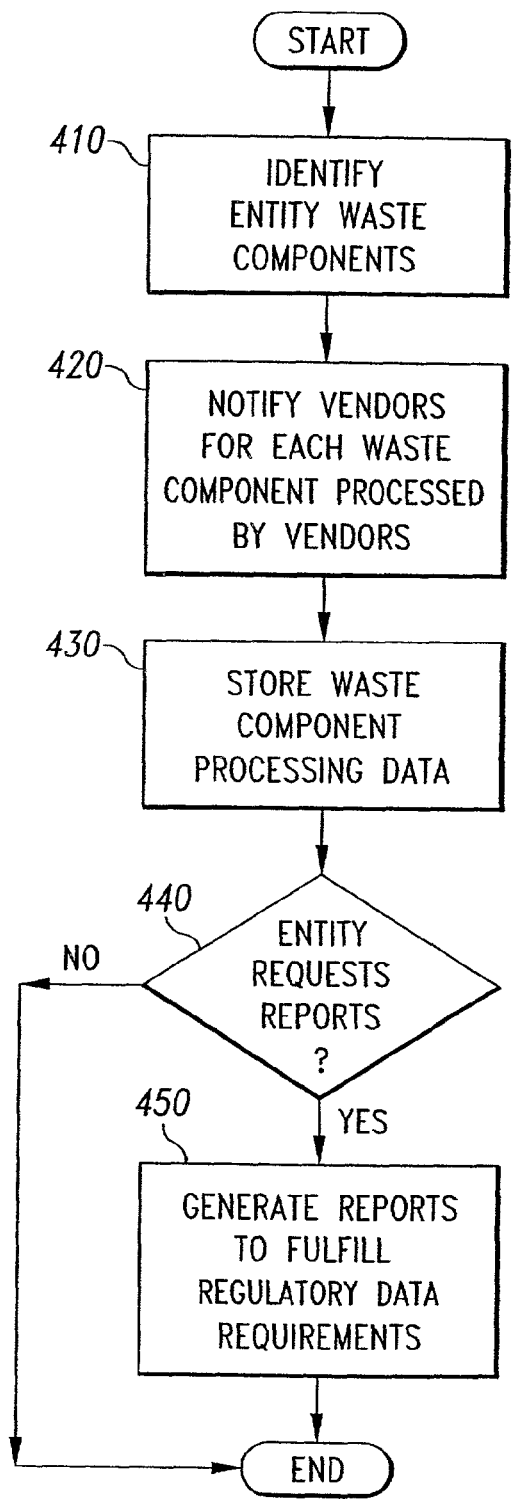
FIG. 4 is a flow diagram of the processing of waste components produced by a waste producing entity, including the step of generating reports in accordance with regulatory requirements.

Management of waste in accordance with the waste management system 10 is described in FIG. 4. In step 410, the waste components produced by entity 20 that require processing are identified, as entity 20 may not require processing at a particular time of all waste components detailed in its entity profile. For example, entity profile of entity 20 may include dozens of waste components, resulting in several recommended vendors 40, 60, 80 to provide overall waste management. However, each waste component can be processed at different times and frequency (e.g., weekly, monthly, quarterly, etc.). Thus, for a given month, entity 20 may require processing of only a portion of its waste components. Once the waste components are identified, the recommended vendors 40, 60, 80 required to process the waste components are notified in step 420. The recommended vendors 40, 60, 80 process the waste components and the resultant waste component processing data 130 is stored in system 10, as shown in step 430. Billings are consolidated and thereafter sent to entity 20, thus reducing administrative burdens associated with multiple vendors 40, 60, 80. Additionally, entity 20 now has access to consolidated volumetric and financial data related to all of its waste management services and requirements.

Should entity 20 be required to produce periodic regulatory reports to local, state, or federal regulators, entity 20 submits a request to generate the regulatory reports in step 440. Entity 20 specifies which reports are required, and in step 450, system 10 compares the entity profile of entity 20 to the waste component processing data 130 and regulatory data 140 to produce the required regulatory reports. Alternatively, system 10 is configured to auto-generate required regulatory reports as needed by entity 20. Thus, entity 20 automatically receives regulatory reports as needed.

Alternatively, entity 20 can generate waste management reports according to custom formats for internal and other purposes as determined by the entity 20. Illustratively, these custom reports can be generated by by-product volumes, by-product types, recycling and reuse data, waste and environmental spending, waste producing site-level data, and entity-level data.

Figure 5:
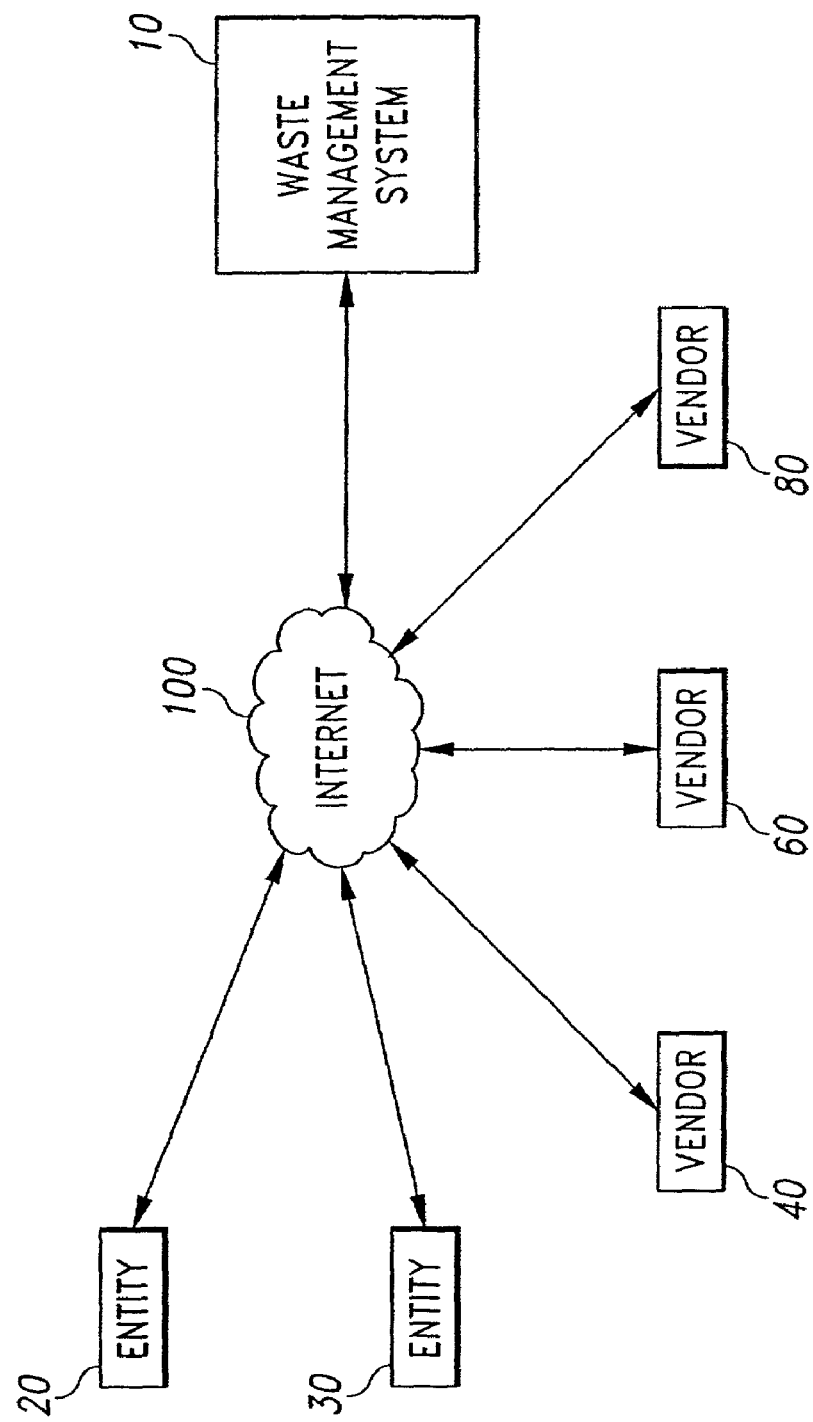
FIG. 5 is a block diagram illustration of the waste management system, wherein the vendors, waste producing entities and waste management system are interconnected through the Internet.

FIG. 5 is an exemplary embodiment of the disclosure. Illustratively, vendors 40, 60, 80, and entities 20, 30 are coupled to the waste management system 10 via the Internet 100. Of course, one of ordinary skill in the art will recognize that other networks may be substituted for Internet 100, such as a WAN, Intranet or other known communication systems. Waste management system 10 is implemented on a server computer coupled to the Internet 100, and entities 20, 30 and vendors 40, 60, 80 communicate with waste management system 10 via personal computers (PCs), or other access devices known to those of ordinary skill in the art. Commercially available web browser software, such as Microsoft Internet Explore or Netscape Navigator is used to interface with the waste management system 10. Of course, one of ordinary skill in the art will recognize that the application program need not be web based software; stand alone, dedicated applications are also within the scope of the invention. Consolidated financial and volumetric information, waste component processing data, and regulatory reports and requirements can be viewed on-line and downloaded to a PC located at each entity 20, 30.

Waste producing entity 20, 30 submits its current management requirements for its waste components via the PC or other access devices. These management requirements are evaluated by waste management system 10 as previously described in reference to FIGS. 2-4, and the recommended vendors 40, 60, 80 are notified to provide service.

Figure 6:
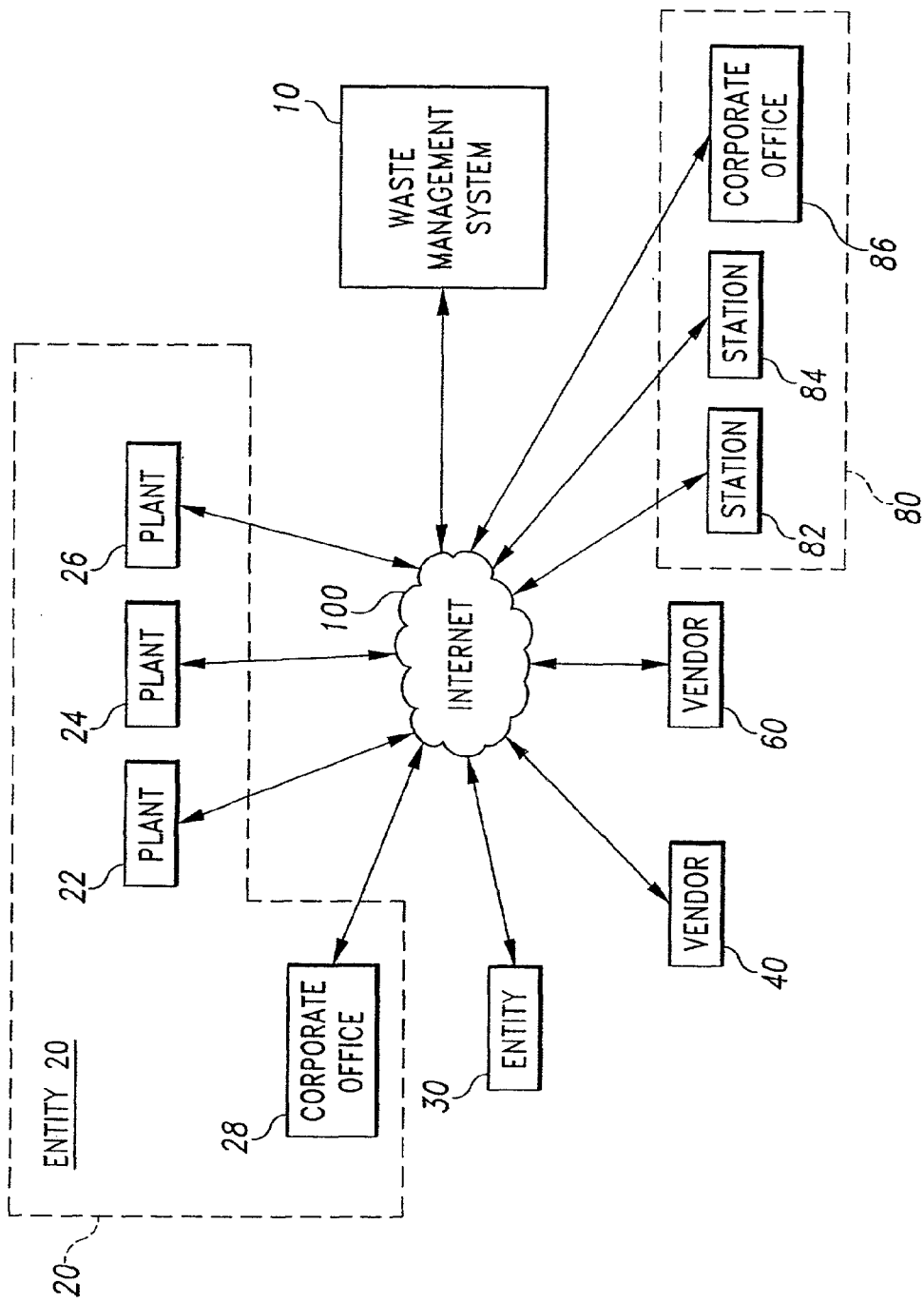
FIG. 6 is a block diagram illustration of the waste management system, wherein the vendors, waste producing entities and waste management system are interconnected through the Internet, and wherein one of the entities includes several separate plants, and one of the vendors includes several separate stations.

FIG. 6 is an alternative exemplary embodiment of the disclosure. The embodiment is the same in all respects as the embodiment described in FIG. 5, except that entity 20 includes remote plants 22, 24, and 26, and a corporate office

28. Each plant 22, 24 and 26 is included in the entity profile data 120 of entity 20, and each plant 22, 24 and 26 accesses waste management system 10 via the Internet and PCs. Each plant 22, 24 and 26 can separately use waste management system 10 to manage its respective waste components. Corporate office 28 is responsible for ensuring that entity 20 is in compliance with internal and regulatory requirements while reviewing reports on the activities of plant 22, 24, and 26. Thus, entity 20 now has access to consolidated financial and volumetric data related to all of its waste management services and requirements for all of its respective plants 22, 24 and 26 via system 10.

Of course, a particular vendor can also be subject to a similar hierarchy as illustrated with respect to vendor 80 in FIG. 6. Vendor 80 includes stations 82, 84 and corporate office 86. Corporate office 86 is responsible for ensuring that vendor 80 is in compliance with internal and regulatory requirements, and for billing activities related to stations 82 and 84.

Figure 7:
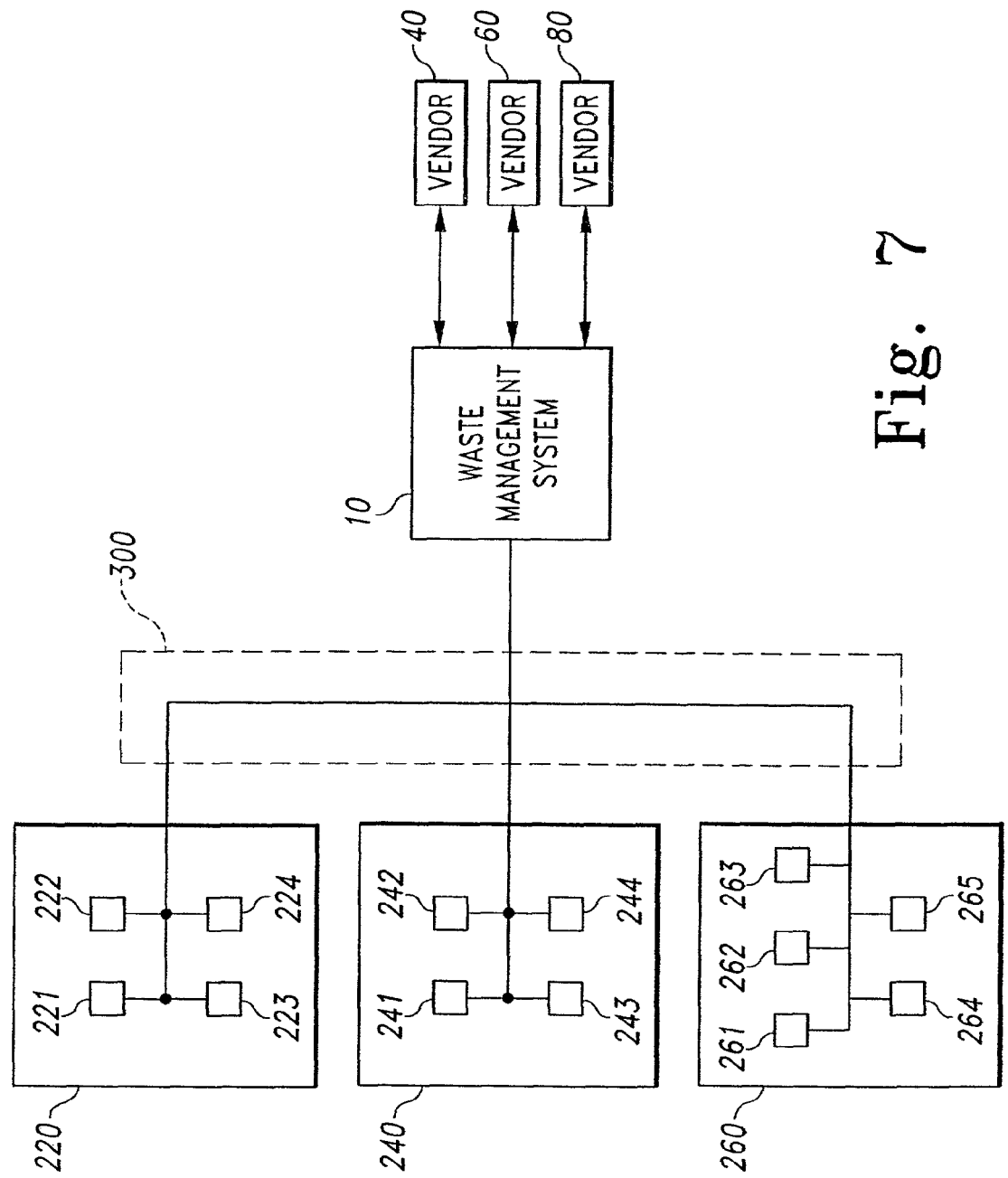
FIG. 7 is a block diagram illustration of the waste management system, wherein a plurality of plants having a plurality of sensors is connected to the waste management system through a network. The sensors provide information regarding waste produced by the plants to the waste management network, and the waste management network automatically notifies recommended vendor(s) of the waste processing requirements of each respective plant.

In an additional exemplary embodiment of the disclosure, the waste management system 10 includes waste monitoring and other by-product monitoring through a plurality of sensors, as shown in FIG. 7. Waste management system 10 monitors plants 220, 240 and 260 though a plurality of interconnected sensors in each plant and a network 300. Plants 220, 240 and 260 are at different geographic locations and can belong to one waste producing entity, or each may belong to separate waste producing entities. Network 300 can be a collection of phone lines, a dedicated network, a WAN, Intranet, satellite-based global network, or the Internet. In plant 220, sensors 221, 222, 223, and 224 monitor wastes and other by-products. For example, sensor 221 is a level sensor in a storage tank used to store hazardous waste, sensor 222 is a weight sensor in a roll-off box used to store recyclable plastics, etc. Likewise, sensors 241, 242, 243, and 244 monitor wastes and other by-products in plant 240, and sensors 261, 262, 263, 264, and 265 monitor wastes and other by-products in plant 260. It is understood that any type of waste sensor may be used in connection with the present invention. These sensors include optical sensors, sound sensors, weight sensors, etc., that are well known in the art.

Activation of a sensor indicates that management of the waste or by-product is required. For example, activation of sensor 221 indicates that the volume of hazardous waste in a storage tank has reached a particular volume and the hazardous waste needs to be removed and processed by a vendor. A signal from sensor 221 is sent to waste management system 10, and a recommended vendor is notified that the chemical waste in the storage tank containing sensor 221 in plant 220 has reached a particular volume and needs to be removed and processed by the vendor. The recommended vendor has been previously determined based on the entity profiles data 120 and vendor waste management data 110 as described above.

Once the recommended vendor provides the required service, the signal from sensor 221 is canceled. If a recommended vendor fails to respond within a specified time period, an alternate vendor can be notified to respond, and the request to the recommended vendor is canceled.

Figure 8A:
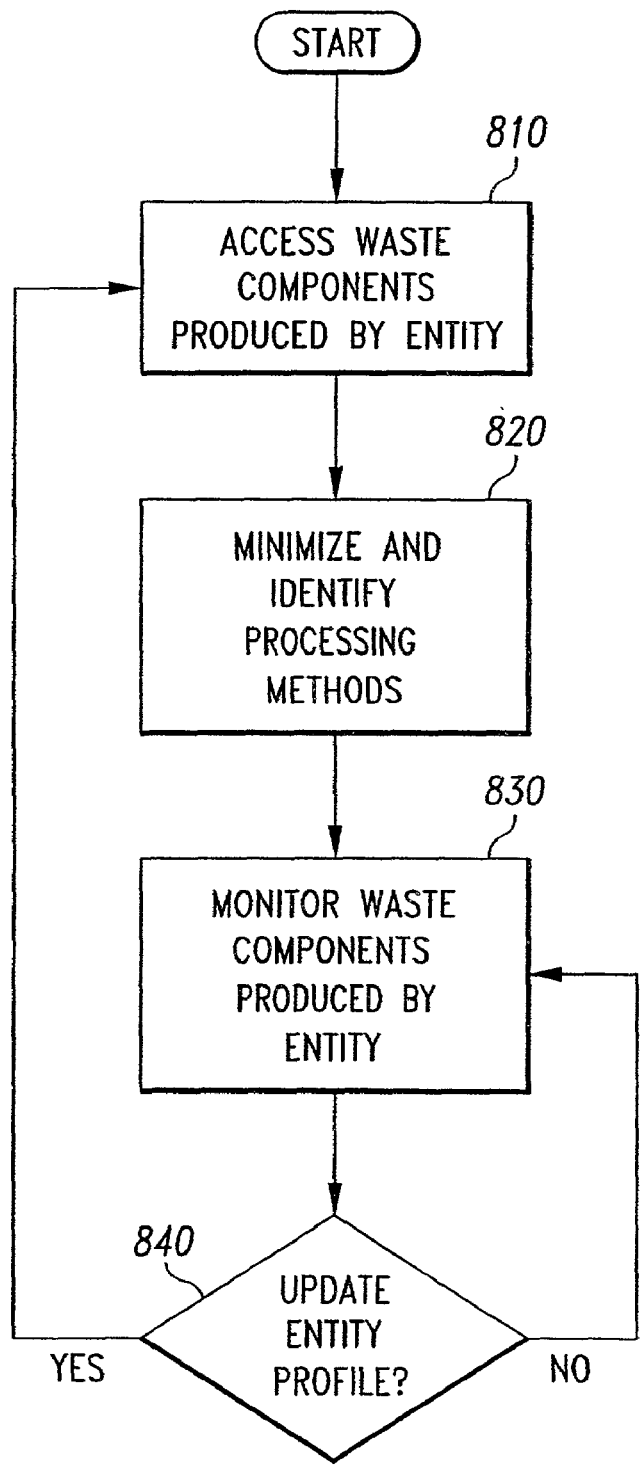
FIG. 8A is a flow diagram describing the process of creating and maintaining an entity profile.

The process of creating and maintaining an entity profile and related entity profile data 120 is described in the illustrative flow diagram of FIG. 8A. Step 810 involves the assessment of waste and by-products produced by a waste producing entity. This assessment includes evaluation of hazardous wastes, and/or industrial wastes along with other by-products (solid waste, refuse, recyclables and reuse products), including the raw materials used in the waste and by-product producing process, volume of each category produced, frequency of production, and unique requirements for each waste producing entity. Generally, a waste component will refer to any one of the above-mentioned wastes or by-products. Such unique requirements may include frequent pick-up of the waste component, transportation requirements, etc. Assessing in step 810 the waste components produced by the entity, the waste component producing processes involved, and the unique requirements produces an entity baseline.

Figure 8B:
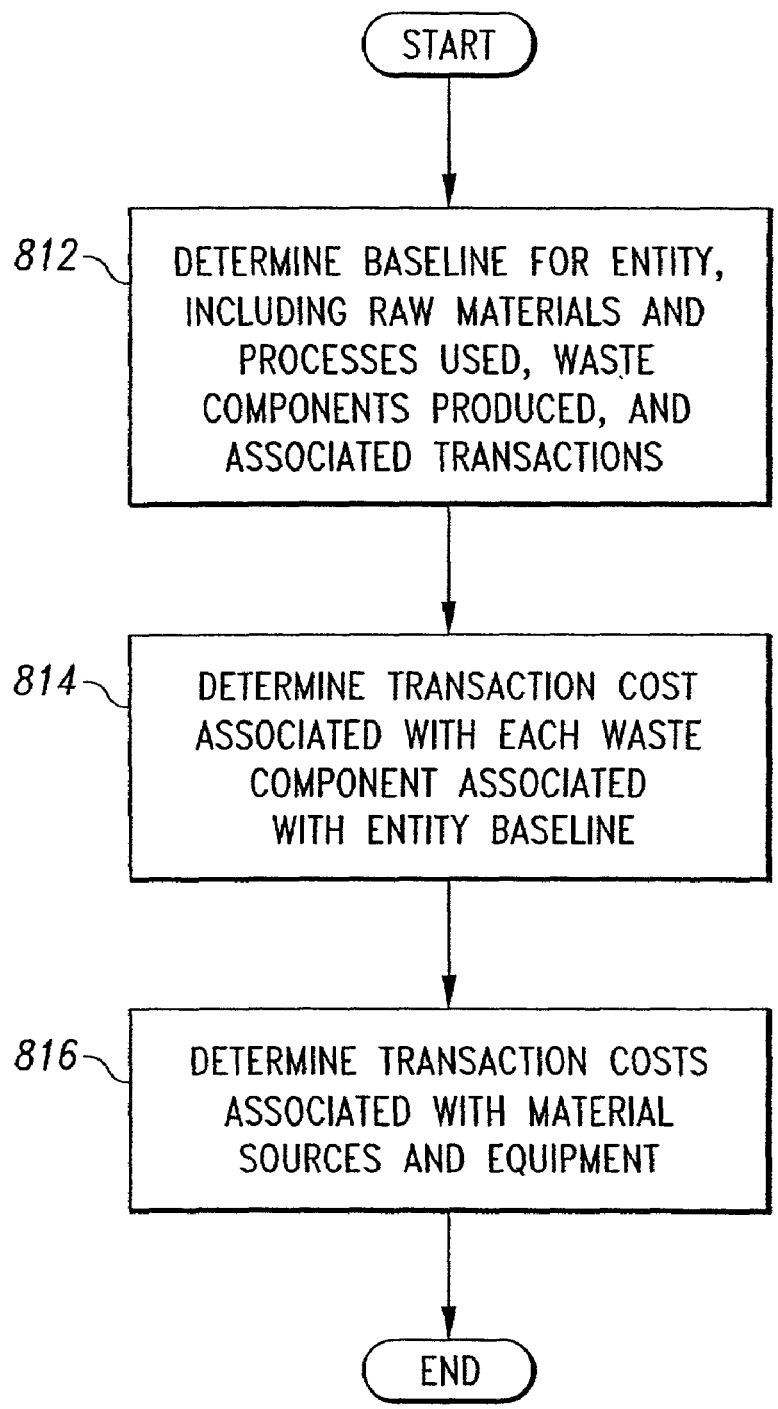
FIG. 8B is a flow diagram describing the process of creating and maintaining an entity baseline.

FIGS. 8B and 8C provide further description of the entity baseline. FIG. 8B provides a flow diagram of the process of creating and maintaining an entity baseline. In step 812, the raw materials and processes used by the waste producing entity are identified, as are the waste and by-products produced, and the associated transactions related to each, e.g., the number and quantity of raw materials used, the frequency of shipment of raw materials into the waste producing entity, the frequency and quantity of waste and by-products removed, etc.

In step 814, the transaction cost associated with each waste component and by-product produced by the waste producing entity is determined. The transaction cost is related to the actual cost of removing or treating the particular waste component, and the frequency of removal or treatment.

In step 816, the transaction cost associated with the raw material sources and processing equipment is determined. This includes the cost of the raw materials, and the cost of associated equipment, e.g., storage tank rental/lease/depreciation costs, etc.

An example of an entity baseline is shown in FIG. 8C. Section 850 contains location and contact information for a particular waste producing entity. Field 852 includes a wastestream number. A wastestream is associated with a particular waste component produced by a waste producing entity 20, 30. Field 854 includes the wastestream name.

Field 856 includes a volume for a certain period of time. Illustratively, a six month volume is shown. Field 858 provides the units associated with the volume listed in Field 856.

Field 860 is the service frequency associated with the wastestream. Field 862 indicates the treatment/disposal/recycle method associated with a particular wastestream. Illustratively, an R stands for recycling; an L stands for landfill.

Field 864 describes whether the wastestream is hazardous or non-hazardous. Illustratively, the cardboard wastestream and the plant trash wastestream are non-hazardous waste materials.

Field 866 lists the current vendor associated with the wastestream, and field 868 lists the current transporter associated with the wastestream. Different entities may be listed in Fields 866 and 868. For example, a current vendor may be contracted to handle a particular wastestream, and a transporter may be contracted to transport that waste material to the particular vendor listed in 866.

Field 870 lists the equipment associated with each wastestream. Field 872 lists the total monthly cost associated with equipment listed in 870.

Field 874 includes a unit disposal cost or rebate for the wastestream, and Field 876 lists the transportation cost for the wastestream on a per unit basis. Field 878 lists the overall cost for the time period listed in Field 856. Of course, one of ordinary skill in the art will understand that the base line described herein is illustrative only, and the associated field data is not exhaustive.

After a full assessment of the waste producing entity is conducted and the baseline obtained, step 820 of FIG. 8A involves the minimization of the resultant waste components and/or change its make-up to facilitate waste processing at a lower overall cost. This step also includes minimizing raw material acquisition costs to the waste producing entity 20, 30. Additionally, minimization occurs with respect to the cost of a waste processing service. Accordingly, minimization may result in production of a larger number of waste components if such larger production results in waste components that are disposed of through less expensive processes. Furthermore, waste and by-product processing methods are identified in Step 820.

Minimization of the waste components and/or changing its make-up reduces the resultant waste volumes, facilitates its processing, and/or reducing the cost of such processing. For example, revising the operational processes of waste-producing entity 20, 30 may provide for removing some of the water from the waste component, resulting in generation of lower volumes of the waste component but in stronger concentrations. Since vendor 40, 60, 80 often charge for processing waste components based on volume (among other criteria), the cost to waste-producing entity 20, 30 for processing lower volumes of this waste component may be lowered. Furthermore, lower volumes translate into lower transportation costs since such costs are directly proportional to volume and weight.

Figure 8D:
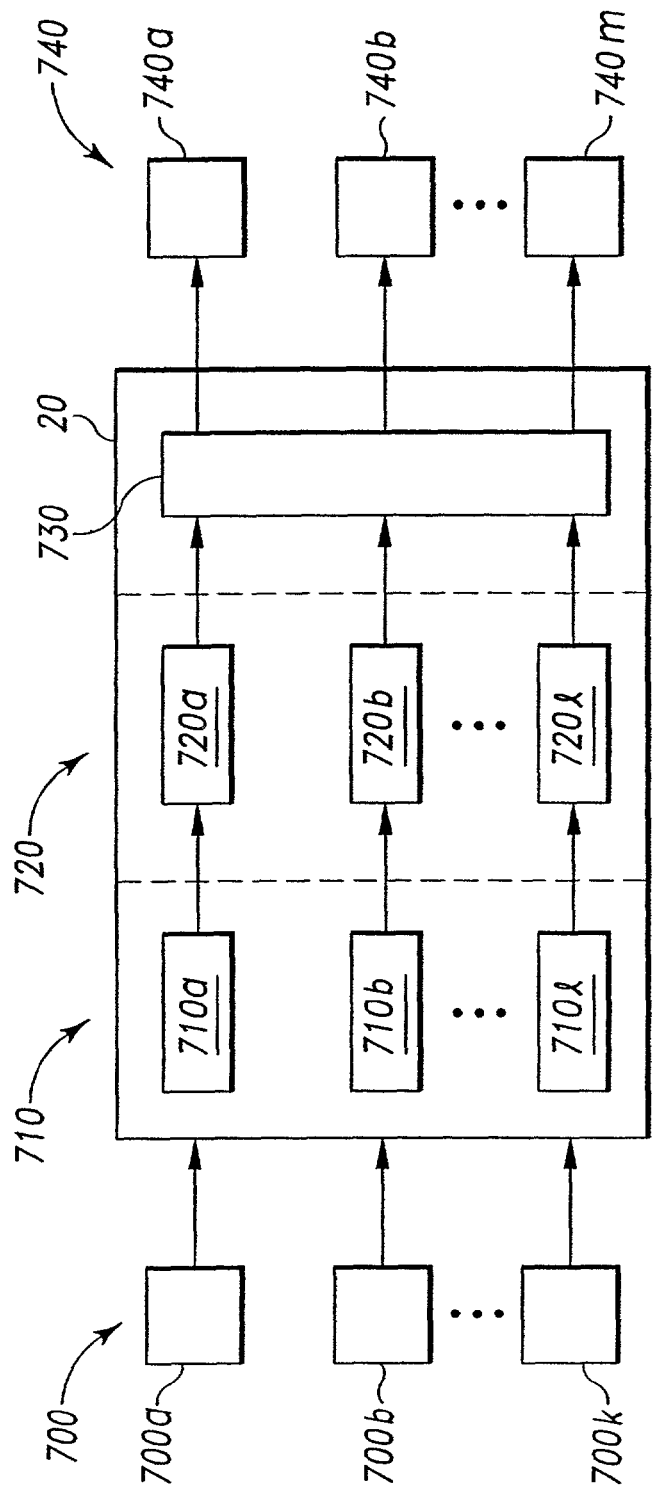
FIG. 8D is a block diagram of various stages of waste and by-product producing processes associated with a waste producing entity.

Minimization occurs in several stages associated with the waste producing entity 20, 30. As depicted in FIG. 8D, several stages that affect waste component production are associated with a waste producing entity 20. In procurement stage 700, waste producing entity procures a plurality of raw materials 700a-700k. Exemplary raw materials are particular chemicals, pallets, plastic containers for consumable materials, cardboard packaging material, etc.

In processing stage 710, waste producing entity processes the raw materials 700a-700k in various processes 710a-710l. Exemplary processing stages are electroplating processing, chemical production processes, cleaning processes, etc.

In the waste component production stage 720, a plurality of waste component sets 720a-720l are produced corresponding to each process 710a-710l. Each waste component set 720a-720l contains one or more particular waste components. For example, waste component set 720 contains cardboard, pallets, empty containers, and a caustic liquid, while waste component set 720b contains only cardboard.

Evaluation of the raw materials 700 used by waste producing entity 20 will identify raw materials 700 which the waste producing entity 20 may discontinue use, substitute with other raw materials, or change the purchasing volume to produce lower volumes of waste components or reduce the waste component processing cost. For example, raw material 700a is a solvent purchased in 30 gallon drums, with four 30 gallon drums per shipping pallet. However, the same solvent can be purchased in 55 gallon drums, with four 55 gallon drums per shipping pallet. Purchasing the solvent 700a in 55 gallon drums will reduce the number of drums and pallets requiring removal, thus reducing overall costs.

Similarly, evaluation of processing stage 710 and waste component production state 720 will identify changes in processing stage 710 to further minimize waste component production. For example, processes 710a and 710b may be conducted on different monthly cycles. Process 710a produces an acidic waste component, and process 710b produces a basic waste component. However, as processes 710a and 710b are not synchronized, each component is being removed and treated at a higher transaction cost than the transaction cost associated with synchronizing processes 710a and 710b in order to mix the waste components and produce a less hazardous waste component.

In a pretreatment stage 730, certain waste components from waste components sets 720a-720l are combined to reduce processing costs. For example, an acidic waste component can be combined with a basic waste component, thus neutralizing the resultant component. As the neutralized component is less hazardous, removal and/or treatment by a vendor 40, 60, 80 is less costly.

In treatment stage 740, the resulting outgoing waste components 740a-740m are removed and processed by vendors 40, 60, 80. The processing method for each waste component is selected based on the make-up of the particular type of waste component, the volume generated, and frequency of production. Of course, other variables may be included in selecting the processing method, such as a maximum cost ceiling imposed by the waste producing entity, and the potential liability associated with the particular waste component.

Completion of step 820 creates the entity profile for waste producing entity 20, 30, and the associated data is stored in the entity profiles data 120. Because the waste producing entity 20, 30 will periodically change its processing operation, the associated entity profile must be monitored to ensure accurate reflection of the waste components and requirements of waste producing entity 20, 30. Thus, as waste components from waste producing entity 20, 30 are processed by the waste management system 10, the resultant waste component processing data 130 is compared to the entity profiles data 120. Furthermore, changes in internal processes 710a-710l and associated raw materials 700a-700kn are monitored. In the event that significant deviations occur between entity profiles data 120 and waste component processing data 130, the related entity profile is updated in accordance with step 840 by repeating steps 810-830 as described above. Alternatively, entity profiles may be scheduled for periodic updates, e.g., quarterly, annually, etc.

Figure 9:
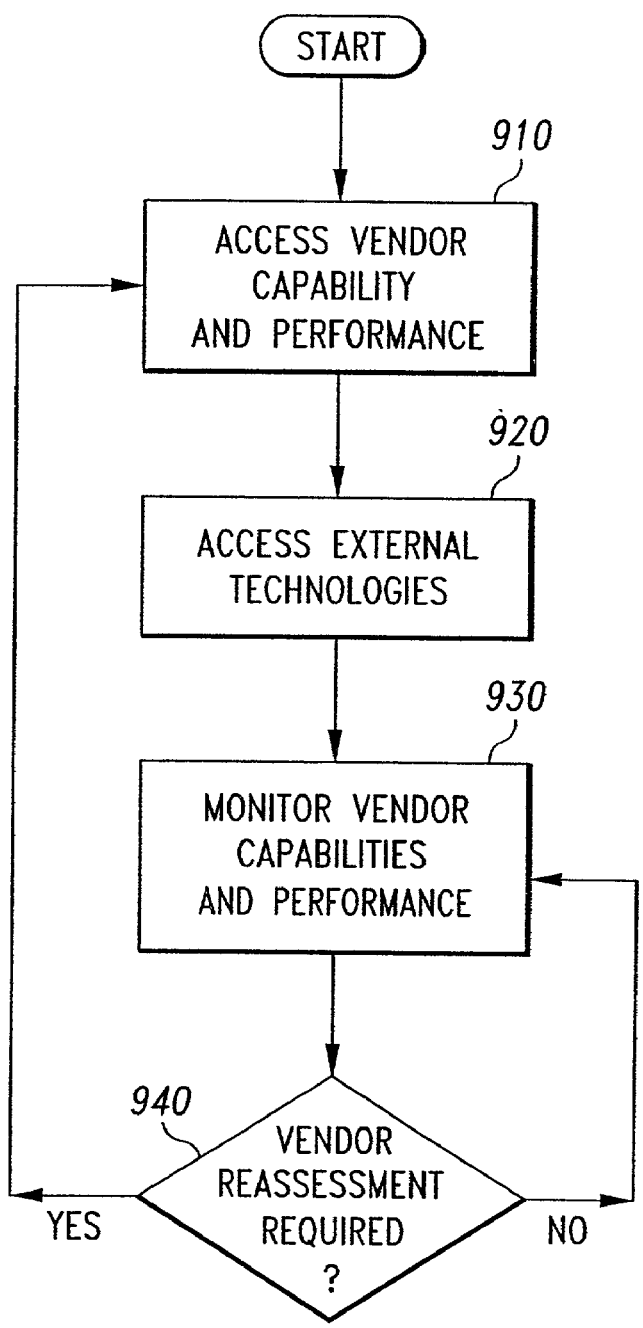
FIG. 9 is an flow diagram describing the process of creating and maintaining waste management data.

Waste management data 110 is likewise created and maintained as described in the illustrative flow diagram of FIG. 9. In step 910, vendor capability and performance is assessed. Illustratively, this assessment includes collecting data regarding the vendor's processing capabilities, including processing technology, costs and charges, and transportation requirements. Vendor performance is also assessed. Illustratively, data associated with vendor performance includes regulatory compliance and noncompliance data. For example, if a particular vendor has a history of noncompliance with jurisdictional regulations, there is an increased likelihood that the vendor will not be a recommended vendor for an entity producing a waste component within the vendor's capability. Conversely, if the particular vendor has a strong history compliance with jurisdictional requirements, the vendor is much more likely to become a recommended vendor for an entity producing a waste component within the vendor's capability.

After the vendor's capabilities and performance is assessed in step 910, the vendor's capabilities and performance are compared to external technologies in step 920. External technologies include data related to the relative efficiency and risks associated with the processes used by the vendor as compared to the capabilities and technologies of all other vendors overall. Completion of step 920 results in the waste management data 110 associated with a particular vendor.

The vendor's capabilities, performance and comparison include both quantitative and qualitative data. Quantitative data includes percentage of on-time performance, number and magnitude of regulatory actions, age of equipment and infrastructure, etc. Qualitative data includes customer satisfaction, ability of the vendor to respond to customer or service provider complaints, etc.

Because the vendor 40, 60, 80 can periodically change its processing technology, or their performance may change over time, the waste management data 110 must be monitored to ensure accurate reflection of the capability and performance of vendor 40, 60, 80. Thus, as waste components from waste producing entity 20, 30 are processed by the vendor 40, 60, 80, the resultant waste component processing data 130 is compared to waste management data 110. Furthermore, external data regarding vendor 40, 60, 80 is also compared to waste management data 110. External data illustratively includes regulatory notices regarding a particular vendor. In the event that significant deviations occur between waste management data 110 and a vendor's capability and performance, waste management data 110 is updated in accordance with step 940 by repeating steps 910-930 as described above. Alternatively, waste management data 110 associated with a particular vendor may be scheduled for periodic updates, e.g., quarterly, annually, etc.

Comparing waste component processing data 130 to the entity baseline data provides the waste producing entity the capability to assess metrics associated with waste component processing. Waste component processing data 130, when compared to the entity baseline data will reveal potential options for cost savings, reductions in waste component production, and reductions in costs associated with procuring raw materials. This comparison allows the waste producing entity to determine whether to continue to engage service provider 11 and use of waste management system 10.

Referring now to FIGS. 10A-42, an embodiment of the invention utilizing a web base application is now described. The embodiment described herein implements a hierarchy according to company, customer and service site, wherein service sites are subordinate to customers, and customers are subordinate to companies. Thus, a company may have several customers, and a customer may have several service sites. Billing by the service provider 11 is provided at the customer level.

Figure 10A:
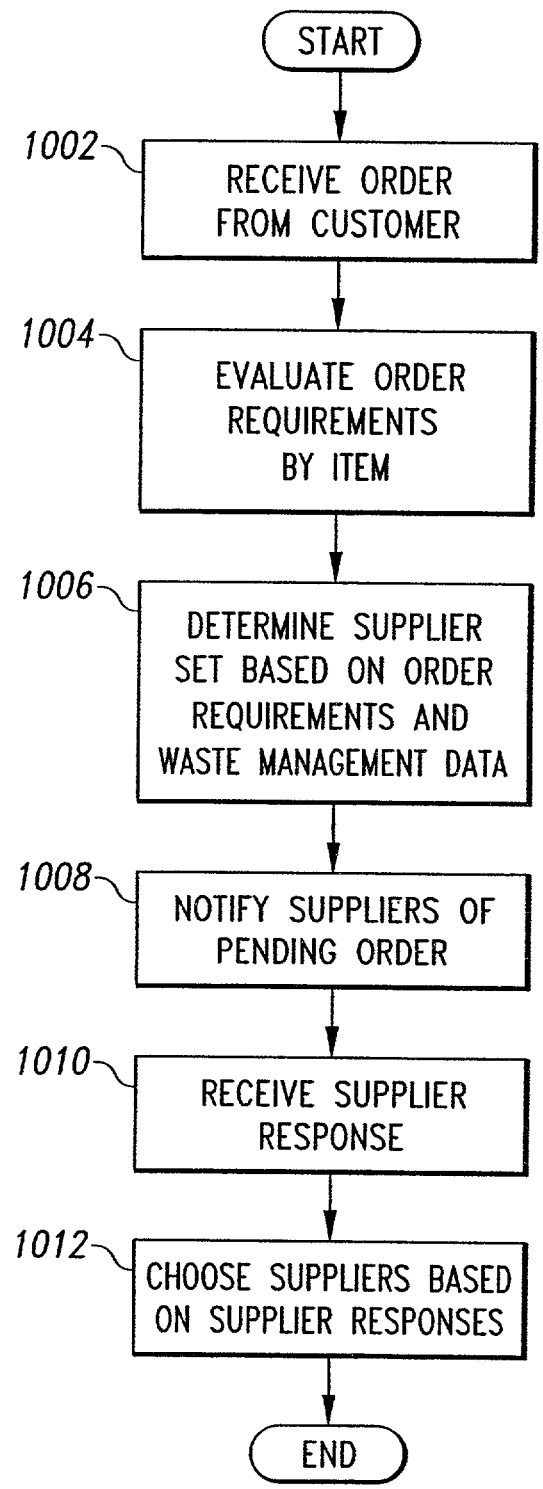
FIG. 10A is a flow diagram describes a process of receiving an entity order for waste management and the processing of that order.

FIG. 10A describes a process of receiving a customer order for waste management and the processing of that order in accordance with the present invention. In step 1002, the service provider 11 receives an order from the customer. Generally, an order comprises one or more items for that customer. In step 1004, the service provider 11 evaluates the order requirements for the customer by item. After the order items have been identified and necessary data obtained, in step 1006 the service provider 11 determines a supplier set based on order requirements and waste management data of the suppliers. The suppliers and the supplier set were determined in step 1006 are notified of the pending order in step 1008. Once the supplier responses are received in step 1010, the service provider 11 evaluates the supplier response and chooses which suppliers will respond to the customer order, as shown in step 1012.

Figure 10B:
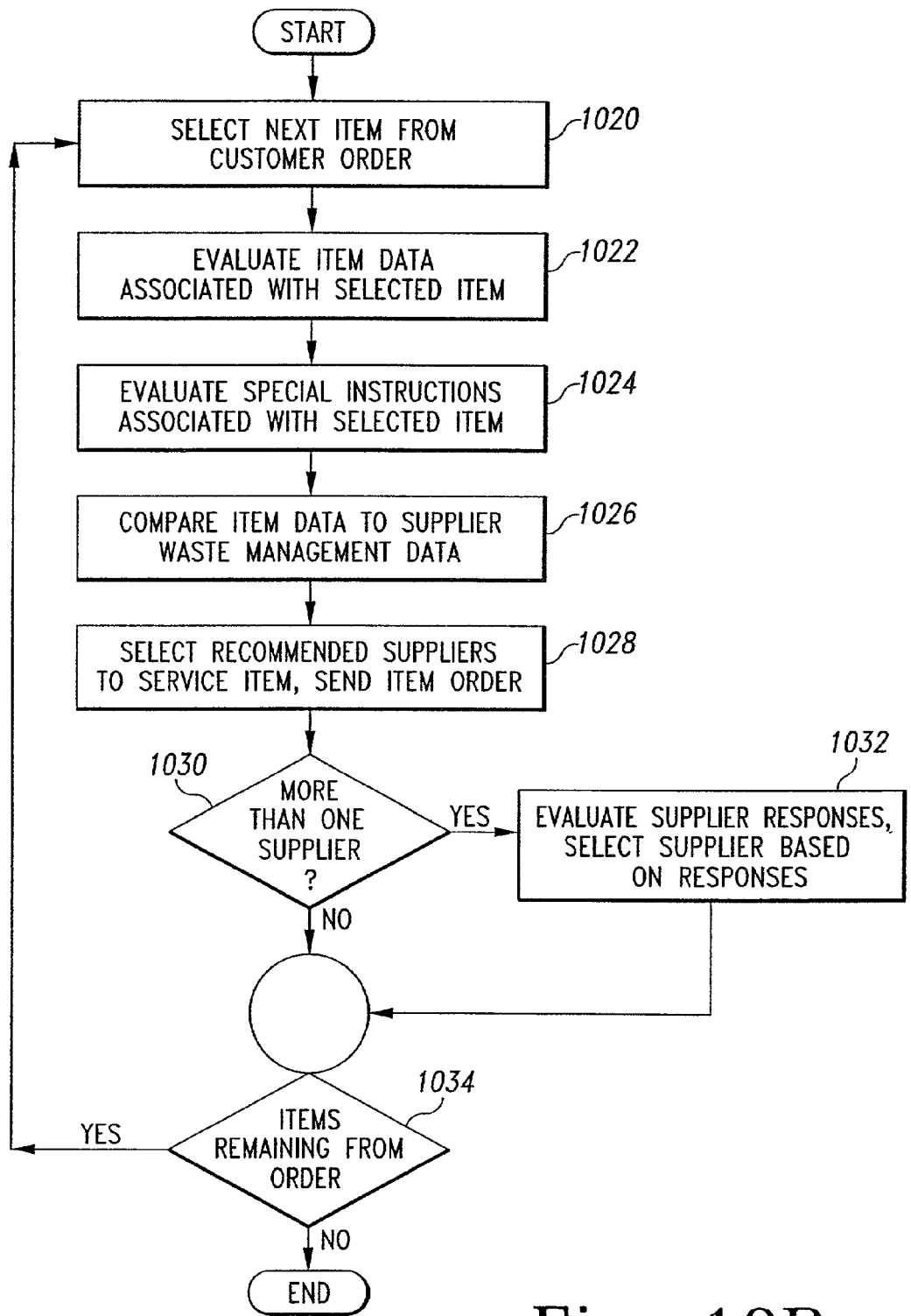
FIG. 10B is a flow diagram describing the process of choosing a vendor to respond to an entity order, wherein the entity order comprises a list of items.

Evaluation of a pending order by item is described in more detail with reference to FIG. 10B. FIG. 10B depicts the process of choosing a vendor to respond to a customer order, wherein the customer order comprises a list of items. In step 1020, beginning with the first item, the service provider 11 selects the next item from the customer order. In step 1022, the service provider 11 evaluates the item data associated with the selected item. Once the item data is evaluated, the service provider 11 determines whether there are any special instructions associated with the selected item, as shown in step 1024. A special instruction can be any instructions specifically provided by a customer, e.g. a customer could specify that the waste components with the associated item be picked up immediately, or request that a particular supplier provide service for the particular item, etc.

As there is often more than one supplier associated with a particular item for a particular customer, in step 1026 the service provider 11 compares the item data to the supplier waste management data. In step 1028, the service provider 11 selects the recommended suppliers to service the item and sends the item order to the suppliers. In step 1030, if there is more than one supplier response, the service provider 11 evaluates each suppler response and selects the best supplier based on the responses, as shown in step 1032. In step 1034, if there are any items remaining from the customer order, the process as described with respect to step 1020 through 1032 are repeated. If no other remains, then all items in the customer service order have been responded to.

Figure 11:
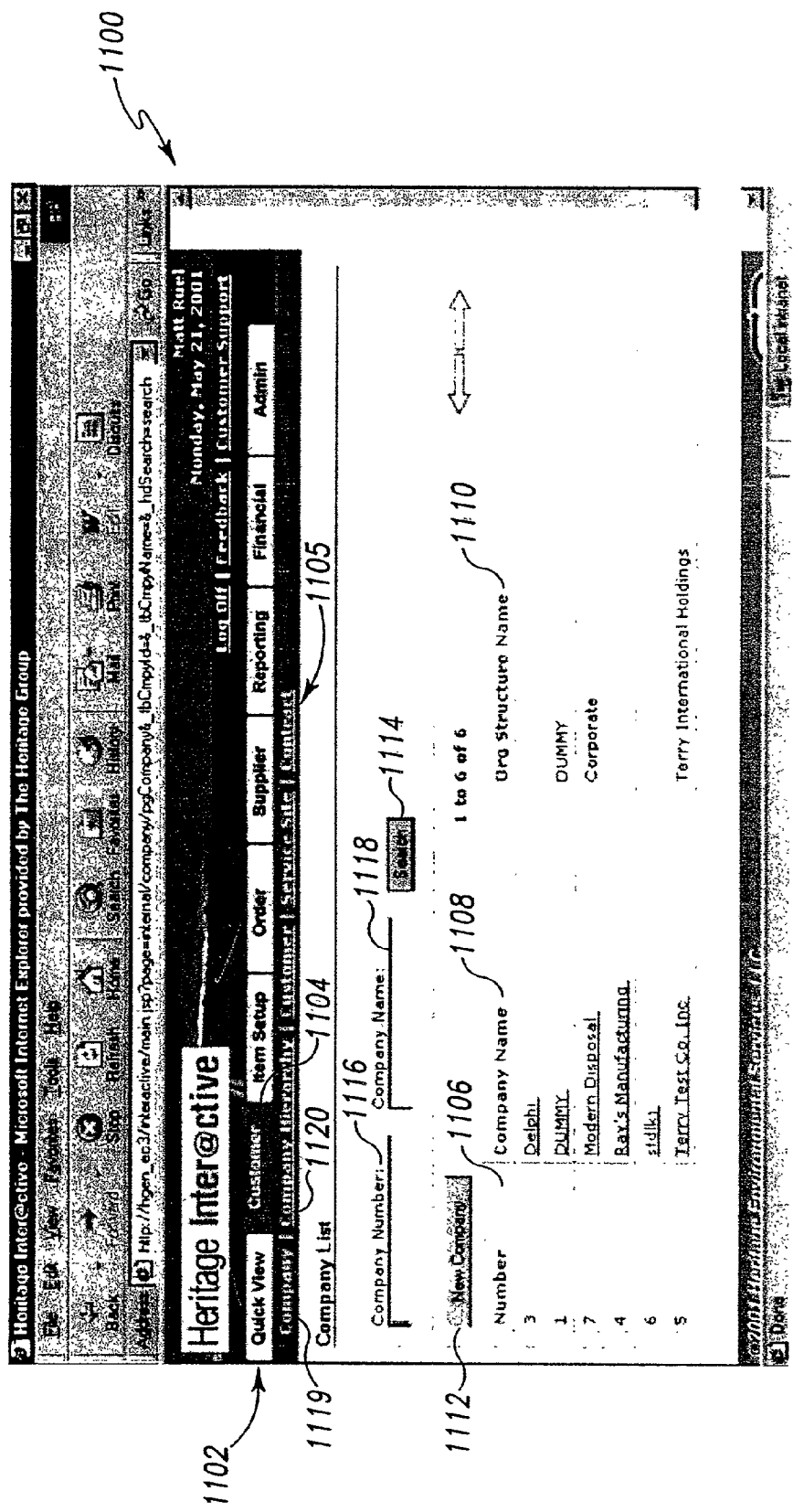
FIG. 11 is an application screen associated with the present invention, the application screen displaying a company list, wherein the listed companies are waste producing entities.

The system used in accordance with the process described with reference to FIGS. 10A and 10B is now described with reference to FIGS. 11-42. As shown in FIG. 11, a company list window 1100 includes a tabular list 1102 from which a service provider 11 may select a particular category. The customer category has been selected as customer tab 1104 is highlighted. Immediately below customer tab 1104 is a category list 1105. The currently selected category is in the category list 1105 is the category without an underline, i.e., company category 1119, which displays a company list in browser window 1100. The company list provides a list of all companies included in the company/customer/service site hierarchy. Company list includes a number field 1106, a company name field 1108, and an organizational structure name field 1110. The company list can be searched either by entering data into the customer number search field 1116 or the customer name search field 1118 and selecting search button 1114. Selecting the new company button 1112 activates a window (not shown) which allows a service provider 11 to enter a new company and corresponding data in the company list.

Figure 12:
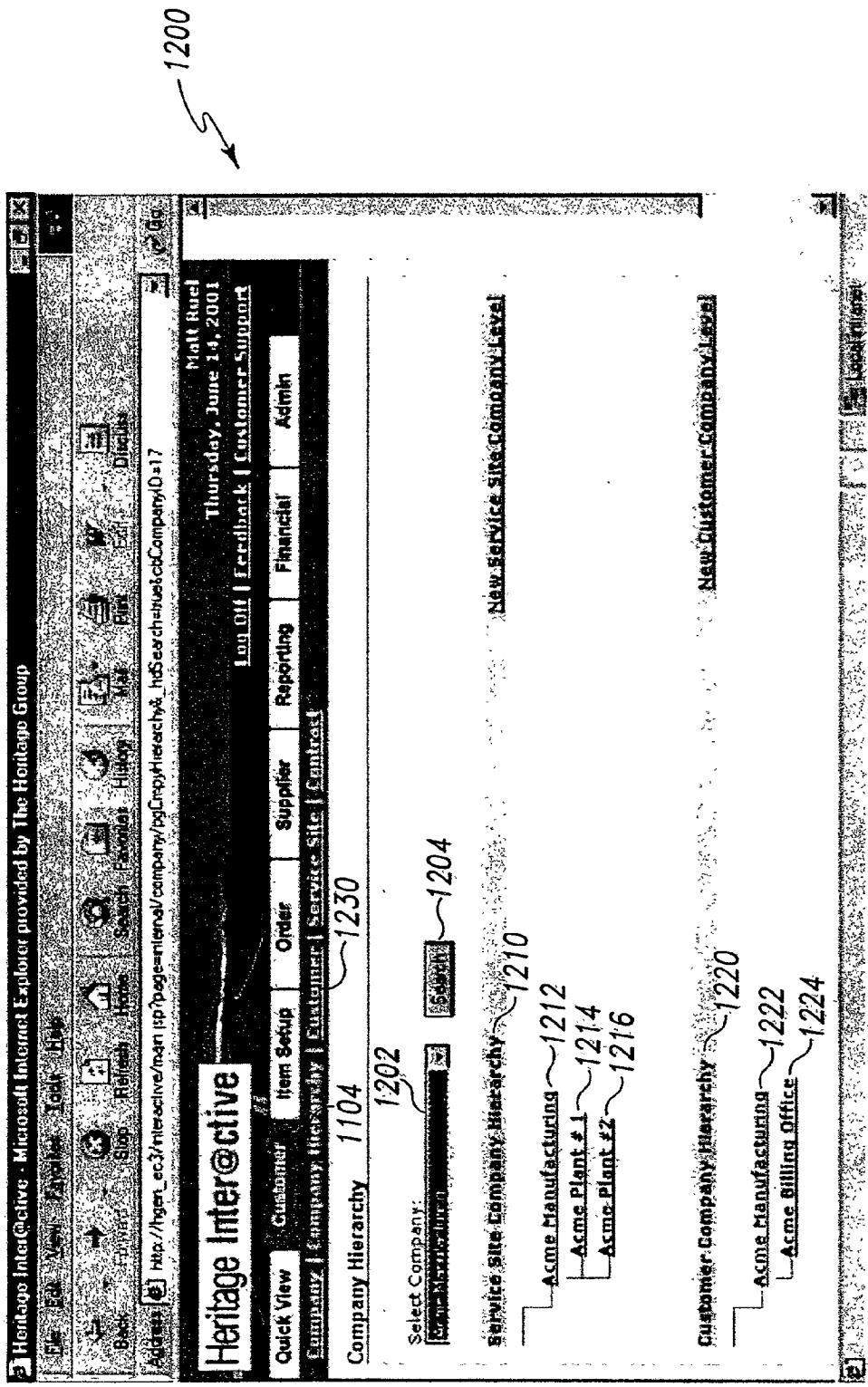
FIG. 12 is another application screen associated with the present invention, the application screen displaying a company hierarchy for a selected company.

Selecting the company hierarchy category 1120 displays hierarchy window 1200, as shown in FIG. 12. The company hierarchy category 1120 includes a company hierarchy list divided into a service site company hierarchy 1210, and a customer company hierarchy 1220. Service site company hierarchy list 1210 includes a list of all service sites for a particular company. A service site is a location at which a vendor provides waste management services to a customer. Thus, if a particular company has several manufacturing plants in different geographical locations, each would be a separate service site listed in the service site company hierarchy list 1210. Illustratively, the company "Acme Manufacturing" is listed as the parent company 1212, and corresponding plants Acme Plant #1 and Acme Plant #2 are listed as two separate service sites 1214 and 1216, respectively, and associated with parent company 1212.

The customer company hierarchy list 1220 lists the customers associated with a particular company. A customer is the entity responsible for billings related to one or more service sites. Illustratively, parent company 1222, Acme Manufacturing, includes Acme Billing Office as the sole customer company 1224. Thus, billings for all services at service sites 1214 and 1216 are consolidated and billed to customer 1224.

A particular company hierarchy is displayed pursuant to the selected company in the drop down selection window 1202. Selecting another company in the drop down selection window 1202 and selecting the search button 1204 will bring forth the company hierarchy of the newly selected company.

Figure 13A:
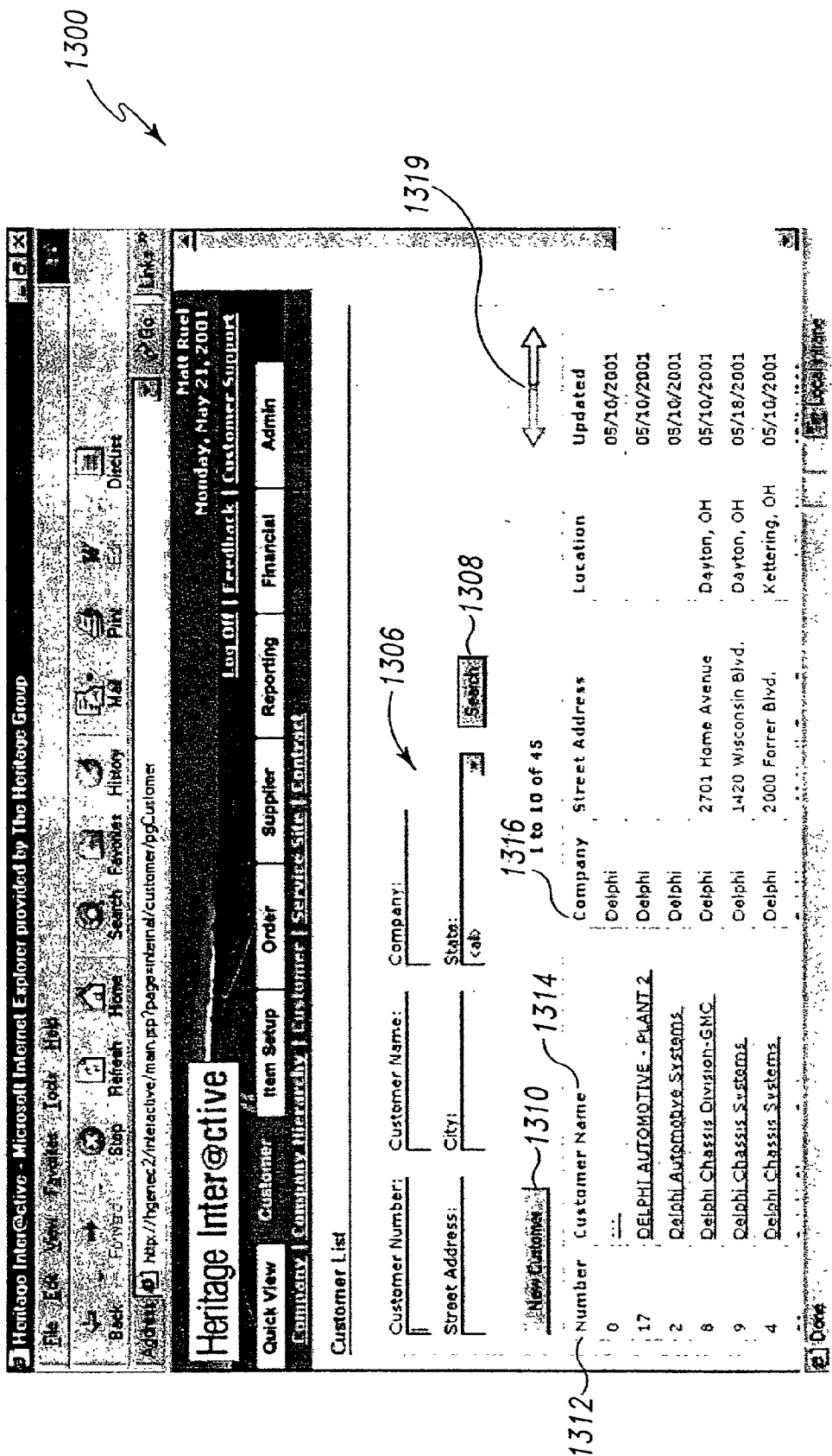
FIG. 13A is another application screen associated with the present invention, the application screen displaying a customer list, the customer list grouped according to a company hierarchy.

Reference to FIGS. 13A-13D describes in greater detail the association of service sites to customers. Selecting the customer category 1230 in FIG. 12 will bring up a customer list window 1300, as shown in FIG. 13A. A customer list window 1300 includes a list of each customer and associated data, such as customer number field 1312, customer name field 1314, and company name field 1316. Additional customer data can be viewed by selecting scroll arrows 1319. Each name in the customer name field 1314 represents a billing entity for one or more service sites. The customer list is searched by filling in one or more search fields 1306 and selecting search button 1308. Selecting the new customer button 1310 activates a window (not shown) which allows a service provider 11 to enter a new customer and corresponding data in the customer list.

Figure 13B:
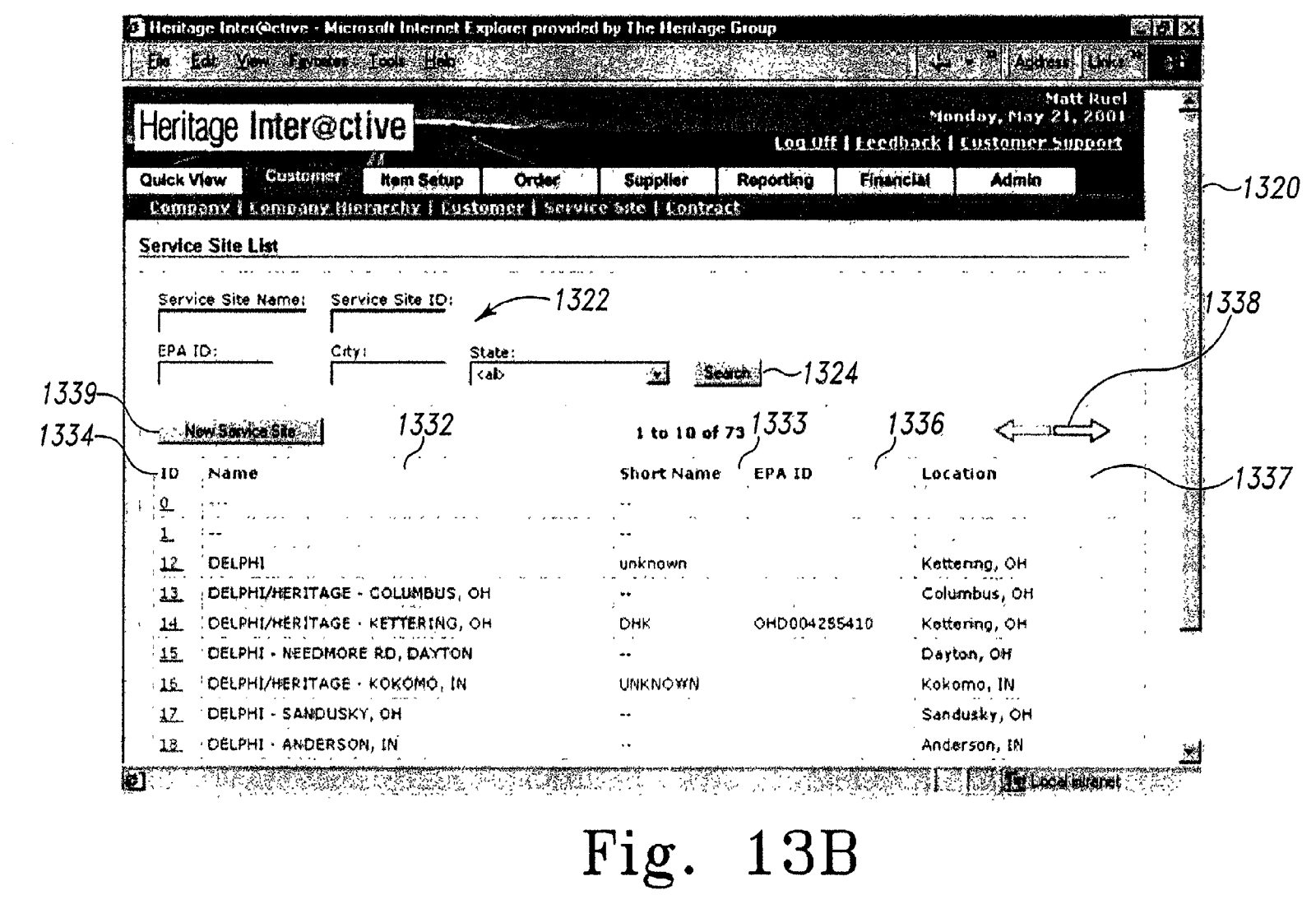

The service site window 1320 of FIG. 13B provides a list of all service sites and associated data. Data displayed in the service site window includes the service site ID 1334, service site name 1332, a short name 1333, the EPA ID 1336, and location 1337. Additional service site data can be viewed by selecting scroll arrows 1338. The service site list is searched by filling in one or more search fields 1322 and selecting search button 1324.

Figure 13C:
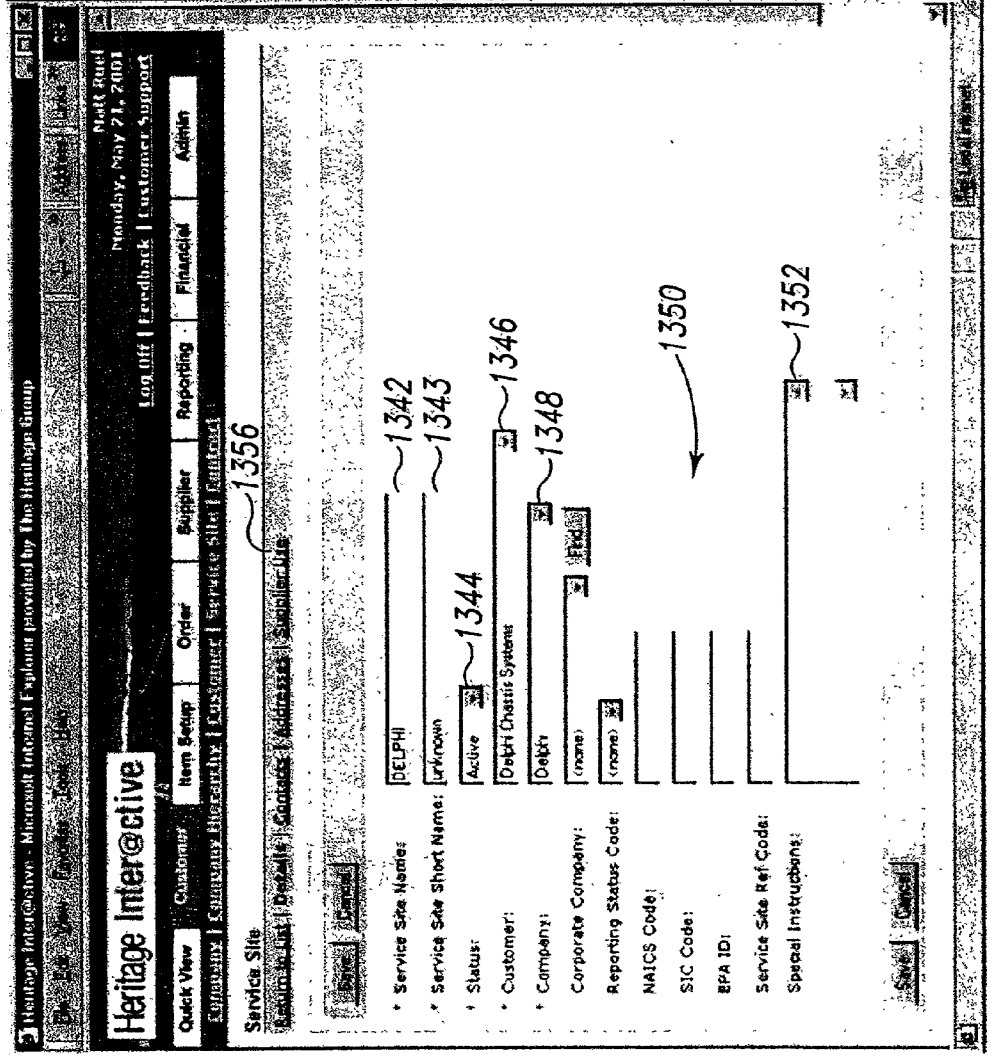
FIG. 13C is another application screen associated with the present invention, displaying a service site detail screen wherein a service provider associates a service site with a customer and company.

Selecting the new service site button 1339 activates a service site set up window 1340, as shown in FIG. 13C. Service site set up window 1340 allows the service provider 11 to create a new service site or update a service site's information. The service site name field 1342 and service site short name field 1343 are used to provide the name and short name of the service site. Status selection field 1344 sets the status of the service site as active or inactive. An active service site is a service site currently using the service associated with the invention described herein. The customer field 1346 associates the service site with a particular customer, and the company field 1348 associates the service site with a particular company. Additional data fields 1350 are used to provide additional information. Special instructions field 1352 is used to enter any special instructions pertaining to that particular site.

Figure 13D:
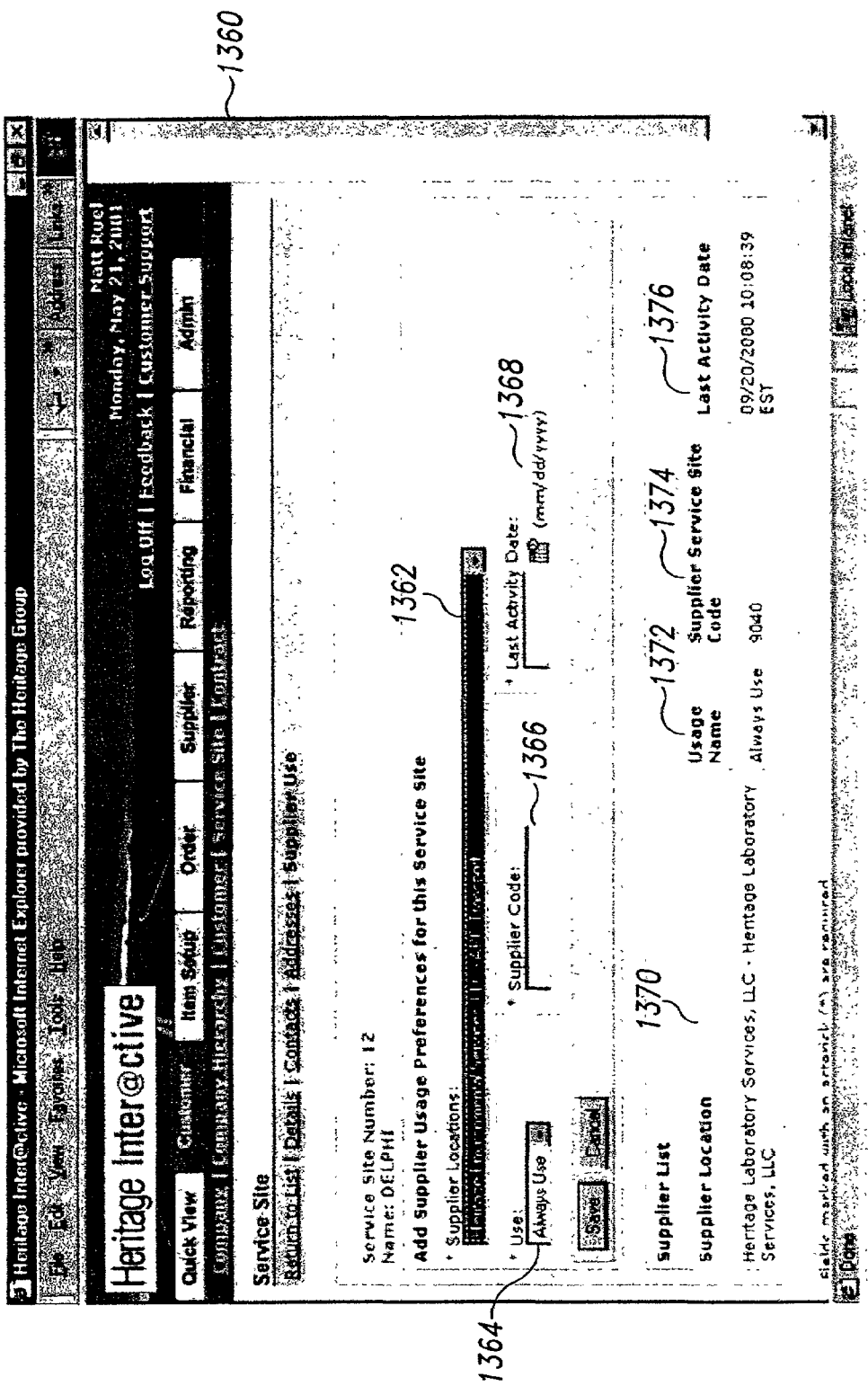
FIG. 13D is another application screen associated with the present invention, displaying a supplier usage screen wherein the service provider associates a supplier with a service site, wherein the supplier is a vendor.

FIG. 13D depicts the supplier usage screen 1360 for a particular service site. A supplier as used in the described embodiment is a vendor as described in FIGS. 1-9. A supplier is selected based on the waste management data 110 and the entity profile data 120 as previously described in detail above. Supplier location field 1362 provides data regarding the supplier's location. The use field 1364 provides a use variable to determine when to use the supplier. Use variables available in the use filed 1364 are "Always Use", "Never Use" and "Preferred." A "Preferred" supplier is used if the "Always Use" supplier is not available.

The last activity data 1368 is the last date on which the supplier rendered service for that service site. Of course, more than one supplier can be associated with a particular service site. The choice of suppliers depends on the suppliers' capabilities and the waste processing needs of the service site.

Figure 10C:
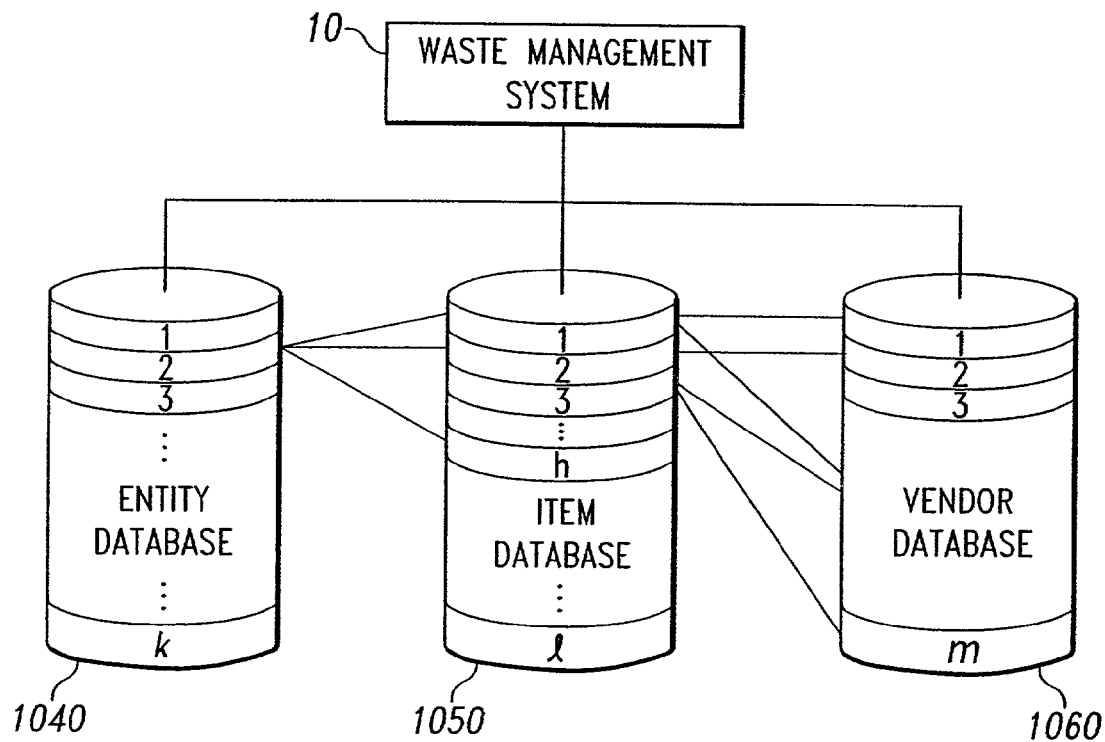
FIG. 10C depicts a database association of waste producing entities, items, and vendors.

In the application of the embodiment described herein, a service site has an associated list of items according to its respective entity profile as stored in entity profiles data 120. As shown in FIG. 10C, an entity database comprises a plurality of records 1 . . . k, with each record corresponding to a waste producing entity. Each record has associated therewith a number of items from item database 1050. Illustratively, record 2 from entity database 1040 has associated therewith records 1, 2, and h from item database 1050. Each item record has associated therewith one or more vendors that have been evaluated and approved to provide service in response to that particular item. Illustratively, record number 2 from item database 1050 has associated therewith record number 2 from vendor database 1060. Accordingly, this indicates that the vendor reference by record number 2 in vendor database is approved to provide service corresponding to item number 2 in item database 1050 for the entity reference by record number 2 in entity database 1040.

Figure 10D:
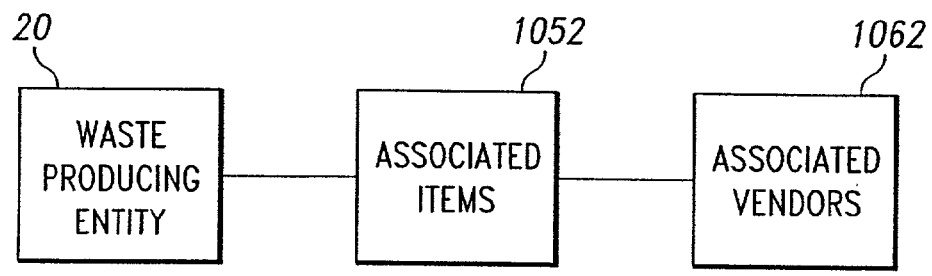
FIG. 10D is a block diagram illustrating the association of items and vendors to a particular waste producing entity.

This relationship is better illustrated with reference to FIG. 10D, which illustrates the association of items and vendors to a waste producing entity. Illustratively, waste producing entity 20 has associated therewith a plurality of associated items 1052. Each of the plurality of associated items 1052 has associated therewith one or more associated vendors 1062. Thus, when waste producing entity 20 requires service for a particular item from associated items 1052, one or more associated vendors from vendor list 1062 will be contacted to provide service with respect to that particular item.

Figure 14:
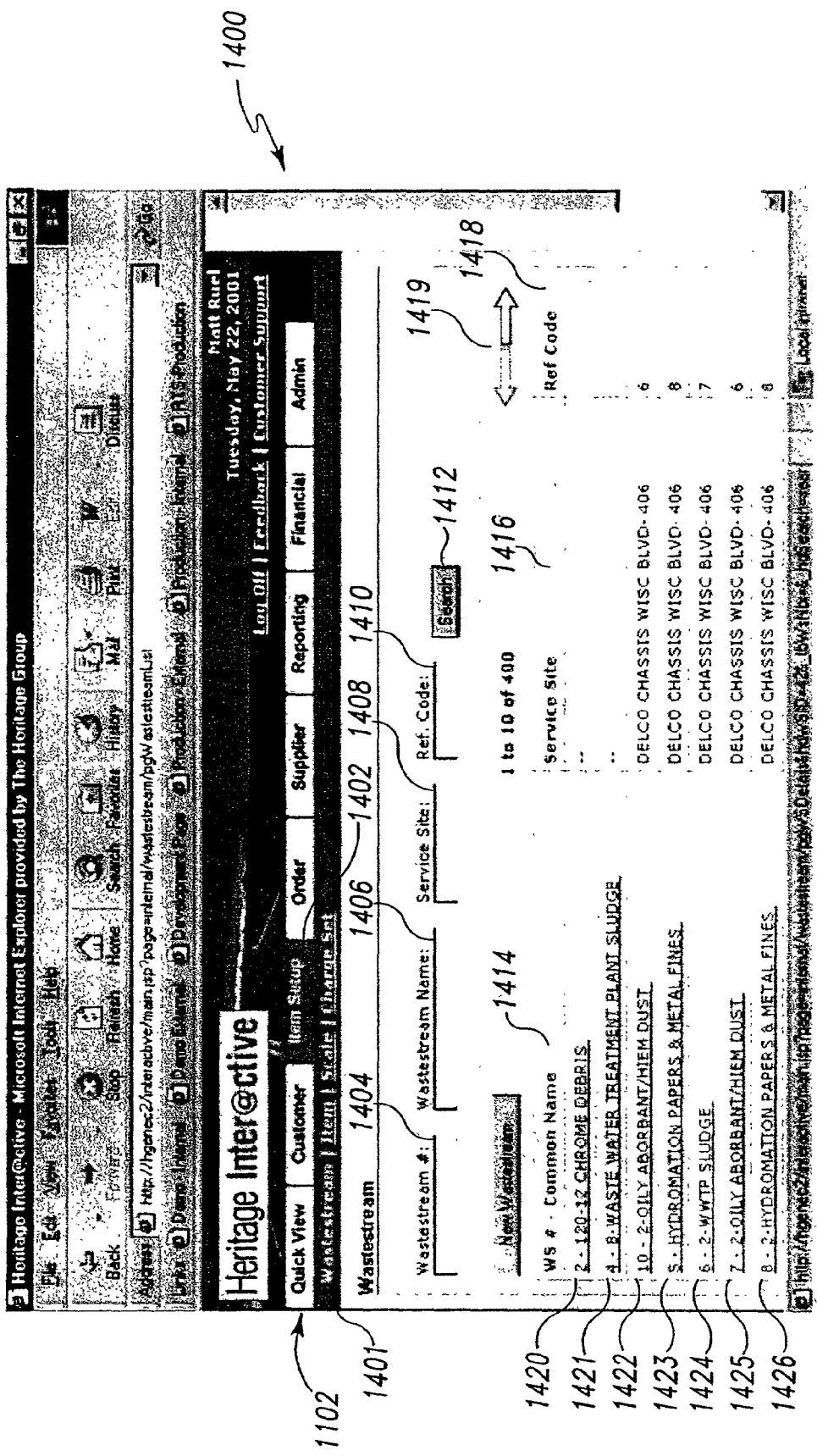
FIG. 14 is another application screen associated with the present invention, the application screen displaying a list of wastestreams associated with a customer.

An item is created and maintained by selecting the item set-up tab 1402, which displays the item window 1400 as shown in FIG. 14. A item commonly occurring among many service sites is a wastestream, and thus selecting item set-up tab 1402 displays the default wastestream category 1401. As shown in FIG. 14, the wastestream data display includes the wastestream name 1414, the service site 1416, and a reference code 1418. Additional data fields associated with a particular wastestream can be displayed by selecting scroll arrows 1419. The wastestream data can be searched by entering data into the wastestream number search field 1404, the wastestream name search field 1406, the service site search field 1408, and the reference code search field 1410, and then selecting search button 1412.

Each wastestream is associated with a service site. The service provider 11 evaluates the service site wastestream to acquire the requisite wastestream data. As shown in FIG. 14, wastestreams 1422 through 1426 are associated with a particular service site; wastestreams 1420 and 1421 have yet to be associated with a particular service site. Selecting a particular wastestream and wastestream name field 1414 will bring up the wastestream details window 1500 of FIG. 15. Illustratively, the wastestream details window 1500 in FIG. 15 relates to wastestream 1420 listed in FIG. 14.

Data for a particular wastestream is input and maintained through wastestream details window 1500. Wastestream details window 1500 includes the wastestream number 1502, the wastestream common name 1504, and the associated service site 1506. Text edit boxes 1510, 1512 and 1514 are used to input and maintain the wastestream number, wastestream reference code, and common name fields respectively. Service site field 1516 is used to associate a particular wastestream with a particular service site. DOT shipping name field 1518 and DOT packing group name field 1520 are used to input regulatory data related to the wastestream. The LDR required check box 1522 is used to indicate whether a Land Disposal Restriction form is require. The reportable quantity check box 1524 is used to indicate whether a reportable quantity of a waste component is being handled. If the reportable quantity check box 1524 is checked, the quantity will always be reported. Regulatory body code is used to indicate which regulatory body or regulatory laws apply to the selected wastestream (e.g. RCRA, TSCA, etc.). EPA form field 1528 selects a required EPA form corresponding to the particular wastestream. Additional data relating to the wastestream is input into data fields 1530. The reevaluation date 1532 is the date upon which service provider 11 will reevaluate the wastestream data associated with the selected wastestream. The last evaluation date 1534 is the date which reflects the last time the wastestream was evaluated.

Figure 16:
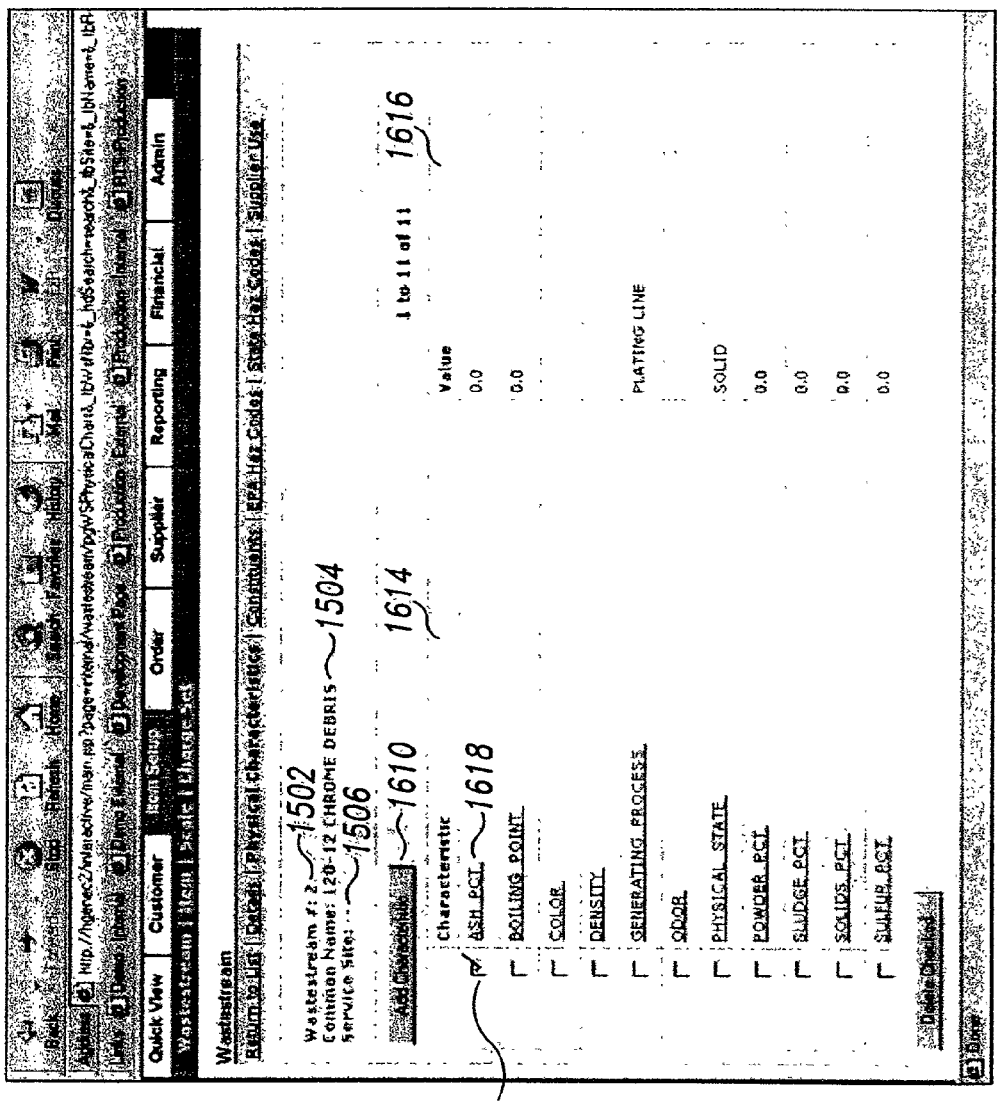
FIG. 16 is another application screen associated with the present invention, the application screen providing an interface to define particular characteristics of a particular wastestream.

Selecting the physical characteristics category 1535 and wastestream details window 1500 displays the wastestream characteristics window 1600, as shown in FIG. 16. Wastestream characteristic window 1600 is used to input and maintain data associated with a physical characteristic of a wastestream. Each characteristic has a name 1614 and associated value 1616. A characteristic is selected by selecting check box 1612. Once a characteristic is selected, pressing the add characteristic button 1610 will add that characteristic to the selected wastestream.

Figure 17:
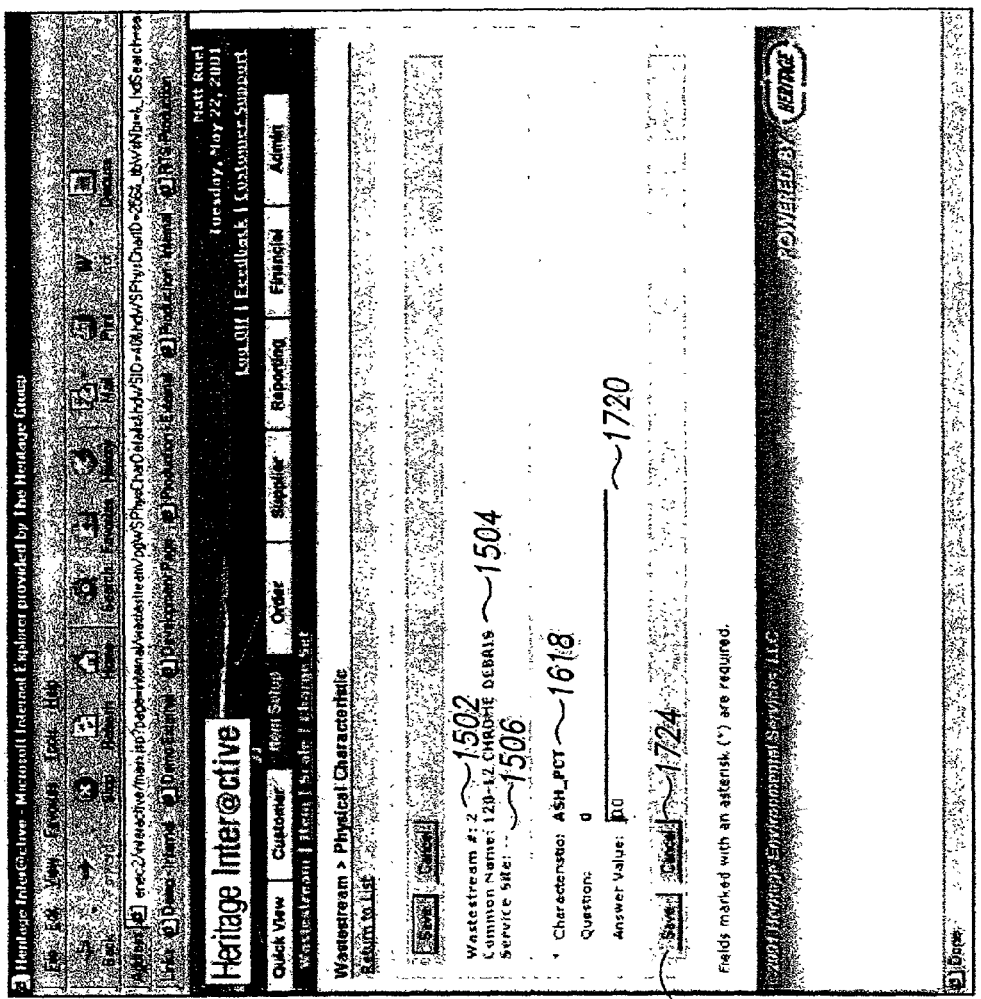
FIG. 17 is another application screen associated with the present invention, the application screen providing an input field for a particular characteristic selected from the list of particular characteristics listed in FIG. 16.
Figure 18:
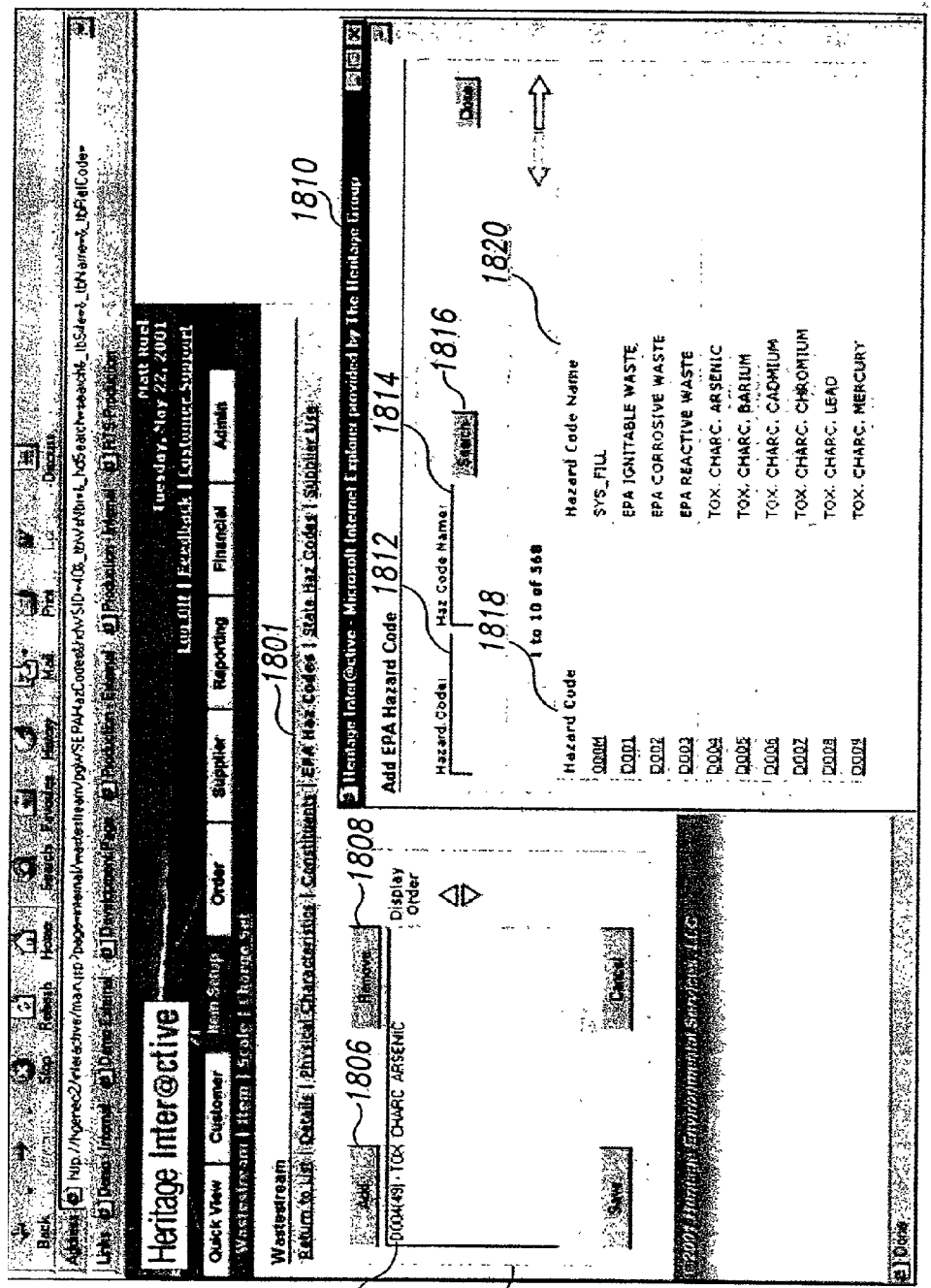
FIG. 18 is another application screen associated with the present invention, the application screen providing an interface to associate a particular wastestream with federal regulatory hazard codes.
Figure 19:
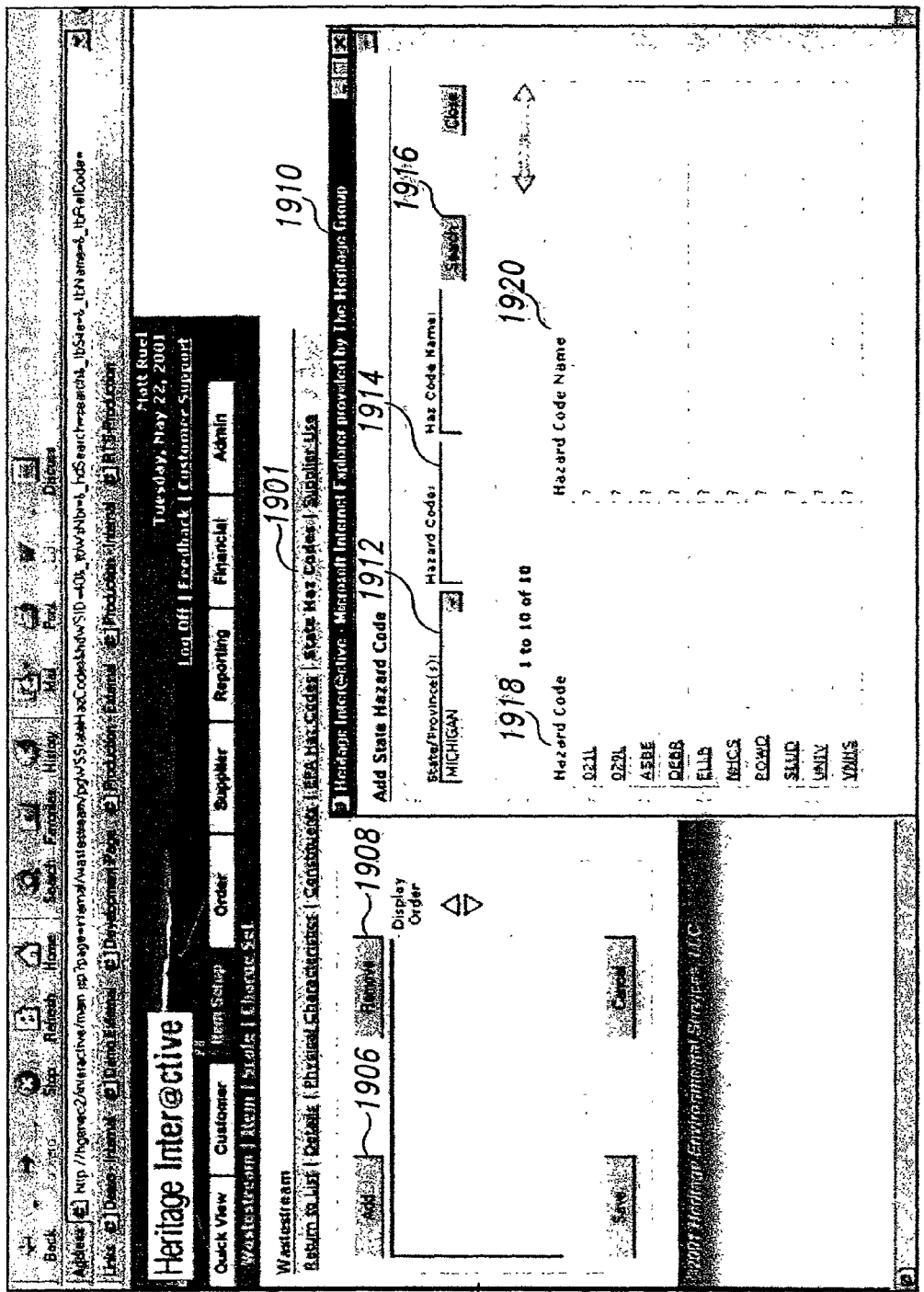
FIG. 19 is another application screen associated with the present invention, the application screen providing an interface to associate a particular wastestream with state regulatory hazard codes

Selecting a particular wastestream characteristic name will bring up a physical characteristic data entry window 1700 as shown in FIG. 17. Illustratively, the characteristic "ASH PCT" 1618 (i.e., "ash percentage") has been selected. The corresponding data value is input into edit box 1720, and the data is either saved by selecting save button 1722 or cancel button 1724.

Wastestream EPA hazard code window 1800 is displayed after selecting EPA hazardous code category 1801. EPA hazard window 1802 lists all EPA hazard codes associated with the selected wastestream. Illustratively, the selective wastestream has one associated EPA hazard code 1804. Selecting add button 1806 displays EPA hazard code window 1810. EPA hazard selection window 1810 lists all EPA hazard codes 1818 and the corresponding hazardous code names 1820. The list is searched either by hazard code search field 1812 or hazard code name 1814, and selecting search button 1816. Once a desired hazard code is found and selected, closing the window will add the hazard code to the hazard codes listed in window 1802. Selecting a particular hazard code 1804 and window 1802, and then selecting the remove button 1808 will remove the hazard code and disassociate that hazard code with the selected wastestream.

Wastestream state hazard code window 1900 is displayed after selecting State hazardous code category 1901. State hazard window 1902 lists all state hazard codes associated with the selected wastestream. Selecting add button 1906 displays State hazard code window 1910. State hazard selection window 1910 lists all state hazard codes 1918 and the corresponding hazardous code names 1920. The list is searched either by hazard code search field 1912 or hazard code name 1914, and selecting search button 1916. Once a desired hazard code is found and selected, closing the window will add the hazard code to the hazard codes listed in window 1902. Selecting a particular hazard code in window 1902, and then selecting the remove button 1908 will remove the hazard code and disassociate that hazard code with the selected wastestream.

Figure 20:
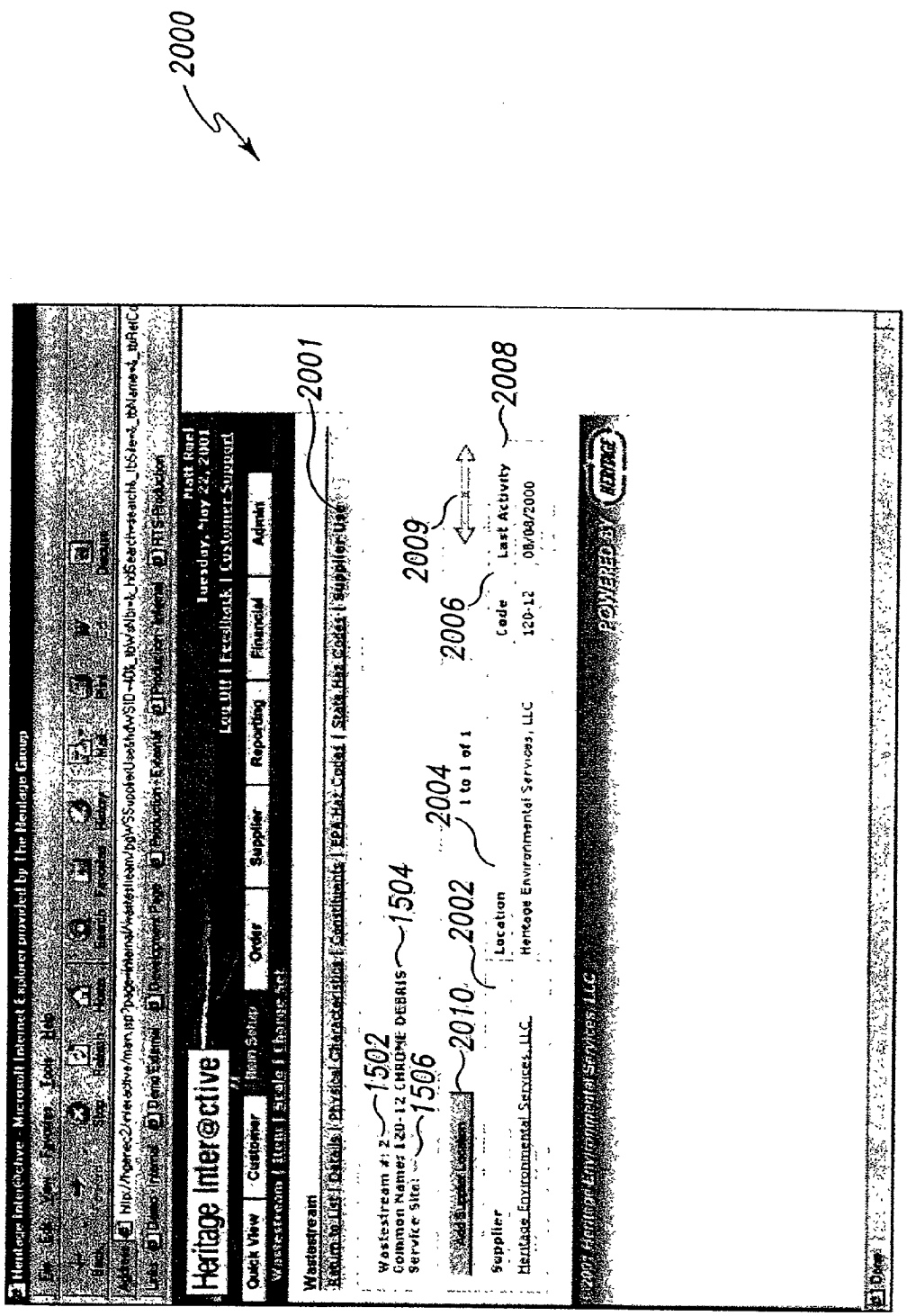
FIG. 20 is another application screen associated with the present invention, the application screen associating a supplier with a wastestream.

Selecting the supplier use category 2001 displays the supplier usage window 2000, as shown in FIG. 20. If the supplier has the capability to handle and process a particular wastestream, the supplier will be associated with that wastestream. Supplier usage window 2000 displays the supplier location 2004, supplier code 2006, and the last activity date 2008. Additional fields associated with the supplier use can be examined by using scroll arrows 2009.

Figure 21:
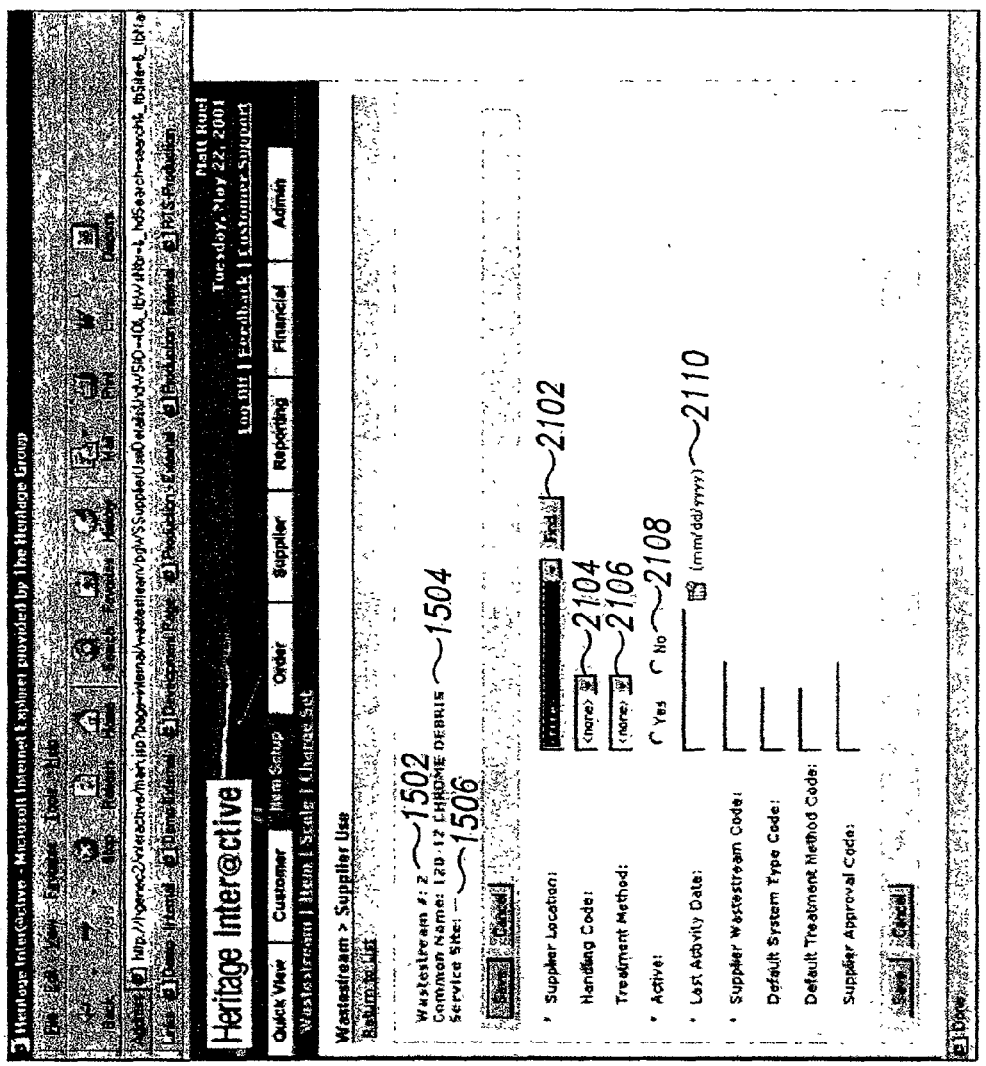
FIG. 21 is another application screen associated with the present invention, the application screen providing an interface to associate supplier data with a wastestream.

Selecting the add supplier location button 2010 displays the supplier detail window 2100 of FIG. 21. Supplier location field 2102 selects the location of the supplier associated with that particular wastestream. Handling code field 2104 treatment method field 2106 are specific regulatory codes for a particular waste component. The active field 2108 indicates whether the supplier is currently contracting what the service provider 11 to supply waste management processing in accordance with the invention described herein. Last activity date 2110 is the date the supplier last serviced this particular wastestream.

Figure 22:
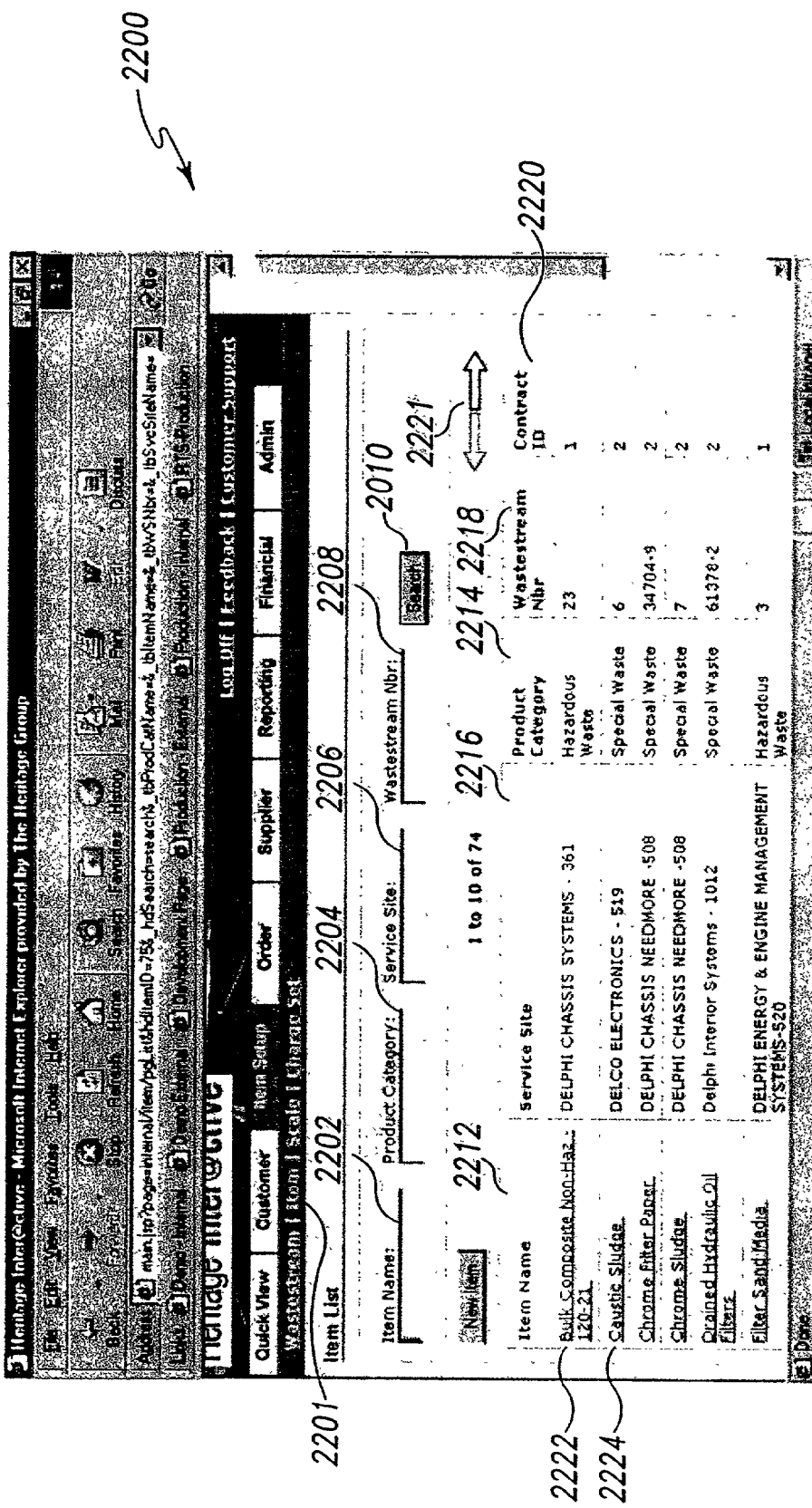
FIG. 22 is another application screen associated with the present invention, the application screen displaying an item list associated with a customer, and providing an interface to create new items, and wherein the customer is a waste producing entity.

Selecting item category 2201 displays the item list window 2200 of FIG. 22. Item list window includes item name 2212, service site 2216, product category 2214, wastestream number 2218, and contract ID 2220. Further data fields associated with a particular item can be examined by using scroll arrows 2221. Each record in the item list contains data for a particular wastestream and a particular service site. Illustratively, record 2222 shows that the service site "Delphi Chasse System-361" has an associated wastestream "Bulk composite non-haz 120-21" which has been given wastestream number 23 and categorized as hazardous waste. Similarly, record 2224 indicates that service site "Delco Electronics-519" has an associated wastestream entitled "caustic sludge", given a wastestream number 6 and categorized as special waste.

Figure 23:
FIG. 23 is another application screen associated with the present invention, the application screen providing an interface through which the service provider inputs item details for an item in an item list.
Figure 27:
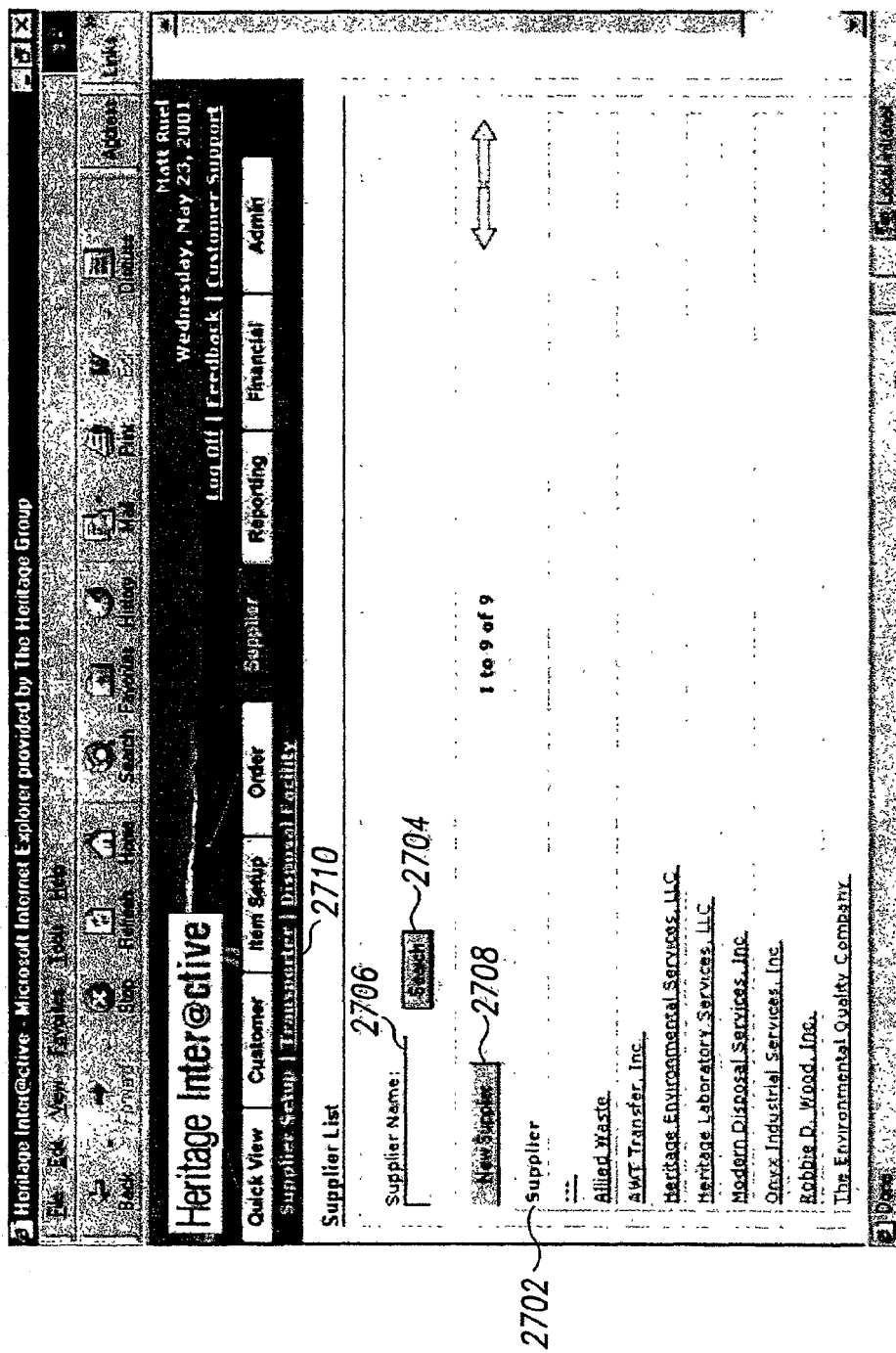
FIG. 27 is another application screen associated with the present invention, the application screen providing a list of suppliers.

Selecting a particular item name will bring up the item details window 2300, as shown in FIG. 23. Item detail window 2300 is used to create and maintain items in the item list. Each item includes a name field 2302, and an item description field 2304. Product category 2306 is used to indicate whether the item is hazardous waste, non-hazardous waste, or a special waste. Charged type category 2308 indicates the charge type of a particular wastestream for billing purposes, e.g. a disposal charge, and incineration charge, etc. The active field 2310 details whether the particular item is active for that service site. An item may become inactive if the service site no longer produces that particular wastestream. The display on catalog field 2314 determines whether an item is displayed on a service site catalog or customer catalog window.

Service site field 2316 associates a particular item with a service site. Wastestream field 2318 identifies which wastestream type is associated with the selected item. Contract field 2320 is used to reference a contract between the supplier and the service provider 11 for the supplier's provision of waste management services. Dependent items 2324 relate to additional charges associated with the waste management of the particular item. Dependent items may include transportation cost, fuel costs, etc. Item ID 2326 is an item identifier for a dependent item. The item name 2328 is the name of the dependent item. The item description 2330 is the description of the dependent item.

Selecting the item price category 2401 displays the item price window 2400. The item price window 2400 associates the price the service provider 11 charges for a service with respect to a particular item. The price for an item is set by selecting a price 2406 per unit of measure 2404. Illustratively, the price may be dollars per ton, or dollars per cubic meter, dollars per 55 gallon drum, etc. Unit of measure scale 2402 is used to scale the unit of measure in the event a partial unit of measure of waste component is processed. For example, a customer may provide a 55 gallon drum with only 40 gallons of a waste component contained therein; accordingly, the unit of measure scale is 40/55 of a 55 gallon drum unit of measure. The effective start date 2408 is the date upon which the price 2406 takes effect. The percent parent field 2410 relates to surcharges based on a percentage of the item price.

Price history data 2422 includes a list of records of price history for the particular item. Price history data includes price field 2422, percent of parent field 2420, unit of measure scale field 2415, start date field 2418, and unit of measure field 2414. Checking a particular record by selecting box 2426 and activating delete button 2428 will delete the selected record from the price history data 2422.

Selecting the supplier category 2501 displays the supplier price window 2500. The price data and the supplier price window 2500 corresponds to the price the supplier charges for providing a particular service in accordance with the present invention. Supplier price information includes supplier name 2520, fulfillment type 2522, the cost 2528, effective start date 2530, unit of measure 2524, the primary field 2532, and an active field 2534. The fulfillment type 2522 corresponds to a supplier service for a particular item. Illustratively, the suppliers in record 2540 and 2543 are disposal facilities, and the suppliers in records 2541 and 2542 are transporters. Thus, service for this particular item will require service by one of the transporter suppliers to transport the particular waste component from the waste producing entity to the disposal facility. Primary fields determine whether the supplier is a primary supplier or a secondary supplier. Illustratively, the suppliers listed in records 2540 and 2541 are indicated as primary suppliers. Thus, service for this particular item will primarily be provided by suppliers 2540 and 2541. A supplier is accorded primary status previously described above. Active field 2534 indicates whether the supplier is currently available or partaking in the service provided by the service provider 11.

Supplier data is entered through fulfillment type input field 2502, unit of measure field 2504, supplier location field 2506, cost field 2508, active field 2510, and primary choice field 2512. Bill customer when complement field 2514 indicates whether the customer is billed when the service is completed, or whether billing is deferred for review or cancellation.

Item cost window 2600 displays the item cost a supplier charges for providing a particular service in accordance with the present invention. Item cost information includes a supplier name 2602, fulfillment type 2604, status field 2606, primary choice field 2608, unit of measurement field 2610, cost field 2612, and effective start date 2614. The cost of a particular item by unit of measurement, and the effective start date of that cost are shown by cost field 2622, effective start date field 2624, and unit of measurement field 2220.

Supplier list window 2700 lists all suppliers providing service through service provider 11. Supplier list 2702 can be searched by entering a name in supplier name field 2706 and selecting search button 2704. Selecting new supplier button 2708 displays a data entry window (not shown) for entering a new supplier.

Figure 28:
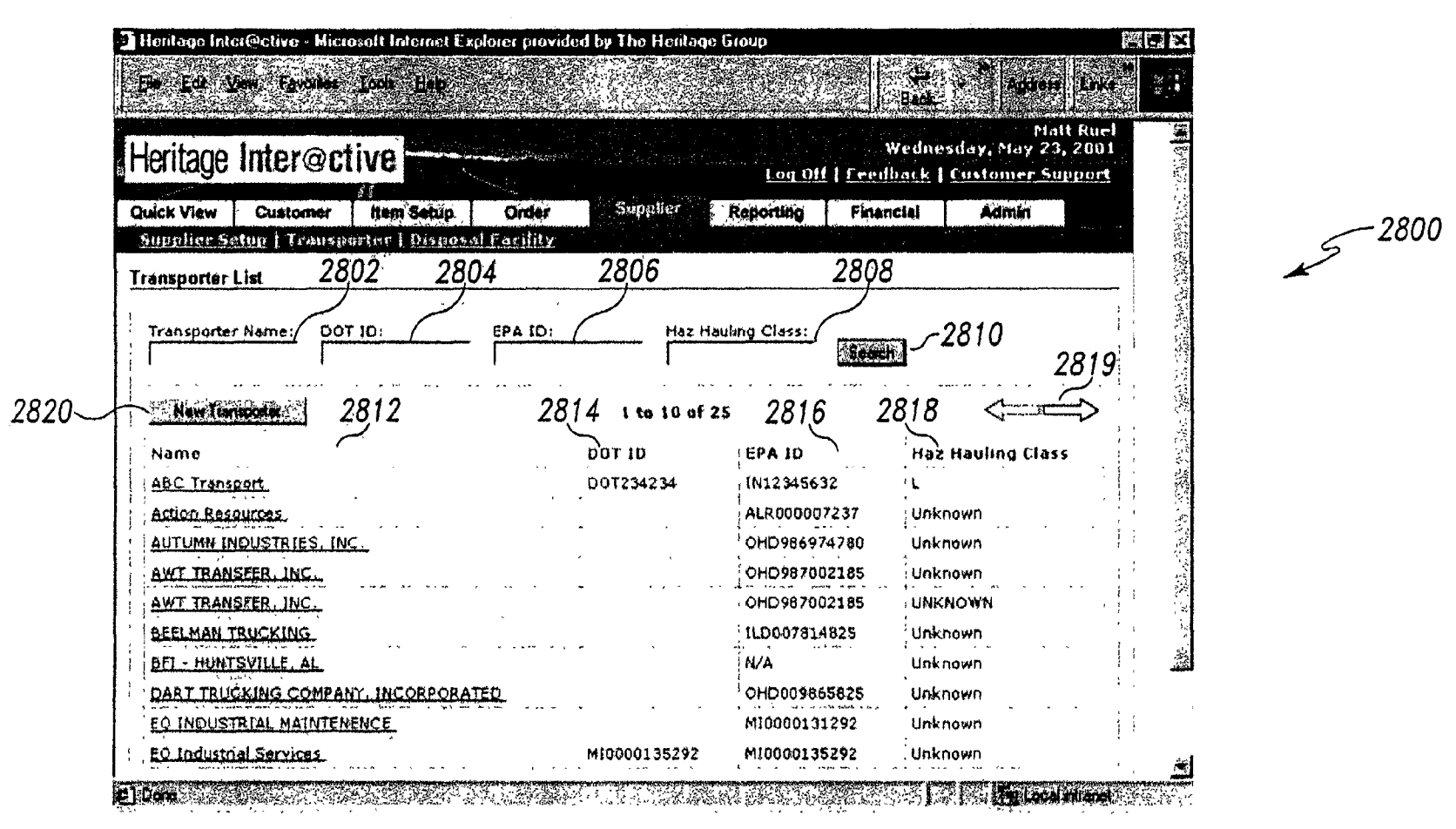

Selecting the transporter category 2710 opens supplier transporter window 2800, as shown in FIG. 28. A transporter list is a list of suppliers that provide transportation service from the waste producing entity to a waste processing facility. Transporter data includes name 2812, Department of Transportation ID 2814, EPA ID 2816, and hazardous hauling class 2818. Additional information can be viewed through use of scroll arrows 2819. The transporter list can be searched by entering data into the transporter name search field 2802, DOT ID search field 2804, EPA ID search field 2806, and hazardous hauling class search field 2808, and selecting search button 2810.

Figure 29:
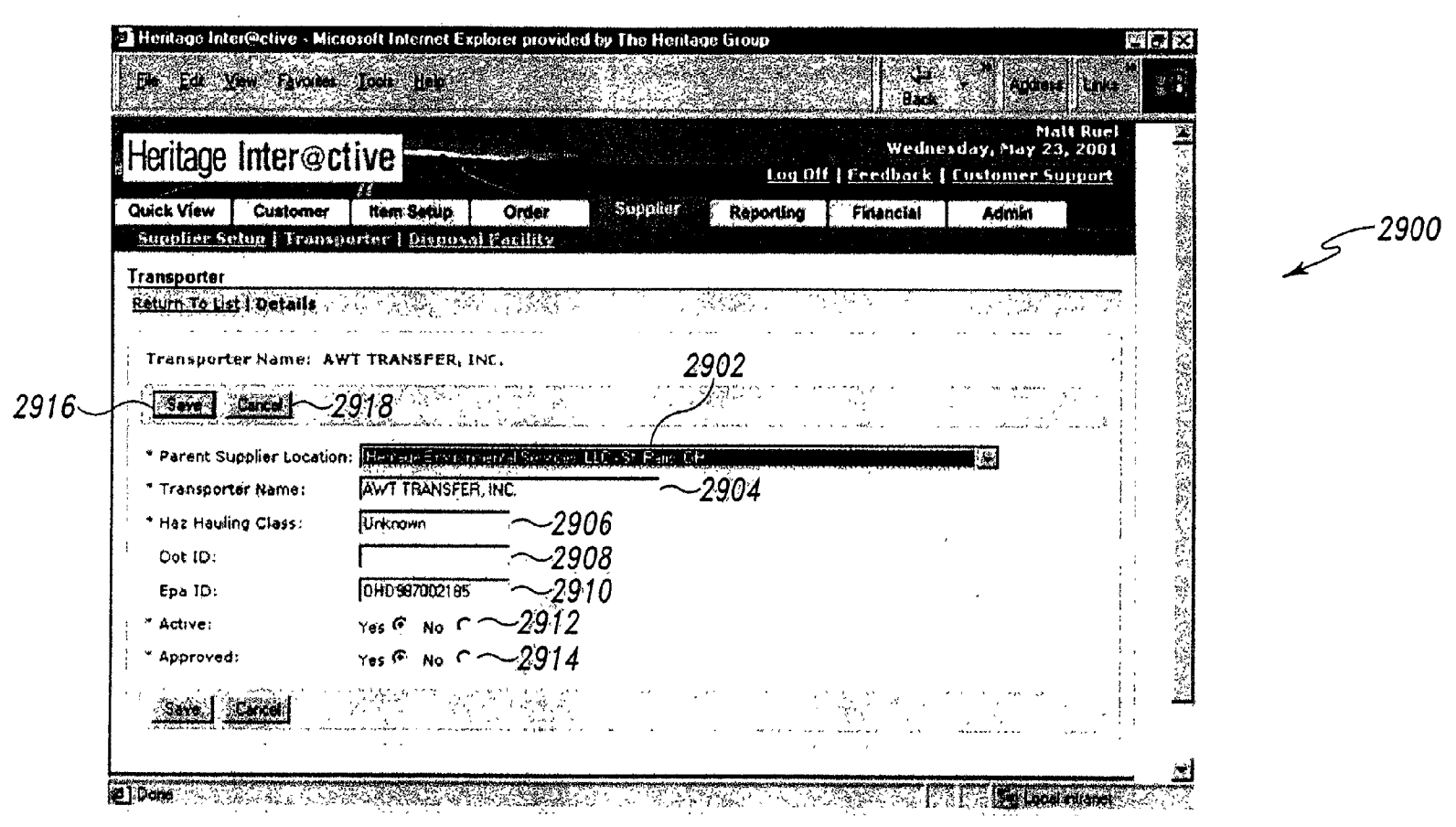

Selecting the new transporter button 2820 displays the new transporter detail window 2900 as shown in FIG. 29. Transporter data includes parent supplier location 2902, transporter name field 2904, hazardous hauling class field 2906, DOT ID 2908, and EPA ID 2910. The active status of the transporter is reflected by selecting yes no buttons 2912. Approved field 2914 indicates whether the service provider 11 has approved the supplier to provide service in accordance with the present invention. Usually, a service provider 11 will not approve a supplier until the service provider has audited the supplier and rendered approval.

Figure 30:
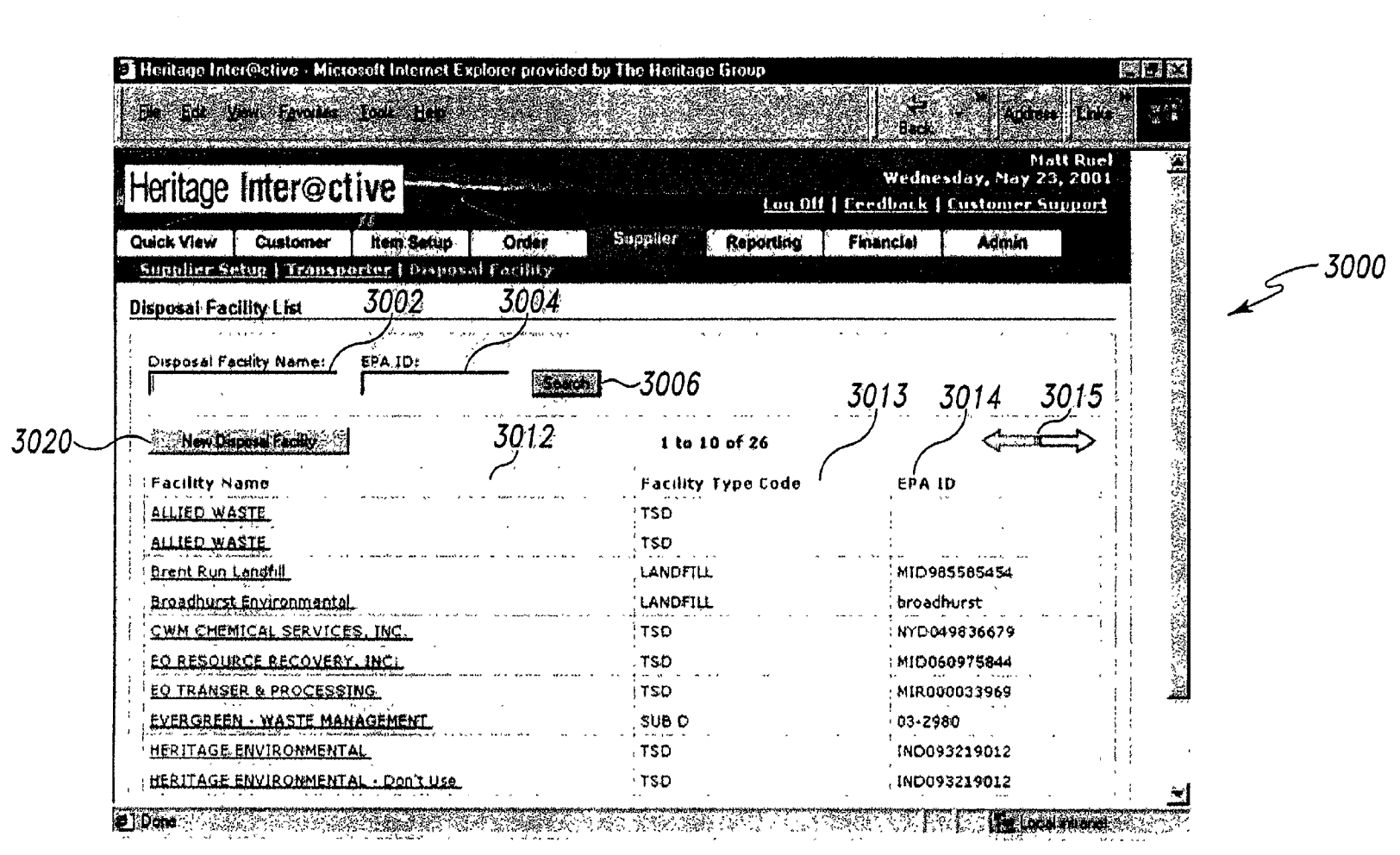

Disposal facility list window 3000, as shown in FIG. 30, is a list of all disposal facilities providing service through the service provider 11. Disposal facility data includes facility name 3012, facility type code 3013, and EPA ID 3014. Additional disposal facility data can be viewed through use of scroll arrows 3015. Disposal facilities can be searched by entering data into the disposal facility name search field 3002, and the EPA search field 3004, and then selecting the search button 3006.

Figure 31:
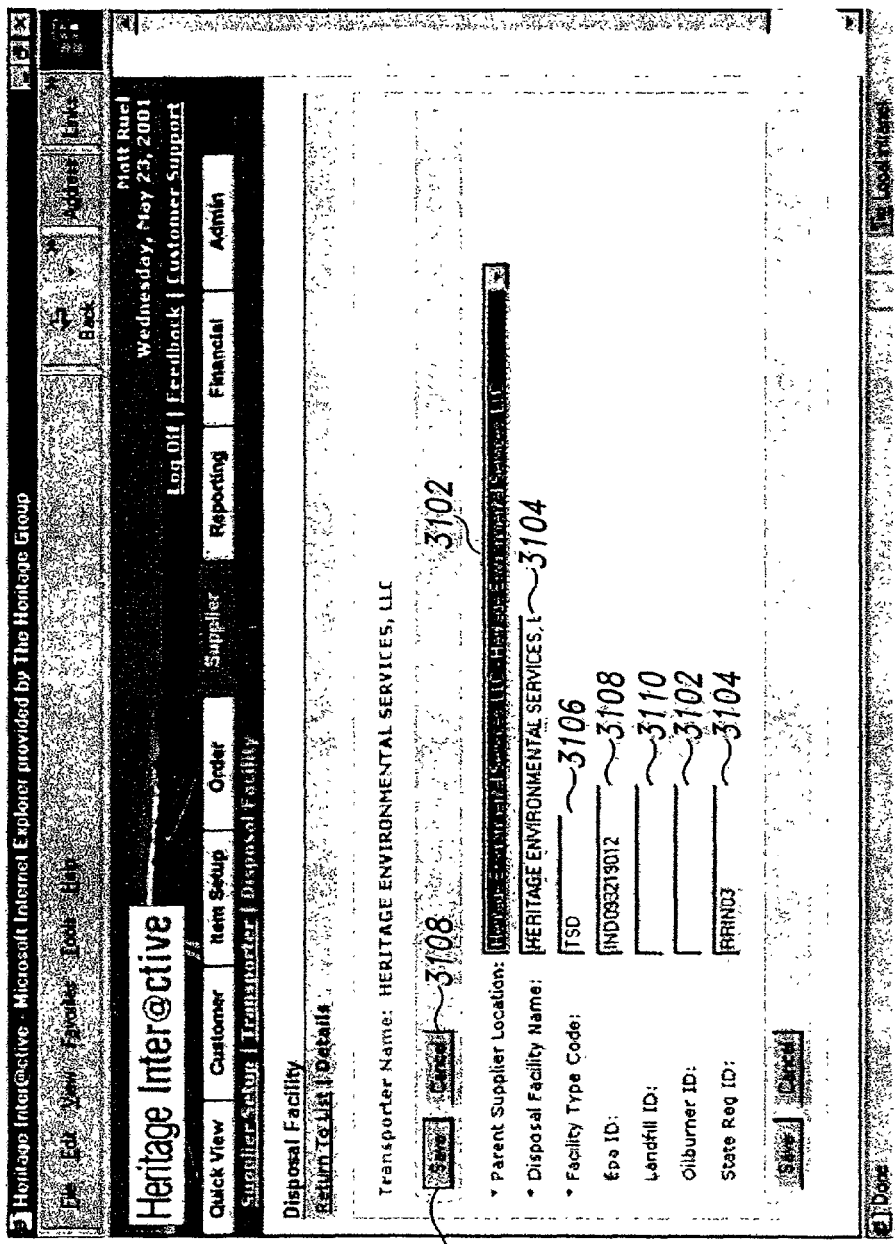
FIG. 31 is another application screen associated with the present invention, the application screen providing an interface through which the service provide adds or updates supplier disposal facility data.

Selecting the new disposal facility button 3020 displays the disposal facility details window 3100 as shown in FIG. 31. Disposal facility data includes the parent supplier location 3102, disposal facility name 3104, facility type code 3106, EPA ID 3108, a land fill ID 3110, and oil burner ID 3102, and a state regulatory ID 3104. Data for that disposal facility is saved by pressing save button 3106, and not saved by pressing cancel button 3108.

Figure 32:
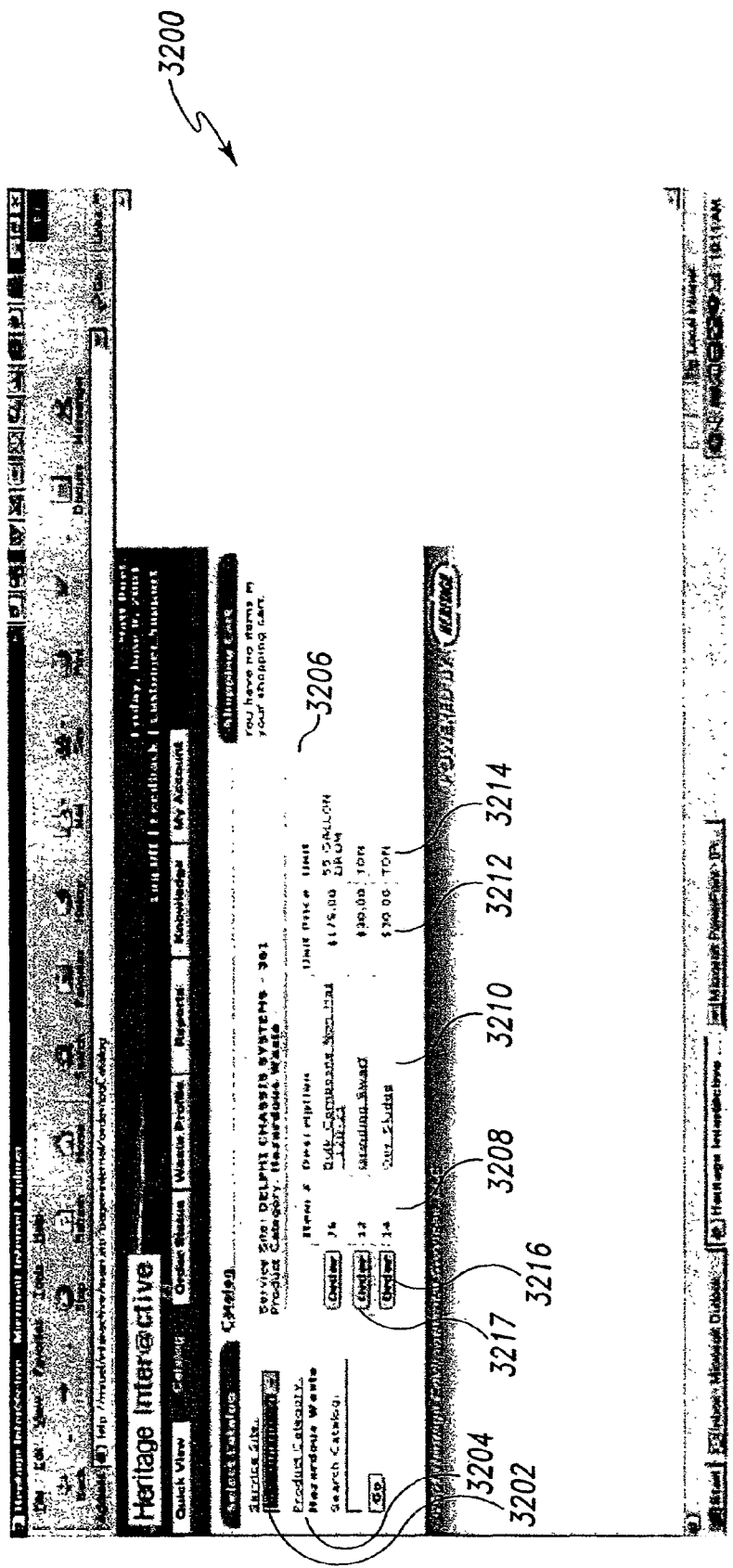
FIG. 32 is another application screen associated with the present invention, the application screen displaying a list of items available to the customer.

Processing a customer service request in accordance with the invention, and as illustrated and previously described with reference to FIGS. 10A and 10B, is now described with reference to the screenshots of FIGS. 32-40. FIG. 32 depicts a customer catalog window 3200, which a customer views when placing a service order. A customer catalog window 3200 includes a list of associated items 3206 associated with a customer's service site. As each customer may have several associated service sites, the customer will select the service site requiring service through service site selection menu 3202. The customer then selects the product category for the service request from product category menu 3204. Catalog window 3206 indicates that service site 361 and product category "hazardous waste" have been selected. There are three items associated with the selected service site as listed in item number field 3208. Description field 3210 provides a description of each item number listed in item field 3208. Unit price field 3212 provides a unit price for a service related to each item. Unit field 3214 provides the unit upon which the unit price is based in unit price field 3212. Order buttons 3216 are selected when a customer desires to order a particular service item for the selected site. Illustratively, if the customer requires service to remove waste components associated with item #12 ("Grinding Swarf") from service site 361, the customer selects the corresponding order button 3217.

Figure 33:
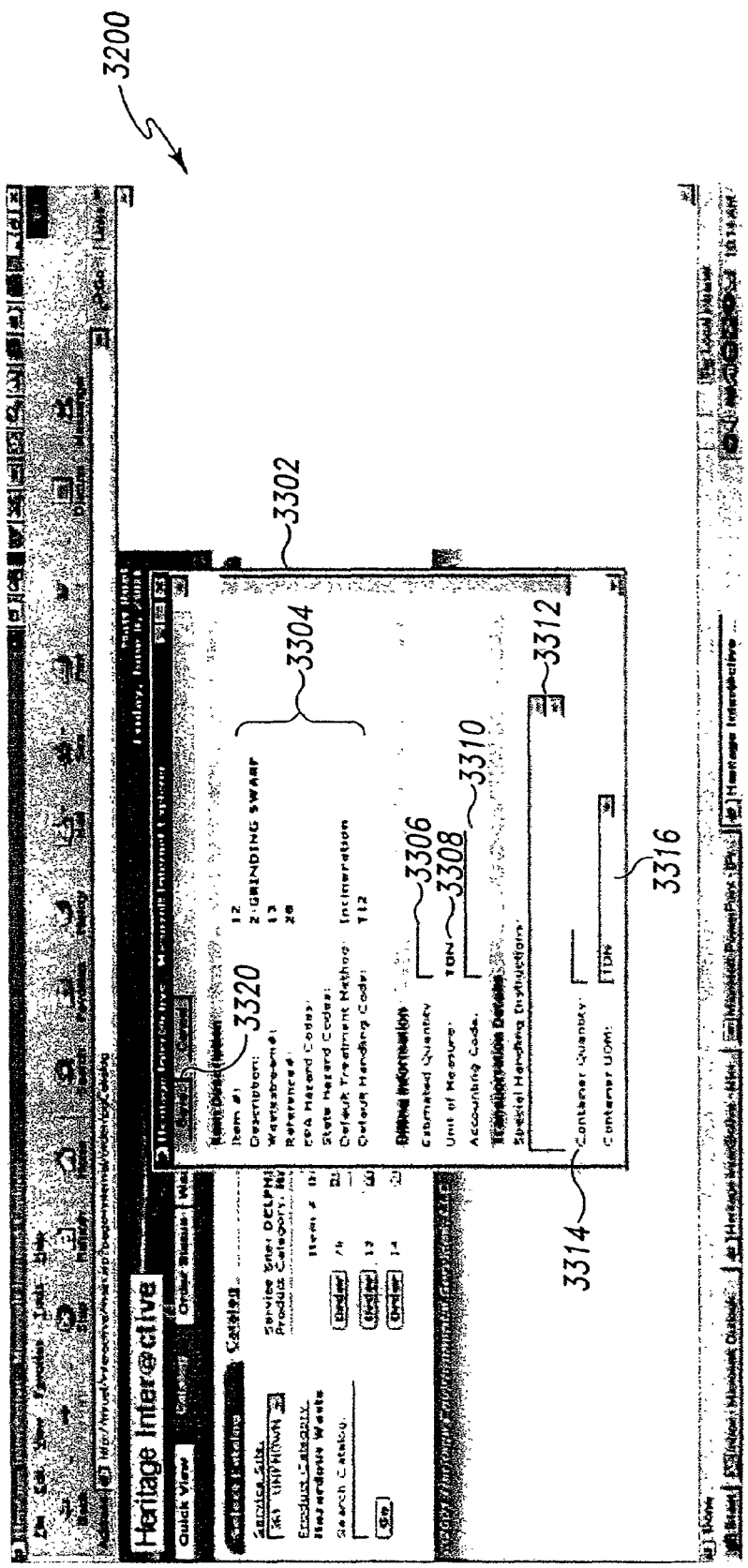
FIG. 33 is another application screen associated with the present invention, the application screen providing an interface through which the customer inputs quantity and transportation data associated with a particular service order.

As shown in FIG. 33, the customer has ordered item number 12 and an item menu order 3302 has appeared in catalog window 3200. Item description data 3304 is displayed, and the customer enters the estimated quantity of the particular waste component associated with the item in quantity field 3306. The estimated quantity is entered in a per unit measurement, as indicated in per unit of measure field 3308. Accounting code field 3310 is used for customer accounting information. Special handling instructions are input into the special handling field 3312. Container quantity field 3314 is used to input the number of containers requiring service. The container unit of measurement field 3316 is selected to provide a unit of measurement for the selected container.

Figure 34:
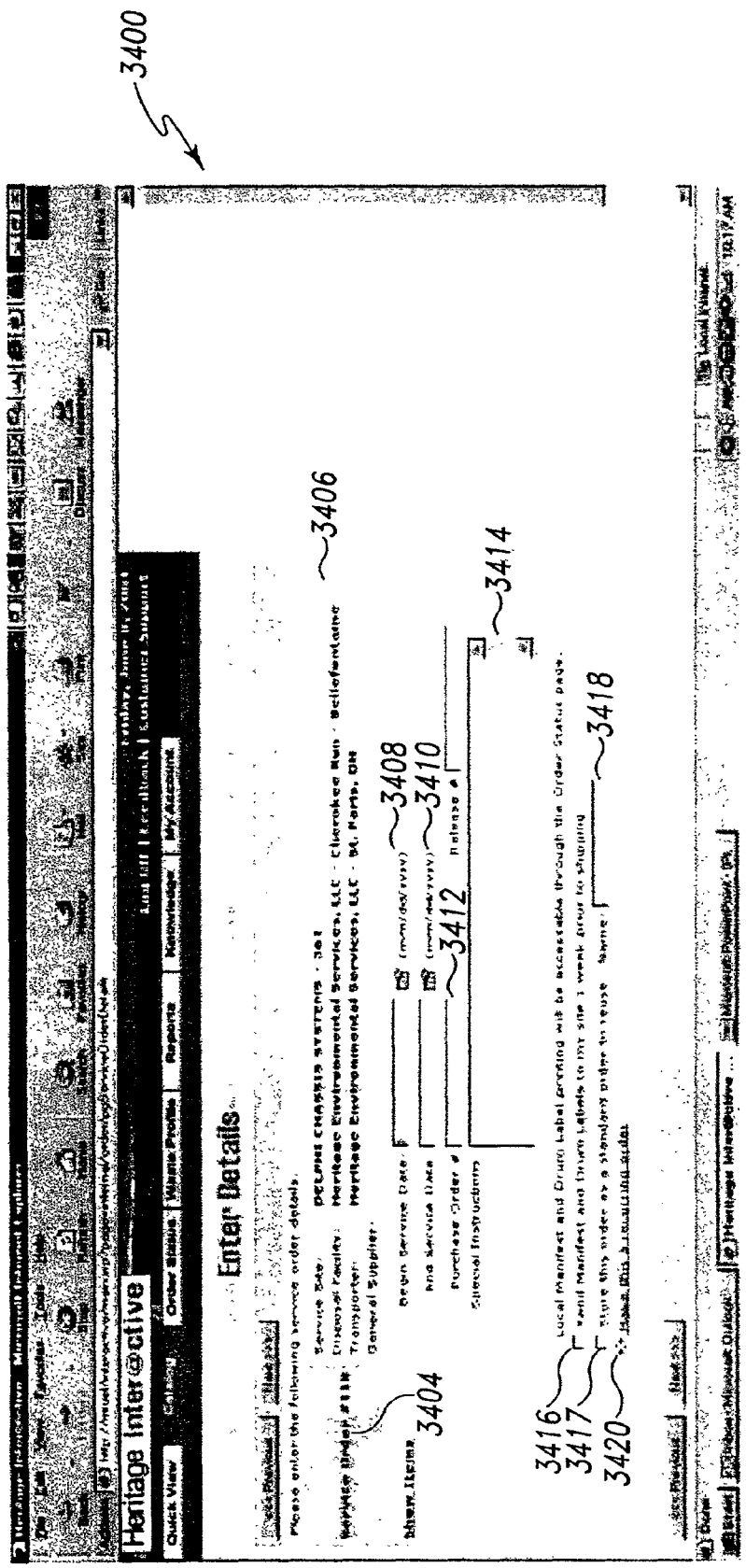
FIG. 34 is another application screen associated with the present invention, the application screen providing an interface through which the customer provides the required service date, accounting data, and special instructions regarding the service order.

Pressing the save button 3320 brings the customer to the enter detail screen 3400, as shown in FIG. 34. The pending order is assigned a service order number 3404 and service site, disposal facility, and transporter details 3406 are displayed. The customer enters the date upon which the customer desires the service to begin in the begin service date window 3408, and specifies when the service should finish in end service date 3410. The customer also enters the purchase order number in purchase order window 3412. Any special instructions required by the customer are entered in special instructions text box 3414. Common particulars and administrative requirements for a given order are displayed and can be optionally facilitated by the customer by selecting check box 3416.

As a customer may frequently request the same service order for a particular item, the order can be stored as a standard order for reuse by selecting check box 3417. In text box 3418 the customer can input a name for the standard order to reuse. Recurring option 3420 can be selected to make the order recurring. Upon selection, the customer will specify the frequency of reoccurrence.

Figure 35:
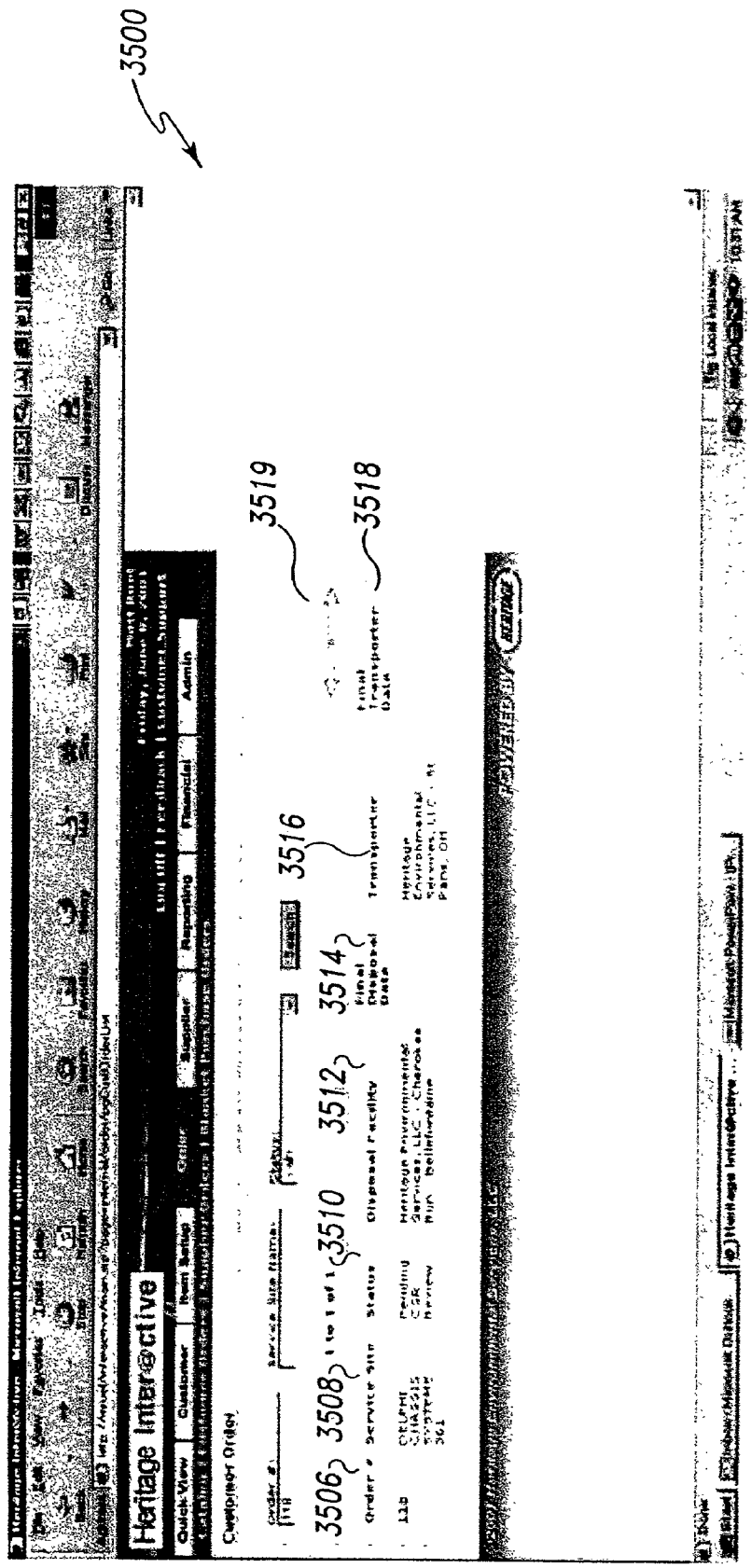
FIG. 35 is another application screen associated with the present invention, the application screen providing the service provider details associated with the customer's service order.

After the customer places the order, the service provider 11 receives the order from the customer on the customer order screen 3500, as shown in FIG. 35. The service provider 11 initially reviews the order number 3506, the service site 3508, the status 3510, the disposal facility 3512, a final disposal date 3514, a transporter 3516, and the final transporter date 3518. Additional order details may be viewed through use of scroll arrows 3519. Status window 3510 initially reflects that the order is pending service provider 11 review. The service provider 11 can modify the order, cancel the order, or request supplier service.

Figure 36:
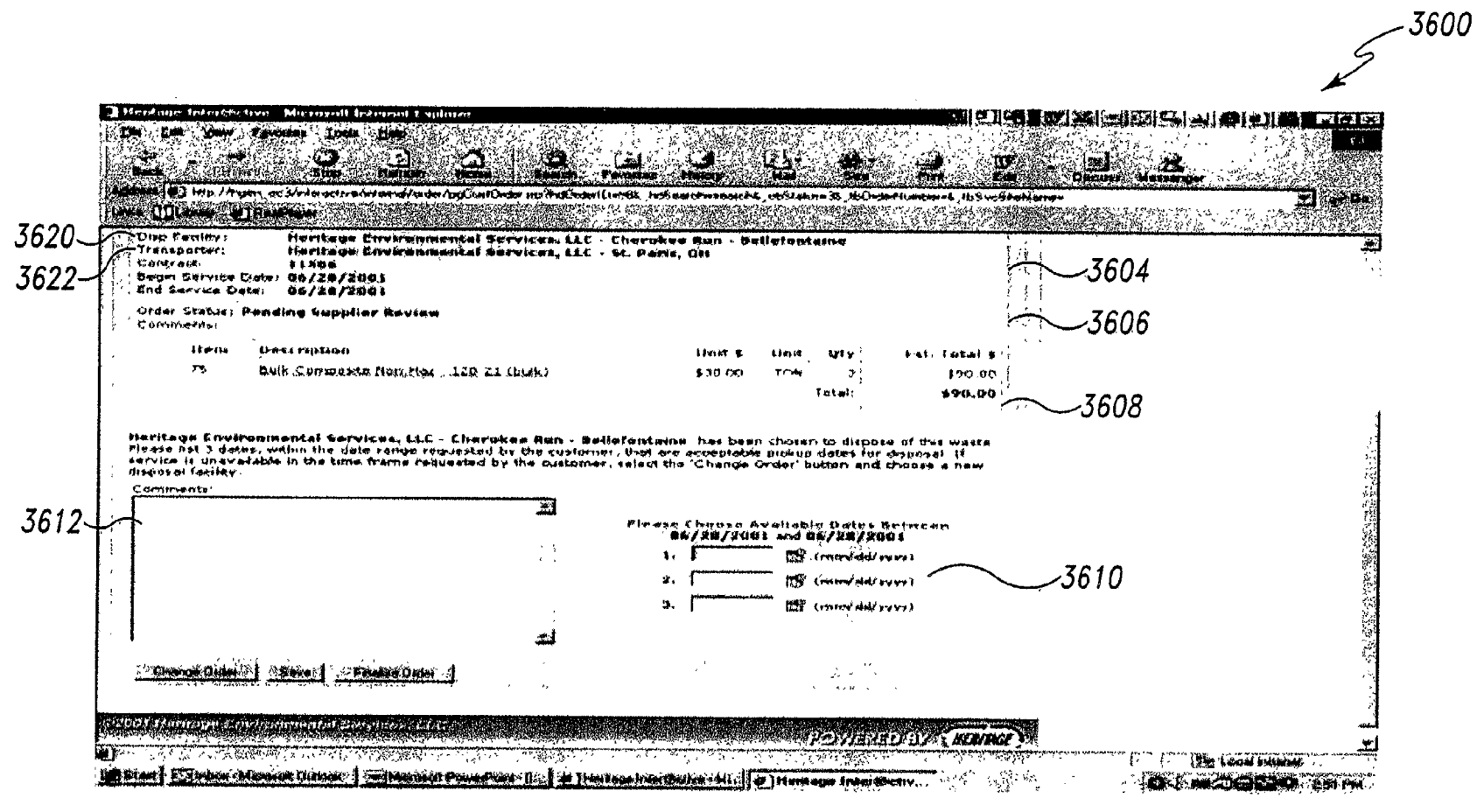

The service provider 11 initially places the service order with a selected disposal facility and selected transporter as specified in disposal facility and transporter detail section 3604, best shown in FIG. 36. Upon initial placement of the order, the order is pending supplier review, as shown in section 3606. Item details and price are shown in section 3608. The supplier is given three dates within the customer's date range that are acceptable pick up dates, as specified in available date section 3610. Additional comments regarding the order are provided in text window 3612. Illustratively, if either supplier 3620 or 3622 cannot accommodate the customer's order within the specified dates 3610, the service provider 11 can change the order and find another approved supplier that will accommodate the customer. If the dates are acceptable to the suppliers, the service provider 11 finalizes the order and enters the final dates that the suppliers have agreed to.

Figure 37:
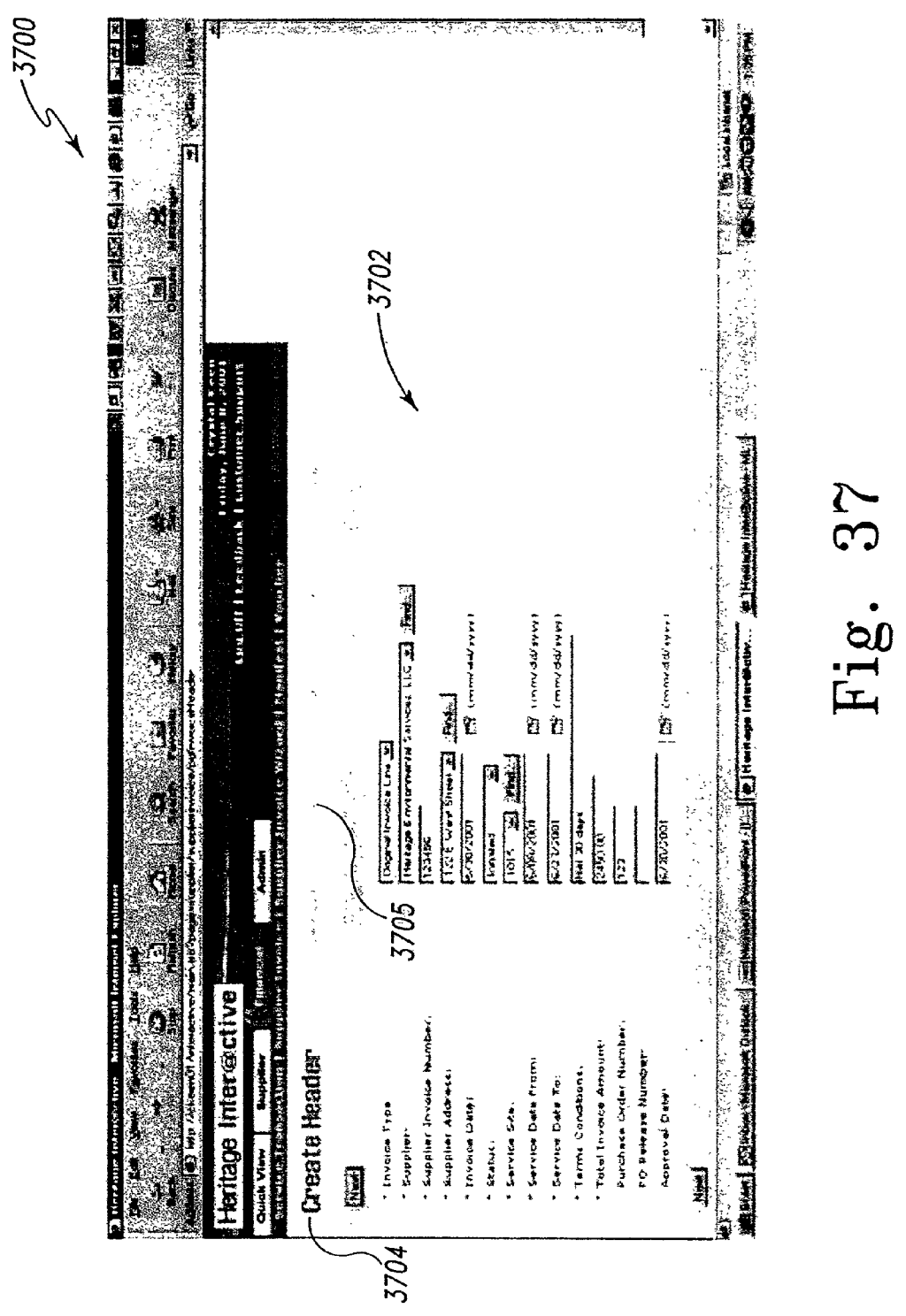
Figure 38:
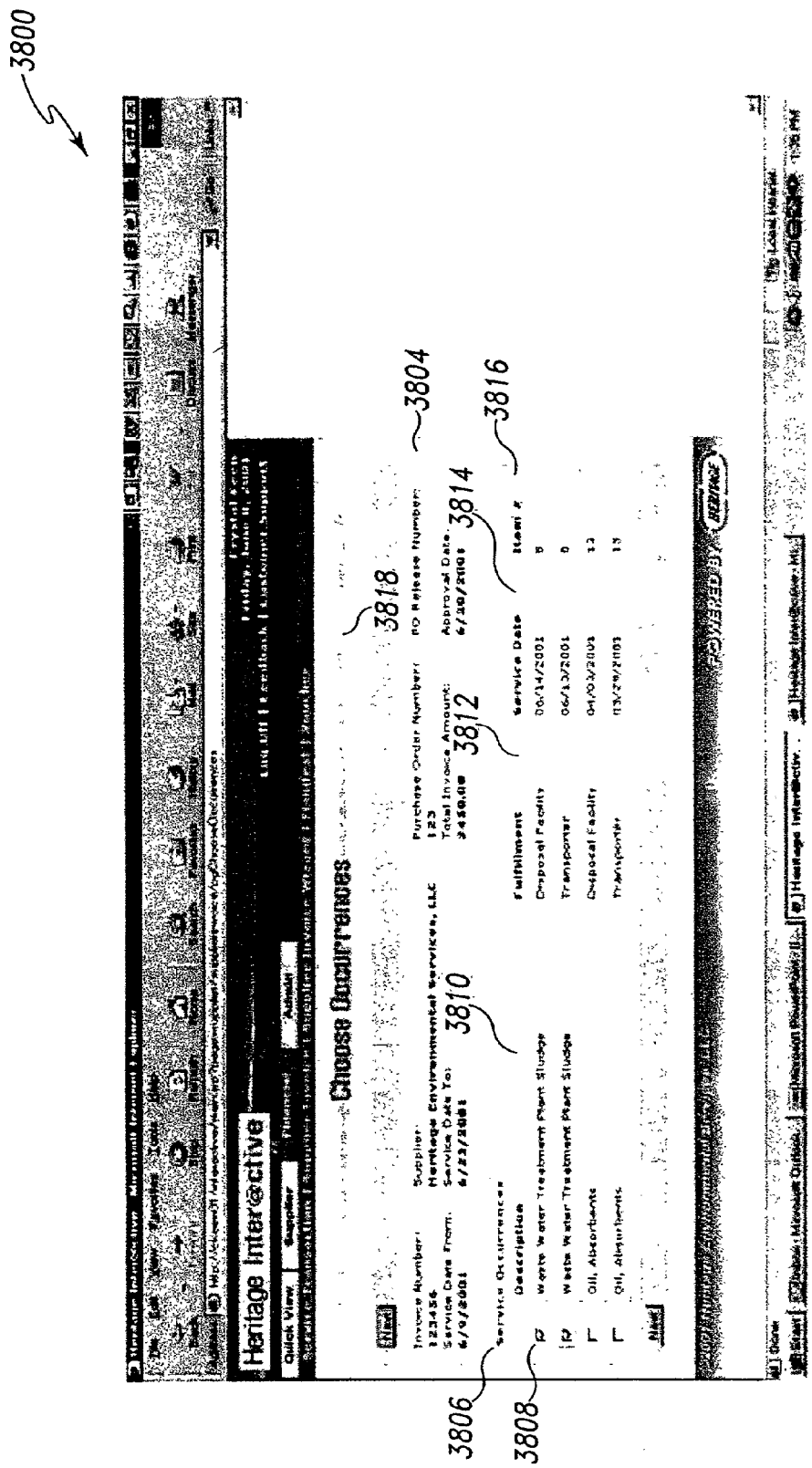
FIG. 38 is another application screen associated with the present invention, the application screen providing the supplier a further invoicing interface though which the supplier inputs data particular to the invoiced service order.
Figure 39:
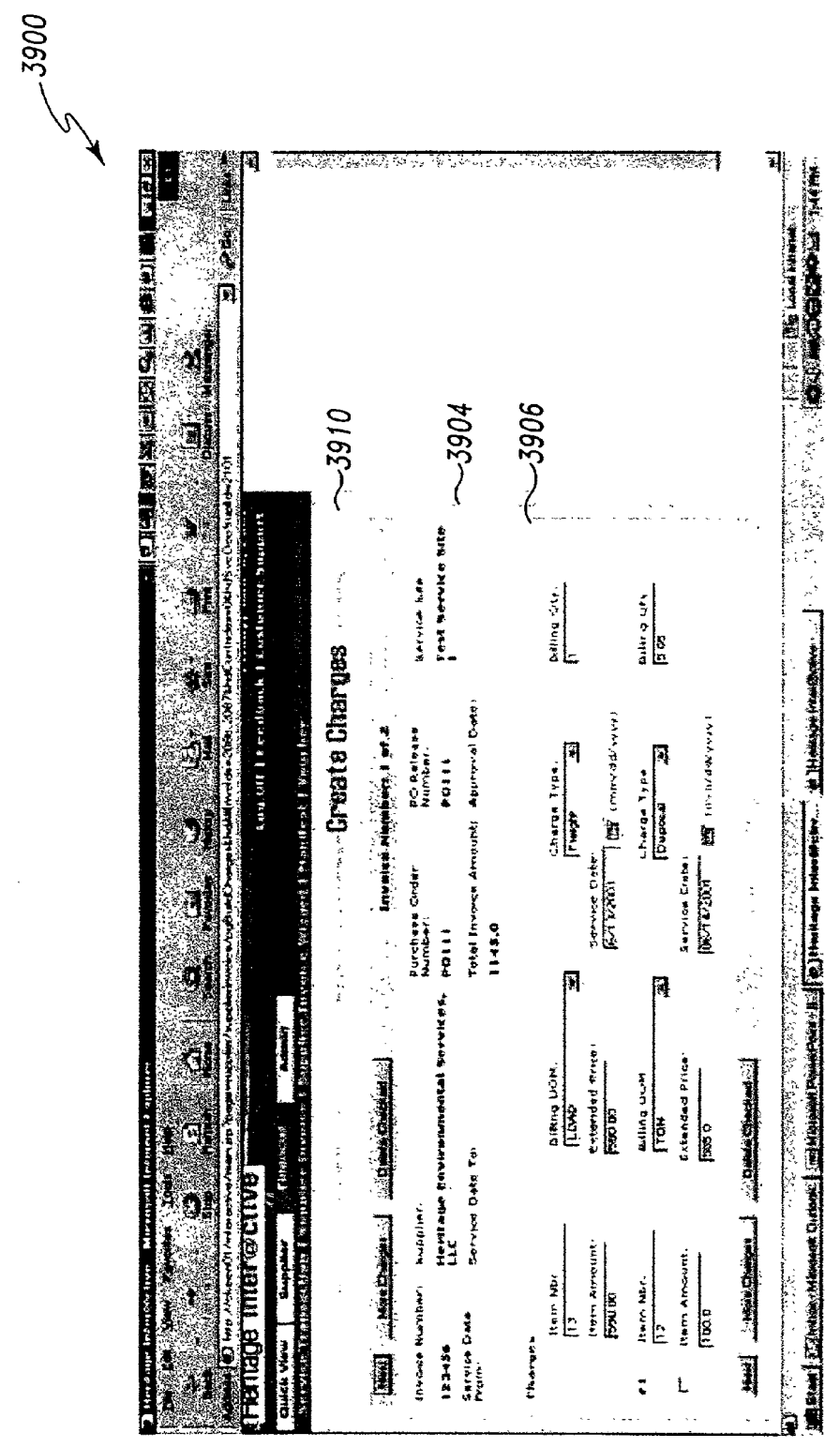
Figure 41:
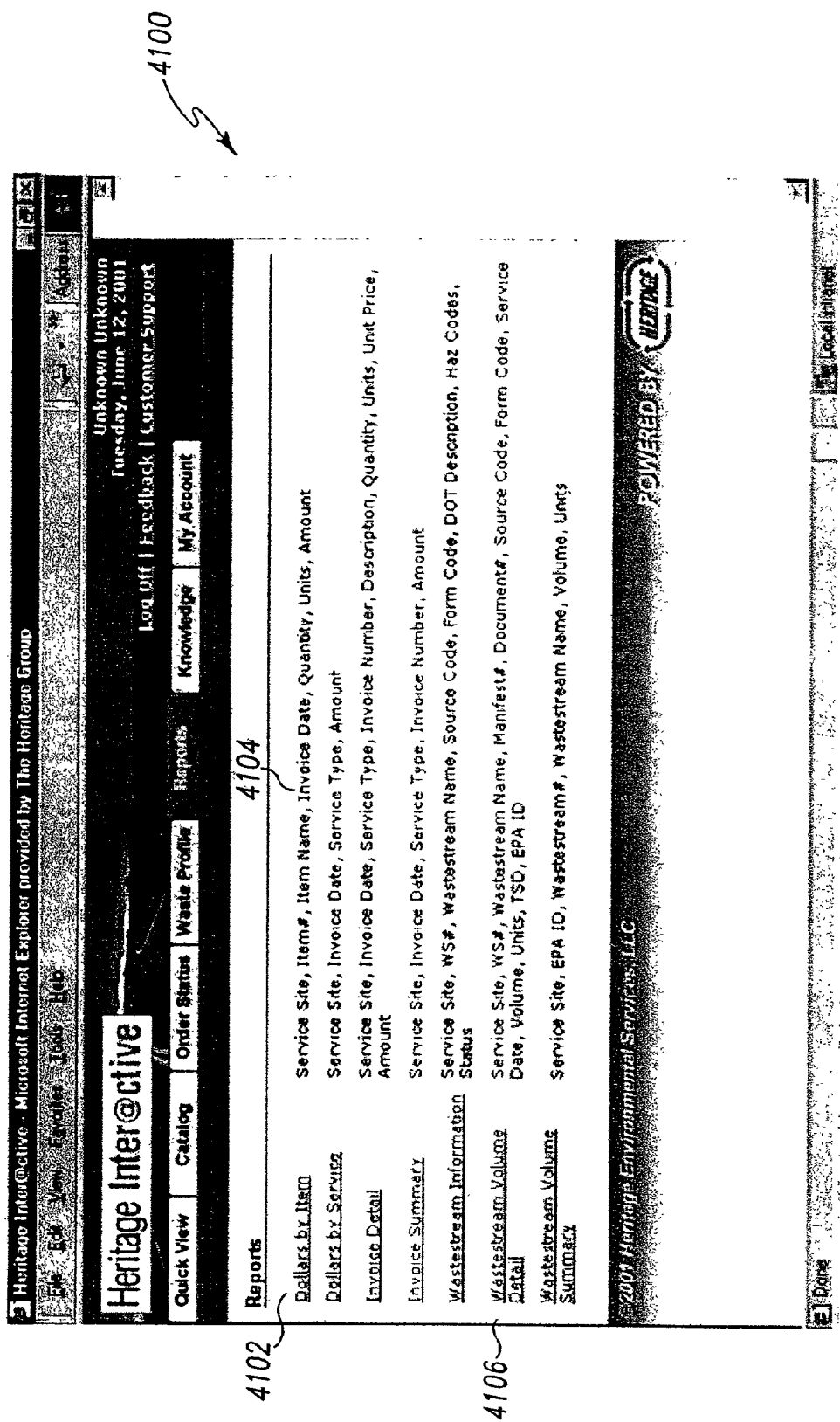
FIG. 41 is another application screen associated with the present invention, the application screen providing the customer a list of automatically generated reports relating to the customer's waste processing.
Figure 42:
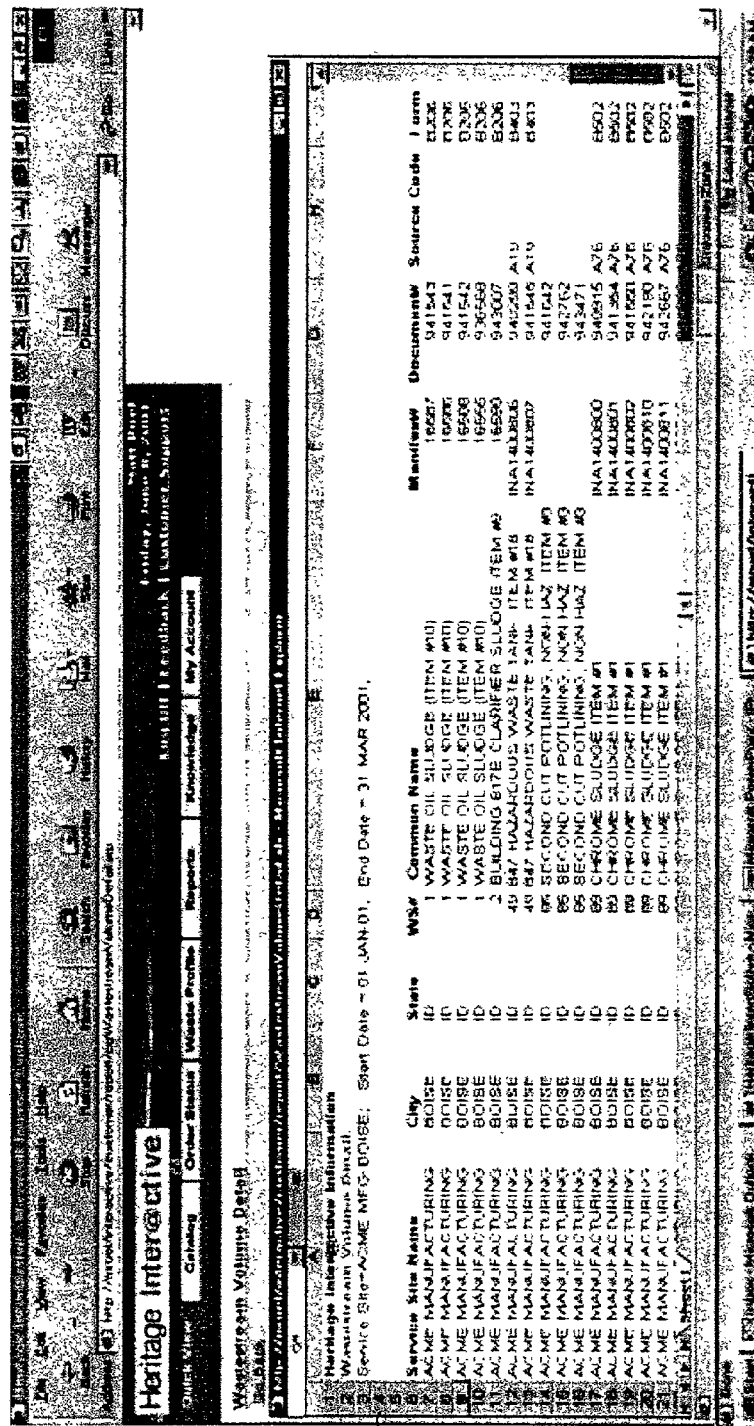
FIG. 42 is another application screen associated with the present invention, the application screen displaying a wastestream volume detail report.

Once the supplier provides service to the customer, the supplier creates an invoice on create header screen 3700, as shown in FIG. 37. Create header category 3704 is selected, and the supplier enters invoicing data in header edit screen 3702. After entering the requisite data, the supplier chooses occurrences category 3705, and the choose occurrences screen 3800 as shown in FIG. 38 is displayed. In the choose occurrences screen 3800, the supplier enters service details in the service occurrences menu section 3806. As the supplier has been approved for a number of predefined items for the customer, the items are displayed directly beneath service occurrences heading box 3806 and can be quickly checked by use of check boxes 3808. Each item includes a description 3810, a fulfillment section 3812, a service date 3814, and an item number 3816. Once the occurrences are entered, the supplier selects the create charges category 3818, and the create charges screen 3900 is displayed, as shown in FIG. 39. The create charges screen 3900 displays the header section 3904, which displays the necessary billing and contact data, and a charges section 3906. Charges section 3906 is used to enter specific charges for each selected item for that service occurrence. After the requisite data is selected, confirm button 3910 is selected and an invoice is sent to service provider 11.

Figure 40:
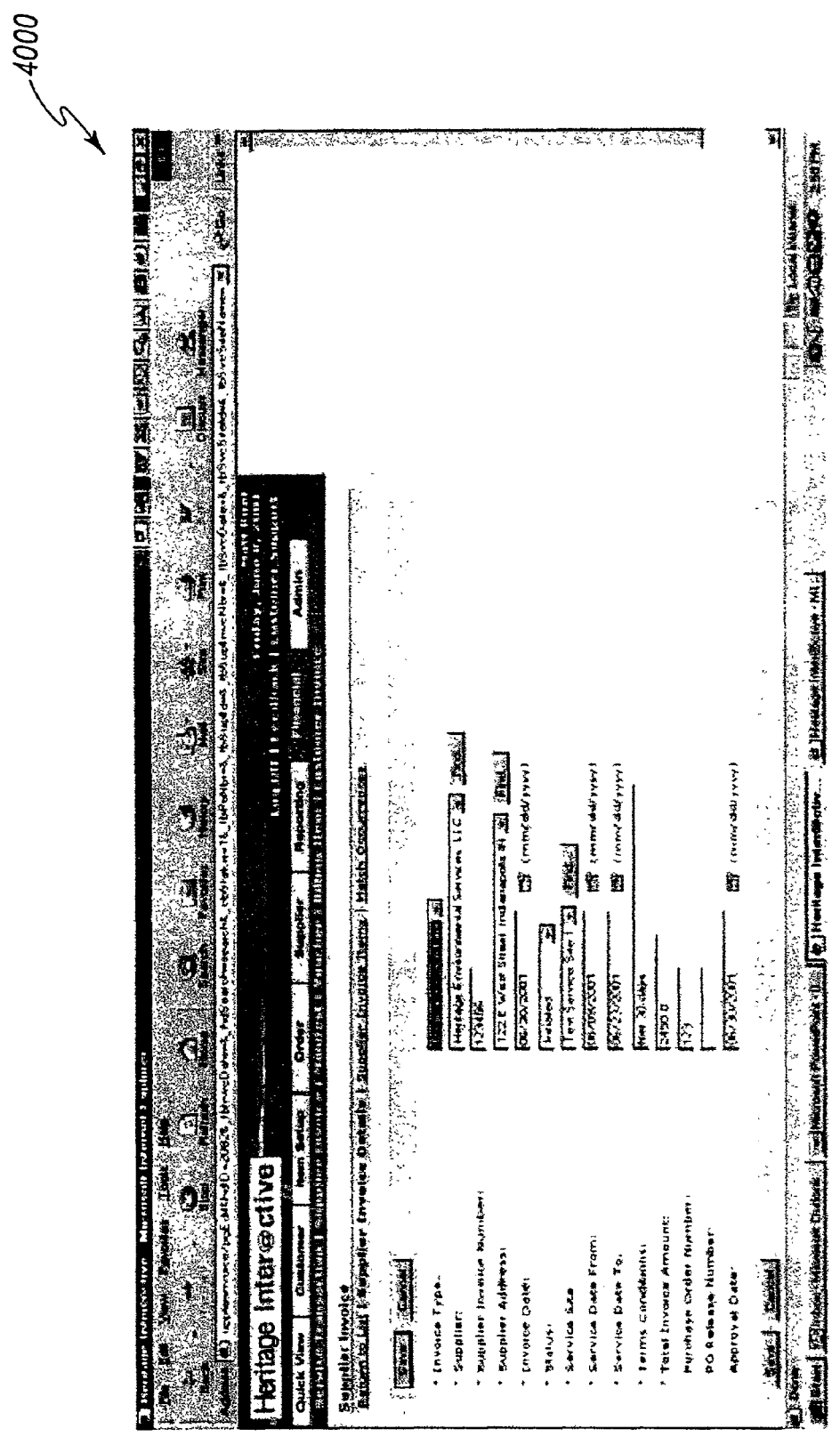

Upon receipt of the billing invoice, the service provider 11 can review the billing charges and modify them if necessary by way of supplier invoice screen 4000, as shown in FIG. 40. The invoice is then approved, and the customer is provided the billing invoice. If more than one supplier was involved in the customer's service order, the service provide 11 can consolidate the service order and provide the customer a single consolidate bill for all services rendered by several suppliers.

One of ordinary skill in the art will understand that the process described with reference to FIGS. 10A, 10B, and 32-40 can be completely automated or can be facilitated with human intervention at various stages. For example, item orders can be automatically routed to primary vendors with instructions to the primary vendor that they must respond within a certain time period. If a primary vendor fails to respond, the order is withdrawn and sent to a secondary vendor. Similarly, if a customer submits a special instruction that the automated system cannot readily facilitate, a representative of service provider 11 can be notified to provide human intervention.

As a system tracks and maintains all service data for a customer, the customer can generate a number of reports that will display financial information, invoice information, and waste processing information. As shown in report screen 4100 of FIG. 41, a customer can select from a number of reports 4102, to obtain the report data as listed in section 4104. An illustrative waste volume detail report 4106 is shown in report screen 4200 of FIG. 42. The waste volume detail report is provided in a common spreadsheet format in spreadsheet window 4202.

The exemplary embodiments encompassing the best mode of the invention as presently perceived has been described in reference to the above-mentioned drawings and accompanying description. One of ordinary skill in the art will readily appreciate that the above disclosure is not limiting in nature, and variations exists that are within the scope and spirit of the invention, and as defined by the claims recited hereafter.

What is claimed is:

1. A waste management system, comprising:
  a computer storage medium storing waste management data associated with a plurality of vendors having waste management capabilities and providing waste management services and entity profile data associated with a plurality of waste producing entities having waste processing requirements and producing waste components;
  a first computer system configured to access the computer storage medium and stored waste management data and entity profile data, and further configured to associate a set of vendors from the plurality of vendors to provide waste management service for the waste producing entity;
  a second computer system configured to transmit to and receive information from the first computer system, the second computer system configured to provide an interface wherein the waste producing entity inputs and receives data associated with the waste processing of waste components produced by the waste producing entity; and
  a plurality of third computer systems, each of the third computer systems configured to transmit to and receive information from the first computer system, each of the third computer systems corresponding to each of the vendors, and configured to provide an interface wherein each of the vendors inputs and receives data associated with the waste processing of waste components produced by the waste producing entity;
  wherein a waste service network includes the plurality of vendors, and wherein the waste producing entity inputs a waste processing service order into the second computer system, and wherein the first computer system is further configured to receive the waste processing service order from the second computer system and provide the waste processing service order to one of the third computer systems corresponding to one of the vendors associated with the set of vendors.

2. A waste management system, comprising:
  a computer storage medium storing waste management data associated with a plurality of vendors having waste management capabilities and providing waste management services and entity profile data associated with a plurality of waste producing entities having waste processing requirements and producing waste components; and a first computer system configured to access the computer storage medium and stored waste management data and entity profile data, and further configured to associate a set of vendors from the plurality of vendors to provide waste management service for the waste producing entity;

wherein the set of vendors from the plurality of vendors to provide waste management service for the waste producing entity is determined by comparing the waste management data to the entity profile data and selecting a set of vendors from the plurality of vendors to provide waste management service for the waste producing entity based on the comparison.

3. The system of claim 1, wherein the first computer system is further configured to store waste component processing data associated with the waste components of the waste producing entity processed by the vendors.

4. The system of claim 3, wherein the second computer system is further configured to generate reports relating to the waste processing of the waste components produced by the waste producing entity.

5. The system of claim 4, wherein the first computer system is further configured to store regulatory data relating to waste processing and waste components, and wherein the second computer system is further configured to generate regulatory reports relating to the waste processing of the waste components produced by the waste producing entity.

6. A waste management system, comprising:
a computer storage medium storing waste management data associated with a plurality of vendors having waste management capabilities and providing waste management services and entity profile data associated with a plurality of waste producing entities having waste processing requirements and producing waste components;
a first computer system configured to access the computer storage medium and stored waste management data and entity profile data, and further configured to associate a set of vendors from the plurality of vendors to provide waste management service for the waste producing entity;
a second computer system configured to transmit to and receive information from the first computer system, the second computer system configured to provide an interface wherein the waste producing entity inputs and receives data associated with the waste processing of waste components produced by the waste producing entity; and
a plurality of third computer systems, each of the third computer systems configured to transmit to and receive information from the first computer system, each of the third computer systems corresponding to each of the vendors, and configured to provide an interface wherein each of the vendors inputs and receives data associated with the waste processing of waste components produced by the waste producing entity;
further comprising: a sensor located at the waste producing entity, the sensor monitoring a waste component and generating monitoring data indicating when the waste producing entity requires waste management service; wherein the first computer system is configured to receive the monitoring data and place a service request to a first vendor from the set of vendors to provide waste management service for the waste producing entity when the monitoring data indicates the waste producing entity requires waste management service.

7. The system of claim 6, wherein the first computer system is further configured to withdrawing the request from the first vendor if the first vendor does not respond within a period of time and further configured to place a service request to a second vendor from the set of vendors to provide waste management service for the waste producing entity when the monitoring data indicates the waste producing entity requires waste management service.

8. A waste management system, comprising:
a computer storage medium storing waste management data associated with a plurality of vendors having waste management capabilities and providing waste management services and entity profile data associated with a plurality of waste producing entities having waste processing requirements and producing waste components;
a first computer system configured to access the computer storage medium and stored waste management data and entity profile data, and further configured to associate a set of vendors from the plurality of vendors to provide waste management service for the waste producing entity;
a second computer system configured to transmit to and receive information from the first computer system, the second computer system configured to provide an interface wherein the waste producing entity inputs and receives data associated with the waste processing of waste components produced by the waste producing entity; and
a plurality of third computer systems, each of the third computer systems configured to transmit to and receive information from the first computer system, each of the third computer systems corresponding to each of the vendors, and configured to provide an interface wherein each of the vendors inputs and receives data associated with the waste processing of waste components produced by the waste producing entity;
wherein the entity profile data includes a plurality of items, each item corresponding to a waste processing requirement of the waste producing entity; and
wherein the first computer system is configured to associate a set of vendors from the plurality of vendors to provide waste management service for the waste producing entity for each item.

9. The system of claim 8, wherein the first computer system is configured to receive a service request for an item from the waste producing entity, and place a service request to a first vendor from the set of vendors to provide waste management service for the item.

10. The system of claim 9, wherein the first computer system is further configured to withdrawing the request from the first vendor if the first vendor does not respond within a period of time and place a service request to a second vendor from the set of vendors to provide waste management service for the item.

11. The system of claim 10, wherein the first computer system is further configured to store waste component processing data associated with the waste components of the waste producing entity processed by the vendors.

12. The system of claim 11, wherein the first computer system is further configured generate a consolidated financial statement relating to the waste management services provided by the vendors to the waste producing entity.

13. A waste management system, comprising:
a computer storage medium storing waste management data associated with a plurality of vendors having waste management capabilities and providing waste management services and entity profile data associated with a plurality of waste producing entities having waste processing requirements and producing waste components;

a first computer system configured to access the computer storage medium and stored waste management data and entity profile data, and further configured to associate a set of vendors from the plurality of vendors to provide waste management service for the waste producing entity;

a second computer system configured to transmit to and receive information from the first computer system, the second computer system configured to provide an interface wherein the waste producing entity inputs and receives data associated with the waste processing of waste components produced by the waste producing entity; and a plurality of third computer systems, each of the third computer systems configured to transmit to and receive information from the first computer system, each of the third computer systems corresponding to each of the vendors, and configured to provide an interface wherein each of the vendors inputs and receives data associated with the waste processing of waste components produced by the waste producing entity;

wherein the first computer system is further configured to store waste component processing data associated with the waste components of the waste producing entity processed by the vendors; and wherein the first computer system is further configured generate a consolidated financial statement relating to the waste management services provided by the vendors to the waste producing entity.

14. A waste management method, the method comprising the steps of:
creating a service network, implemented on a server computer, the service network including a plurality of waste processing vendors;
evaluating the waste processing capabilities of each of the waste processing vendors in the service network;
receiving a waste processing service request from a waste producing entity;
comparing the waste processing service request to the capabilities of the waste processing vendors in the service network; and
selecting a vendor from the service network to fulfill the waste processing service request.

15. The method of claim 14, further comprising the steps of: evaluating the performance of each of the waste processing vendors in the service network; and reevaluating the waste processing capabilities of a vendor in the service network based on the performance of the vendor.

16. The method of claim 14, further comprising the steps of: evaluating waste processing requirements of a waste producing entity; minimizing the waste processing requirements of the waste producing entity; and selecting a preferred set of vendors from the service network to provide service to the waste producing entity based on the minimized waste processing requirements of the waste producing entity.

17. The method of claim 14, further comprising the steps of: evaluating waste processing requirements of a waste producing entity; minimizing the waste processing costs of the waste producing entity; and selecting a preferred set of vendors from the service network to provide service to the waste producing entity based on the minimized waste processing costs of the waste producing entity.

18. The system of claim 1, wherein the waste management services include at least one of processing hazardous waste, processing industrial waste, disposing of refuse, recycling plastics, and recycling cardboard.

19. The system of claim 1, wherein the waste components include at least one of hazardous waste, industrial waste, refuse, recyclable plastics, and recyclable cardboard.

20. The method of claim 14, wherein the waste processing capabilities include at least one of processing hazardous waste, processing industrial waste, disposing of refuse, recycling plastics, and recycling cardboard.

21. The method of claim 14, wherein the waste producing entity produces at least one of hazardous waste, industrial waste, refuse, recyclable plastics, and recyclable cardboard.

22. The system of claim 2, further comprising a second computer system configured to transmit to and receive information from the first computer system, the second computer system configured to provide an interface wherein the waste producing entity inputs and receives data associated with the waste processing of waste components produced by the waste producing entity; and a plurality of third computer systems, each of the third computer systems configured to transmit to and receive information from the first computer system, each of the third computer systems corresponding to each of the vendors, and configured to provide an interface wherein each of the vendors inputs and receives data associated with the waste processing of waste components produced by the waste producing entity; wherein the first computer system is further configured to store waste component processing data associated with the waste components of the waste producing entity processed by the vendors.

23. The system of claim 22, wherein the second computer system is further configured to generate reports relating to the waste processing of the waste components produced by the waste producing entity.

24. The system of claim 23, wherein the first computer system is further configured to store regulatory data relating to waste processing and waste components, and wherein the second computer system is further configured to generate regulatory reports relating to the waste processing of the waste components produced by the waste producing entity.

25. The system of claim 2, wherein the waste management services include at least one of processing hazardous waste, processing industrial waste, disposing of refuse, recycling plastics, and recycling cardboard.

26. The system of claim 2, wherein the waste components include at least one of hazardous waste, industrial waste, refuse, recyclable plastics, and recyclable cardboard.

* * * * *